(12) United States Patent
Yoshida

(10) Patent No.: US 11,288,031 B2
(45) Date of Patent: Mar. 29, 2022

(54) INFORMATION PROCESSING APPARATUS, INFORMATION PROCESSING METHOD, AND INFORMATION PROCESSING SYSTEM

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 16/821,240

(22) Filed: Mar. 17, 2020

(65) Prior Publication Data

US 2020/0301647 A1 Sep. 24, 2020

(30) Foreign Application Priority Data

Mar. 20, 2019 (JP) .............................. JP2019-052963
Jan. 17, 2020 (JP) .............................. JP2020-005944

(51) Int. Cl.
*G06F 3/14* (2006.01)
*H04L 65/401* (2022.01)
*H04L 12/18* (2006.01)
*H04L 67/10* (2022.01)

(52) U.S. Cl.
CPC ........ *G06F 3/1454* (2013.01); *H04L 12/1827* (2013.01); *H04L 29/06401* (2013.01); *H04L 67/10* (2013.01)

(58) Field of Classification Search
CPC ............... G06F 3/1454; H04L 12/1827; H04L 29/06401; H04L 67/10
See application file for complete search history.

(56) References Cited

U.S. PATENT DOCUMENTS

| 8,826,150 | B1* | 9/2014 | Ainslie | H04W 4/21 |
| | | | | 715/753 |
| 9,667,676 | B1* | 5/2017 | Lo | H04L 67/104 |
| 10,431,187 | B2 | 10/2019 | Miki | |
| 2005/0166151 | A1* | 7/2005 | Isozaki | H04N 7/147 |
| | | | | 715/733 |
| 2010/0169888 | A1* | 7/2010 | Hare | H04L 67/22 |
| | | | | 718/102 |

(Continued)

FOREIGN PATENT DOCUMENTS

| JP | 2006-146514 | 6/2006 |
| JP | 2017-017668 | 1/2017 |

*Primary Examiner* — Jonathan A Bui
(74) *Attorney, Agent, or Firm* — IPUSA, PLLC

(57) ABSTRACT

An information processing apparatus performs data communication with a communication terminal, and executes a process including displaying a content by a web browser of the communication terminal of a participating user that is participating in a screen sharing event for sharing the content; determining, on a per-screen sharing event basis, a Uniform Resource Locator (URL) of a web page for causing the web browser, which is included in the communication terminal participating in the screen sharing event, to input and transmit information of the participating user; transmitting the determined URL to the communication terminal of the participating user; and transmitting participation data, in which the information of the participating user transmitted via the web page from the web browser of the communication terminal, and participation information indicating that the participating user has participated in the screen sharing event, are associated with each other.

9 Claims, 40 Drawing Sheets

(56) References Cited

U.S. PATENT DOCUMENTS

| | | | |
|---|---|---|---|
| 2013/0174229 A1* | 7/2013 | Grason | G06F 40/143 726/4 |
| 2013/0179941 A1* | 7/2013 | McGloin | H04L 12/1818 726/3 |
| 2014/0026025 A1* | 1/2014 | Smith | G06F 16/176 715/230 |
| 2015/0317382 A1* | 11/2015 | O'Malley | H04L 67/02 707/738 |
| 2018/0167426 A1* | 6/2018 | Sigurdsson | G06F 3/14 |
| 2018/0176508 A1* | 6/2018 | Pell | H04N 19/85 |
| 2018/0351756 A1* | 12/2018 | Dave | H04N 7/15 |
| 2019/0122030 A1* | 4/2019 | Raudies | G06T 11/60 |
| 2019/0303087 A1* | 10/2019 | Tsukamoto | G06F 3/147 |
| 2019/0303880 A1* | 10/2019 | Hashimoto | G06Q 10/1095 |
| 2019/0385127 A1* | 12/2019 | Hashimoto | G06F 16/176 |
| 2020/0099858 A1* | 3/2020 | Lee | G09B 19/003 |
| 2020/0242332 A1* | 7/2020 | Lenchner | G06Q 10/06 |

* cited by examiner

FIG.13

PERSONAL MEMO MANAGEMENT DB

| PERSONAL MEMO ID | USER ID | ROOM ID | SHEET ID | CAPTURED IMAGE | |
|---|---|---|---|---|---|
| PERSONAL MEMO A | User-a | room-a | FIRST SHEET: sheet-1 | capture-A1.jpg | ... |
| PERSONAL MEMO A | User-a | room-a | SECOND SHEET: sheet-2 | capture-A2.jpg | ... |
| PERSONAL MEMO A | User-a | room-a | THIRD SHEET: sheet-3 | capture-A3.jpg | ... |
| PERSONAL MEMO A | User-a | room-a | FOURTH SHEET: sheet-4 | capture-A4.jpg | ... |
| PERSONAL MEMO A | User-a | room-a | FIFTH SHEET: sheet-5 | capture-A5.jpg | ... |
| PERSONAL MEMO B | User-b | room-a | FIRST SHEET: sheet-1 | capture-B1.jpg | ... |
| PERSONAL MEMO B | User-b | room-a | SECOND SHEET: sheet-2 | capture-B2.jpg | ... |
| PERSONAL MEMO B | User-b | room-a | THIRD SHEET: sheet-3 | capture-B3.jpg | ... |
| PERSONAL MEMO C | User-c | room-a | FIRST SHEET: sheet-1 | capture-C1.jpg | ... |

FIG.14

SHARED MEMO MANAGEMENT DB

| SHARED MEMO ID | ROOM ID | BIBLIOGRAPHIC INFORMATION OF SEMINAR | ... |
|---|---|---|---|
| SHARED MEMO a | room-a | DATE AND TIME: 2018/9/4<br>SEMINAR NAME: SEMINAR ○○<br>LOCATION: SEMINAR ROOM A<br>SELF-EVALUATION: ★★★<br>... | ... |

FIG.15

PERSONAL MEMO DB

| PERSONAL MEMO ID | SHEET ID | CONTENT ID | CONTENT DATA | DISPLAY POSITION |
|---|---|---|---|---|
| PERSONAL MEMO A | sheet-1 | c101 | TYPE: TEXT MEMO<br>FONT TYPE: TIMES NEW ROMAN<br>SIZE: 20<br>TEXT CHARACTERS: ABCDE | (1,1) |
| PERSONAL MEMO A | sheet-1 | c102 | TYPE: IMAGE<br>FILE NAME: xxx.jpg | (200,10) |
| PERSONAL MEMO A | sheet-1 | c103 | TYPE: VECTOR<br>NUMERICAL VALUE DATA: ... | (1000,500) |
| ⋮ | | ⋮ | | |

FIG.16

SHARED MEMO DB

| SHARED MEMO ID | CONTENT ID | CONTENT DATA | DISPLAY POSITION | ... |
|---|---|---|---|---|
| SHARED MEMO a | c201 | TYPE: TEXT<br>FONT TYPE: TIMES NEW ROMAN<br>SIZE: 20<br>TEXT CHARACTERS: R | (400,270) | ... |
| SHARED MEMO a | c202 | TYPE: IMAGE<br>FILE NAME: yyy.jpg | (400,20) | |
| SHARED MEMO a | c203 | TYPE: VECTOR<br>NUMERICAL VALUE DATA: ... | (120,600) | |

FIG.17

| PERSONAL MEMO ID | NUMBER OF TIMES OF CAPTURING STREAMING | NUMBER OF TIMES OF REFERRING TO CAPTURE (AFTER SEMINAR) | | QUANTITY OF WRITING | | | | DL BY PDF | SEMINAR PARTICIPATION TIME | SEMINAR EXIT TIME |
|---|---|---|---|---|---|---|---|---|---|---|
| | | TOTAL NUMBER OF TIMES OF REFERRING TO CAPTURE | NUMBER OF TIMES OF REFERRING TO EACH CAPTURE AND REFERENCE TIME | TOTAL NUMBER OF TEXT CHARACTERS IN EACH PERSONAL MEMO | NUMBER OF TEXT CHARACTERS OF EACH CAPTURE IN PERSONAL MEMO | NUMBER OF HAND-WRITTEN OBJECTS (LINES, STAMPS, ETC.) | NUMBER OF HAND-WRITTEN OBJECTS IN EACH CAPTURE IN PERSONAL MEMO | NUMBER OF HAND-WRITTEN CHARACTERS WITH RESPECT TO CAPTURE | | | |
| PERSONAL MEMO A | 3 | 5 | FIRST SHEET 4 2/8,2/9 SECOND SHEET 1 2/9 ... | 200 | FIRST SHEET 50 SECOND SHEET 0 ... | 40 | FIRST SHEET 20 SECOND SHEET 0 ... | 10 | NOT PERFORMED | 2/7 10:01:30 | 2/7 10:30:30 |
| PERSONAL MEMO B | 2 | 6 | FIRST SHEET 2 SECOND SHEET 4 ... | 100 | FIRST SHEET 0 SECOND SHEET 30 ... | 20 | FIRST SHEET 5 SECOND SHEET 10 ... | 5 | NOT PERFORMED | 2/7 10:02:10 | 2/7 10:29:30 |
| PERSONAL MEMO C | 1 | 0 | 0 | 10 | FIRST SHEET 10 SECOND SHEET 0 ... | 0 | FIRST SHEET 0 SECOND SHEET 0 ... | 0 | PERFORMED AT TIME POINT OF 2:30 AFTER STARTING STREAMING | 2/7 09:58:40 | 2/7 10:04:30 |

FIG.18

| IDENTIFIER | SEMINAR ID |
|---|---|
| AAAAA | b807515f-a574-4cd3-b250-5096dd06afef |
| BBBBB | 4a0e876e-90cf-4abf-a278-a8c94626f443 |
| CCCCC | 16fa5ce9-9fe6-4ffb-a22d-c14888809555b |

FIG.19

| SEMINAR ID | SEMINAR NAME | SEMINAR ROOM | ... | PARTICIPATING USERS (ARRANGEMENT) | STATE |
|---|---|---|---|---|---|
| b807515f-... | SEMINAR ○○ | C2101 | ... | [ABC, DEF] | DURING SEMINAR |
| 4a0e876e-... | SEMINAR ×× | RECEPTION ROOM 002 | ... | [XYZ, OPQ] | DURING SEMINAR |
| 16fa5ce9-... | SEMINAR △△ | HUDDLE 001 | ... | [ABC, GHI, RST] | SEMINAR ENDED |

FIG.20

| USER ID | USER NAME | e-mail | ... |
|---------|-----------|--------------|-----|
| ABC | C | CCC@yyy.com | ... |
| DEF | A | AAA@yyy.com | ... |
| XYZ | B | BBB@yyy.com | ... |

CONFIRMATION MAIL IS TRANSMITTED.

PLEASE OPEN URL INCLUDED
IN CONFIRMATION MAIL.

THIS IS CONFIRMATION MAIL IN RESPONSE
TO REQUEST TO PARTICIPATE IN SEMINAR.

BY OPENING THE FOLLOWING URL,
A PERSONAL BOARD SCREEN WILL BE DISPLAYED,
AND YOU CAN PARTICIPATE IN THE SEMINAR.

http://xx.xx.xxx.xx/

FIG.36

PERSONAL PORTAL
PERSONAL HISTORY  SETTING

🔍 [CHARACTER SEARCH] ~5020

| DATE AND TIME | SEMINAR NAME | LOCATION | PERSONAL BOARD | SHARED BOARD | SELF-EVALUATION | BIBLIOGRAPHIC INFORMATION |
|---|---|---|---|---|---|---|
| 2018-10-05 20:30 | TEST | | | | ☆☆☆☆☆ | 🗐 |
| 2018-10-05 20:30 | [PERSONAL] | | | | ☆☆☆☆☆ | |
| 2018-10-05 10:00 | DAILY MTG | room4 | 🗐 | 🗐 | ☆☆☆☆☆ | 🗐 |
| 2018-09-05 04:00 | CONSULTATION | room2 | 🗐 | 🗐 | ★★★★☆ | 🗐 |
| 2018-09-04 09:53 | Meeting | CONFERENCE ROOM A | 🗐 | 🗐 | ★★★☆☆ | 🗐 |
| 2018-09-04 07:40 | BRIEFING SESSION | room3 | 🗐 | 🗐 | ★★★☆☆ | 🗐 |
| 2018-08-28 13:00 | CONSULTATION ABOUT TRAINING ORGANIZATION | room1 | ⋮ | ⋮ | | |

BIBLIOGRAPHIC INFORMATION

[HOST INFORMATION]
SEMINAR NAME: REGULAR
HOST DATE AND TIME: 2018/12/1 10:00–11:00
HOST LOCATION: 1F CONFERENCE ROOM A
ORGANIZER: PRESENTER A
PARTICIPANTS: PARTICIPANT B, PARTICIPANT C

[CAPTURE INFORMATION]

INPUT PARTICIPANT NAME  [REFINE]

| THUMBNAIL | 1 | 2 | 3 | | | |
|---|---|---|---|---|---|---|
| NUMBER OF TIMES OF CAPTURING | ONE TIME | TWO TIMES | ONE TIME | | | |

BIBLIOGRAPHIC INFORMATION

[HOST INFORMATION]
SEMINAR NAME: REGULAR
HOST DATE AND TIME: 2018/12/1 10:00-11:00
HOST LOCATION: 1F CONFERENCE ROOM A
ORGANIZER: PRESENTER A
PARTICIPANTS: PARTICIPANT B, PARTICIPANT C

[CAPTURE INFORMATION]

| INPUT PARTICIPANT NAME | REFINE |

| CAPTURED IMAGE | NUMBER OF TIMES OF CAPTURING |
|---|---|
| <br>20180927134809448.jpg<br>REVIEW FIRST HALF | 15 |
| 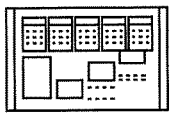<br>20180927135236407.jpg<br>BUSINESS RESULTS FISCAL YEAR 17 | 8 |
| 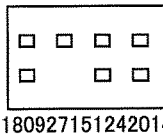<br>20180927151242014.jpg<br>DIFFERENCE IN FLOW OF CUS-<br>TOM ORDERING VIEWED FROM··· | 6 |
| 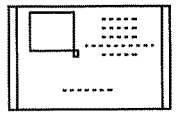<br>20180927133557918.jpg<br>TOP PAGE OF<br>ENTIRE SEMINAR | 5 |
| 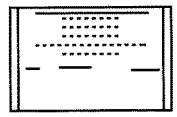<br>20180927134813026.jpg<br>ORGANIZATION FUNCTION DIA-<br>GRAM (CENTER DEPARTMENT··· | 4 |

FIG.39

BIBLIOGRAPHIC INFORMATION

[HOST INFORMATION]
SEMINAR NAME: REGULAR
HOST DATE AND TIME: 2018/12/1 10:00-11:00
HOST LOCATION: 1F CONFERENCE ROOM A
ORGANIZER: PRESENTER A
PARTICIPANTS: PARTICIPANT B, PARTICIPANT C

[CAPTURE INFORMATION]

| INPUT PARTICIPANT NAME | REFINE |

NUMBER OF WRITTEN IN CHARACTERS IN MEMO: 200 CHARACTERS

| USER NAME | B | PERSONAL MEMO A | CAPTURED IMAGE | | | | | |
|---|---|---|---|---|---|---|---|---|
| e-mail | BBB@yyy.com | | MEMO | | | | | |
| USER ID | XYZ | | SEMINAR PARTICIPATION TIME | 2/7 10:01:30 | | | | |
| | | | SEMINAR EXIT TIME | 2/7 10:30:30 | | | | |
| | | | INTEREST LEVEL | HIGH | | | | |

NUMBER OF WRITTEN IN CHARACTERS IN MEMO: 50 CHARACTERS

| USER NAME | C | PERSONAL MEMO B | CAPTURED IMAGE | | | | | |
|---|---|---|---|---|---|---|---|---|
| e-mail | CCC@yyy.com | | MEMO | | | | | |
| USER ID | ABC | | SEMINAR PARTICIPATION TIME | 2/7 10:02:10 | | | | |
| | | | SEMINAR EXIT TIME | 2/7 10:29:30 | | | | |
| | | | INTEREST LEVEL | MEDIUM | | | | |

NUMBER OF WRITTEN IN CHARACTERS IN MEMO: 30 CHARACTERS

| USER NAME | D | PERSONAL MEMO C | CAPTURED IMAGE | | | | | |
|---|---|---|---|---|---|---|---|---|
| e-mail | DDD@yyy.com | | MEMO | | | | | |
| USER ID | DEF | | SEMINAR PARTICIPATION TIME | 2/7 09:58:40 | | | | |
| | | | SEMINAR EXIT TIME | 2/7 10:04:30 | | | | |
| | | | INTEREST LEVEL | LOW | | | | |

…

INFORMATION PROCESSING APPARATUS, INFORMATION PROCESSING METHOD, AND INFORMATION PROCESSING SYSTEM

CROSS-REFERENCE TO RELATED APPLICATION

The present application is based on and claims priority under 35 U.S.C. § 119 to Japanese Patent Application No. 2019-052963, filed on Mar. 20, 2019, and Japanese Patent Application No. 2020-005944, filed on Jan. 17, 2020, the contents of which are incorporated herein by reference in their entirety.

BACKGROUND OF THE INVENTION

1. Field of the Invention

The present invention relates to an information processing apparatus, an information processing method, and an information processing system.

2. Description of the Related Art

For example, there has been a conference support system that has various functions such as a video/audio recording and reproducing function, a board writing function, and a personal memo function. The conference support system integrates respective known systems that support the conference, and manages various contents (data) created by the known systems in association with respective conferences, and the managed contents can be referred to and utilized in association with each other (see, for example, Patent Document 1).

Patent Document 1: Japanese Unexamined Patent Application Publication No. 2006-146514

SUMMARY OF THE INVENTION

According to one aspect of the present invention, there is provided an information processing apparatus that is connected to and configured to perform data communication with a communication terminal, the information processing apparatus including processing circuitry; and a memory storing computer-executable instructions that cause the processing circuitry to display, on a display device of the communication terminal, a content by a web browser of the communication terminal of a participating user that is participating in a screen sharing event for sharing the content; determine, on a per-screen sharing event basis, a Uniform Resource Locator (URL) of a web page for causing the web browser, which is included in the communication terminal participating in the screen sharing event, to input and transmit information of the participating user; transmit the determined URL to the communication terminal of the participating user; and transmit participation data, in which the information of the participating user transmitted via the web page from the web browser of the communication terminal, and participation information indicating that the participating user has participated in the screen sharing event, are associated with each other.

BRIEF DESCRIPTION OF THE DRAWINGS

FIG. 13 is a configuration diagram illustrating an example of a personal memo management DB according to the first embodiment of the present invention;

FIG. 14 is a configuration diagram illustrating an example of a shared memo management DB according to the first embodiment of the present invention;

FIG. 15 is a configuration diagram illustrating an example of a personal memo DB according to the first embodiment of the present invention;

FIG. 16 is a configuration diagram illustrating an example of a shared memo DB according to the first embodiment of the present invention;

FIG. 17 is a configuration diagram illustrating an example of an interest level management DB according to the first embodiment of the present invention;

FIG. 18 is a configuration diagram of an example of a seminar association DB according to the first embodiment of the present invention;

FIG. 19 is a configuration diagram of an example of a seminar DB according to the first embodiment of the present invention;

FIG. 20 is a configuration diagram of an example of a user DB according to the first embodiment of the present invention;

FIG. 29 is an image diagram illustrating an example of a message screen according to the first embodiment of the present invention;

FIG. 30 is an image diagram illustrating an example of wordings in a confirmation e-mail according to the first embodiment of the present invention;

FIG. 36 is a diagram illustrating an example of the display of the personal portal screen according to the first embodiment of the present invention;

FIG. 37 is a diagram illustrating an example of the bibliographic information screen according to the first embodiment of the present invention;

FIG. 38 is a diagram illustrating an example of capture information of a bibliographic information screen according to the first embodiment of the present invention;

FIG. 39 is a diagram illustrating an example of capture information of a bibliographic information screen according to the first embodiment of the present invention;

DETAILED DESCRIPTION OF THE PREFERRED EMBODIMENTS

Figure 1:
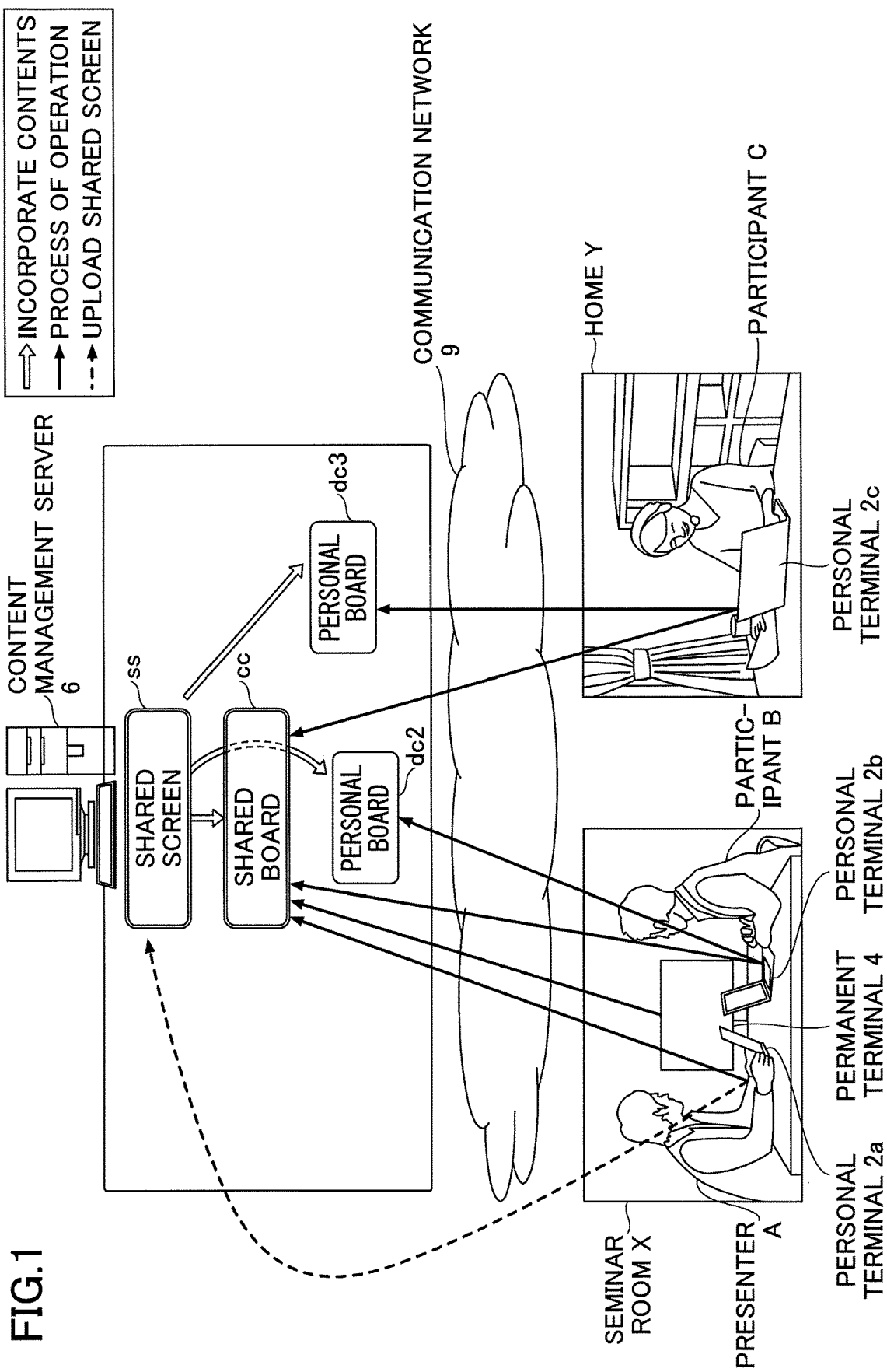
FIG. 1 is an overview diagram illustrating an information sharing system during a seminar according to a first embodiment of the present invention.

There are cases where a conference system of the related art is used for a seminar or the like, in which an unspecified number of users, such as people outside the company, participate. In cases where the organizer who holds such a seminar collects contact information (e.g. e-mail addresses) of the users (participants) who have participated in the seminar, it has been common for the participants to write in or input the information by using a questionnaire and the like.

However, by the method of using a questionnaire and the like to have the participants write in or input contact information, the participants may not necessarily write in or input the contact information, and, therefore, it has been difficult to efficiently collect and confirm the contact information of the participants. Note that the conference support system of Patent Document 1 is not capable of solving the above-described problem.

A problem to be addressed by an embodiment of the present invention is to provide an information processing apparatus that enables the organizer, etc., to efficiently confirm the information of participating users and the participation status.

Hereinafter, embodiments of the present invention will be described in detail with reference to the drawings. In the present embodiment, an example of an information sharing system used in a seminar will be described; however, the present embodiment is not limited thereto. The embodiment is not limited to seminars, and can be applied to a variety of information sharing systems as long as the information sharing system is used in an event that is held with more than one person participating, such as a lecture, a conference, a class, and the like. Note that to participate in the event to be held, the participants may actually gather together at the same location, or the participants may be present at different locations. Further, the present embodiment describes an example in which participants are connected remotely at different seminar rooms, etc.; however, all of the participants may be in the same room, and the presenter and the participants do not have to be physically distant from each other. In an embodiment of the present invention, a seminar or the like in which a plurality of terminal apparatuses are used and a participant, a presenter, and the like participate from their respective terminal apparatuses while sharing a screen or materials in the terminal apparatuses, is referred to as a remote seminar or a remote conference.

In a remote seminar, users such as administrative users who operate and implement the seminar and participating users who are invited to participate in the seminar, participate in the seminar by connecting to each other via a server apparatus, by using the user's own terminal apparatus (personal terminal, etc.). Note that the present embodiment is also applicable to events other than seminars, such as various meetings such as conferences and briefings, for the sharing of display screens, the sharing of information such as materials and images, and the sharing of videos and sound, by using the terminal apparatuses.

Further, the administrative users may also include, for example, users such as presenters and speakers who present the contents of the seminar to participants and administrators who manage the operation of the seminar. Further, participating users may include participants who voluntarily participate in the seminar upon becoming interested in the seminar, participants who are invited to participate in the seminar, students, viewers, and the like. The embodiment of the present invention is described assuming that the presenter that is the administrative user and the participant that is the participating user as described above participate in the seminar by using their respective personal terminals, and the seminar is implemented by transmitting the presentation contents from the personal terminal of the presenter and receiving the presentation contents by the personal terminal of the participant. Note that participants connecting to the seminar may all be referred to as participants, including the administrative users such as the presenter.

First Embodiment

<Overview of Information Sharing System During a Seminar According to the First Embodiment>

First, an overview of the information sharing system during a seminar will be described with reference to FIG. 1. FIG. 1 is an overview diagram of the information sharing system during a seminar. Here, it is illustrated that a presenter A and a participant B in a company's seminar room X and a participant C in a home Y or a remote seminar venue located away from the seminar room X, are holding a remote seminar by using the information sharing system. In the seminar room X, the presenter A brings in a personal terminal 2a, and the participant B brings in a personal terminal 2b. Further, the seminar room X is provided with a permanent terminal 4 that can be shared by the presenter A and the participant B. Note that the permanent terminal 4 is not essential. The information sharing system may have a configuration without the permanent terminal 4. At the home Y, etc., the participant C brings a personal terminal 2c. Hereinafter, the term "personal terminal 2" may be used to collectively refer to the personal terminals 2a, 2b, and 2c.

The personal terminal 2 is a computer that can be used and viewed (referred to) personally (for exclusive-use) by the presenter A, the participant B, and the participant C. The permanent terminal 4 is a computer that can be used and viewed jointly by the presenter A and the participant B.

The personal terminal 2 may be, for example, a notebook PC (Personal Computer), a desktop PC, a mobile phone, a smartphone, a tablet terminal, a wearable PC, and the like. The personal terminal 2 and the permanent terminal 4 are examples of communication terminals (or information processing terminals).

The permanent terminal 4 may be, for example, a Projector (PJ), an Interactive White Board (IWB: white board having an electronic blackboard function enabling mutual communication), a digital signage, a display coupled to a stick PC, and the like. The permanent terminal 4 is an example of a communication terminal (or information processing terminal) with a monitor for the purpose of being permanently installed in the seminar room. The permanent terminal 4 is, for example, an information processing terminal with a large-sized monitor that is permanently installed in the seminar room, and it is assumed that the permanent terminal 4 is used by the presenter A for applying the content to be shared on the screen. Note that the permanent terminal 4 is not an essential configuration.

The personal terminal 2 and the permanent terminal 4 can communicate with a content management server 6 via a communication network 9 such as the Internet. The communication network 9 may be one or more Local Area Networks (LANs) inside a firewall or may include the Internet outside the firewall in addition to the LAN. The communication network 9 may also include a Virtual Private Network (VPN) and a Wide Area Ethernet (registered trademark). The communication network 9 may be either wired or wireless, or may be a combination of wired and wireless networks. Also, when connected by a mobile phone network such as 3G, Long Term Evolution (LTE), 4G, or the like, the LAN is not needed.

The content management server 6 is a computer that functions as a web server (or a HyperText Transport Protocol (HTTP) server) that stores and manages the content data to be transmitted to the personal terminal 2 and the permanent terminal 4. The content management server 6 includes a storage unit 6000, which will be described later.

In the storage unit 6000, there is a storage location (or storage area) for implementing a personal board dc2 and dc3, that can only be accessed from each corresponding personal terminal 2b and 2c of the participant B and the participant C, respectively. Specifically, only each of the personal terminals 2b and 2c can access one of the corresponding personal boards dc2 and dc3. Hereinafter, the term "personal board dc" may be used to collectively refer to the personal boards dc2 and dc3.

The content management server 6 may support cloud computing. Cloud computing is a form of usage in which resources on a network are used without being aware of specific hardware resources.

Further, in the storage unit 6000 of the content management server 6, a storage location (or storage area) for implementing a shared board cc that can be accessed from the respective personal terminals 2a to 2c, is formed. Further, in the storage unit 6000 of the content management server 6, a storage location (or storage area) for implementing a shared screen ss that can be accessed from the respective personal terminals 2a to 2c, is formed.

The personal board dc and the shared board cc are a virtual space created in the storage location (or storage area) of the storage unit 6000 of the content management server 6. The personal board dc and the shared board cc can be accessed with a web application that includes a function for viewing and editing content, e.g., by canvas elements, JavaScript (registered trademark), and the like. A web application operates by the coordination of programs in a scripting language (e.g., JavaScript (registered trademark)) running on a web browser application (hereinafter referred to as a web browser) with programs in a web server, and indicates software used in a web browser or mechanisms thereof. The personal board dc and the shared board cc have a finite or infinite area within the storage area of the storage unit 6000. For example, the personal board do and the shared board cc may be finite or infinite in both longitudinal and lateral directions, or may be finite or infinite in one of longitudinal and lateral directions.

Further, the shared board cc is a virtual space created in the storage location (or storage area) of the storage unit 6000 of the content management server 6. Unlike the personal board dc and the shared board cc, the shared screen ss is provided with a function for simply holding content data to be transmitted (distributed) to the personal terminal 2b and 2c or the permanent terminal 4 and holding the previous contents until the next contents are acquired. The shared screen ss can be accessed by a web application that has a function of viewing content.

Further, the personal board dc is a personal electronic space exclusively used by each of the participants B and C participating in a remote seminar. The personal terminal 2b and 2c of each of the participants B and C can only access the personal board dc2 and dc3 for exclusive use by the participants B and C using the corresponding personal terminals 2b and 2c and view and edit (input, delete, copy, etc.) the contents such as characters, images, etc.

The shared board cc is a shared electronic space for the presenter A, the participant B, and the participant C participating in a remote seminar. Every one of the personal terminals 2a, 2b, and 2c of the presenter A, the participant B, and the participant C can access the shared board cc and view and edit contents such as characters and images.

Further, the shared screen ss is a shared electronic space for the personal terminals 2a to 2c and the permanent terminal 4 participating in a remote seminar. Every one of the personal terminals 2a to 2c and the permanent terminal 4 can access the shared screen ss and view the shared screen ss. However, unlike the personal board dc and the shared board cc, the shared screen ss has a function of holding content data transmitted from the personal terminal 2a by the presenter A and holding the previous contents until the next contents are acquired. For example, the shared screen ss displays a computer screen, such as an application screen, shared by the participants B and C, as screen content to be shared.

The content management server 6 manages information such as contents that are expanded in the shared screen ss, the shared board cc, and the personal board dc in association with each other, for each seminar held in a virtual seminar room (hereinafter, simply referred to as a room). Accordingly, even when multiple rooms are managed by the content management server 6, communication of content data between different rooms will not be performed.

The personal terminals 2b and 2c of the participants B and C can display the contents of the personal board dc, the shared board cc, and the shared screen ss of the seminar in which the participants participated, by the web application of the installed web browser, so that a seminar that is similar to a real seminar room can be held.

With such an information sharing system, the presenter A of the seminar can open a personal file by an application and share the personal file on the shared screen ss with the participants B and C. Further, the participants B and C can share handwriting, object arrangements, and the like by the shared board cc, incorporate content shared on the shared screen ss into the personal board dc as personal material, or store handwriting, object arrangements, and the like, as a personal memo in the personal board dc.

Figure 41:
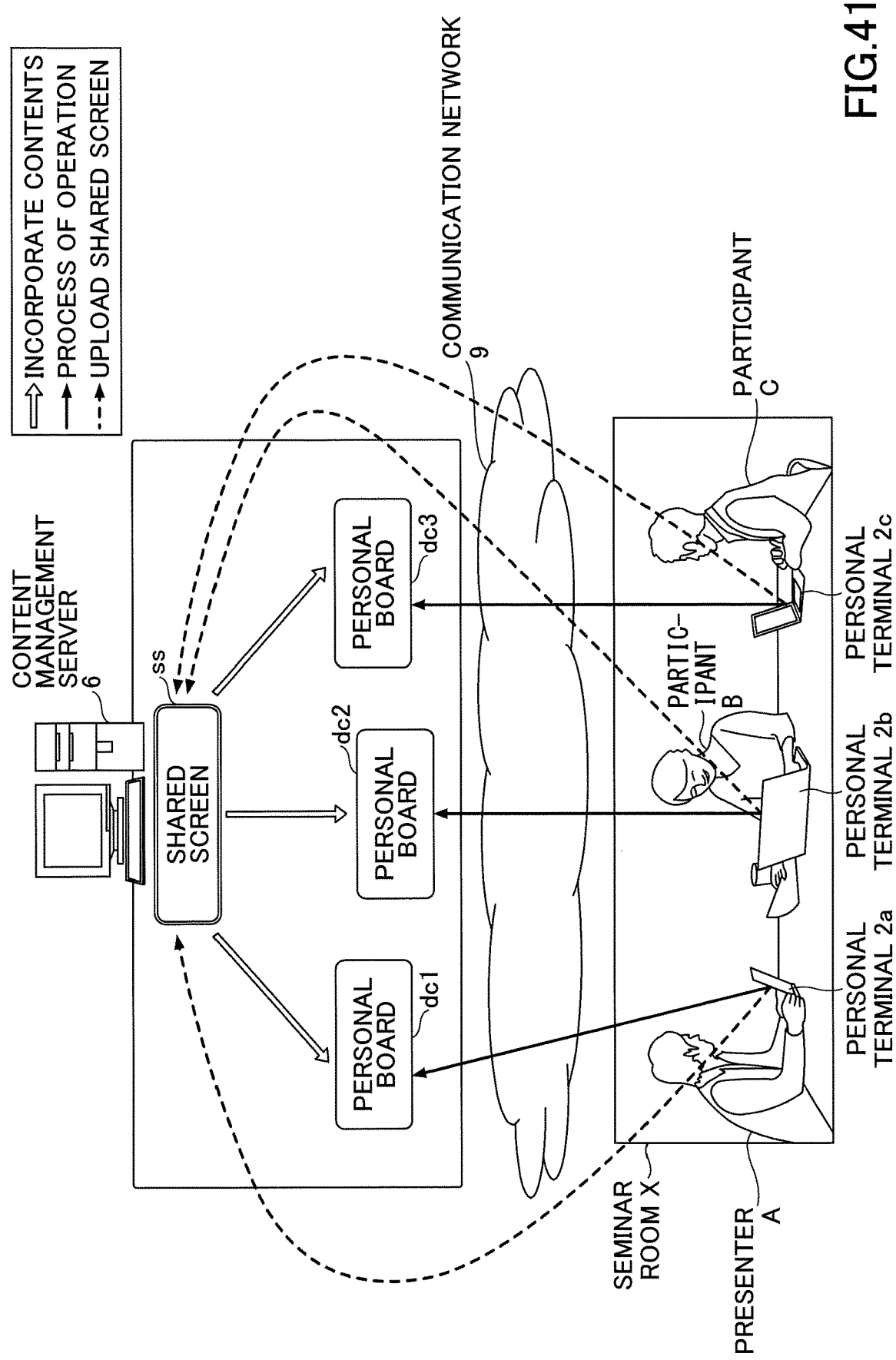
FIG. 41 is an overview diagram illustrating the information sharing system during a seminar according to the first embodiment of the present invention.

Note that the information sharing system of FIG. 1 is one example, and may not include any one or more of the shared screen ss, the shared board cc, and the personal board dc. For example, the information sharing system of FIG. 41 is an example formed of the shared screen ss and the personal board dc without the shared board cc. In the information sharing system of FIG. 41, each personal terminal 2 may display the contents of the personal board dc and the shared screen ss in the room in which the presenter and the participant participates, by the web application of the installed web browser.

<Overview of a Personal Portal in an Information Sharing System According to the First Embodiment>

Figure 2:
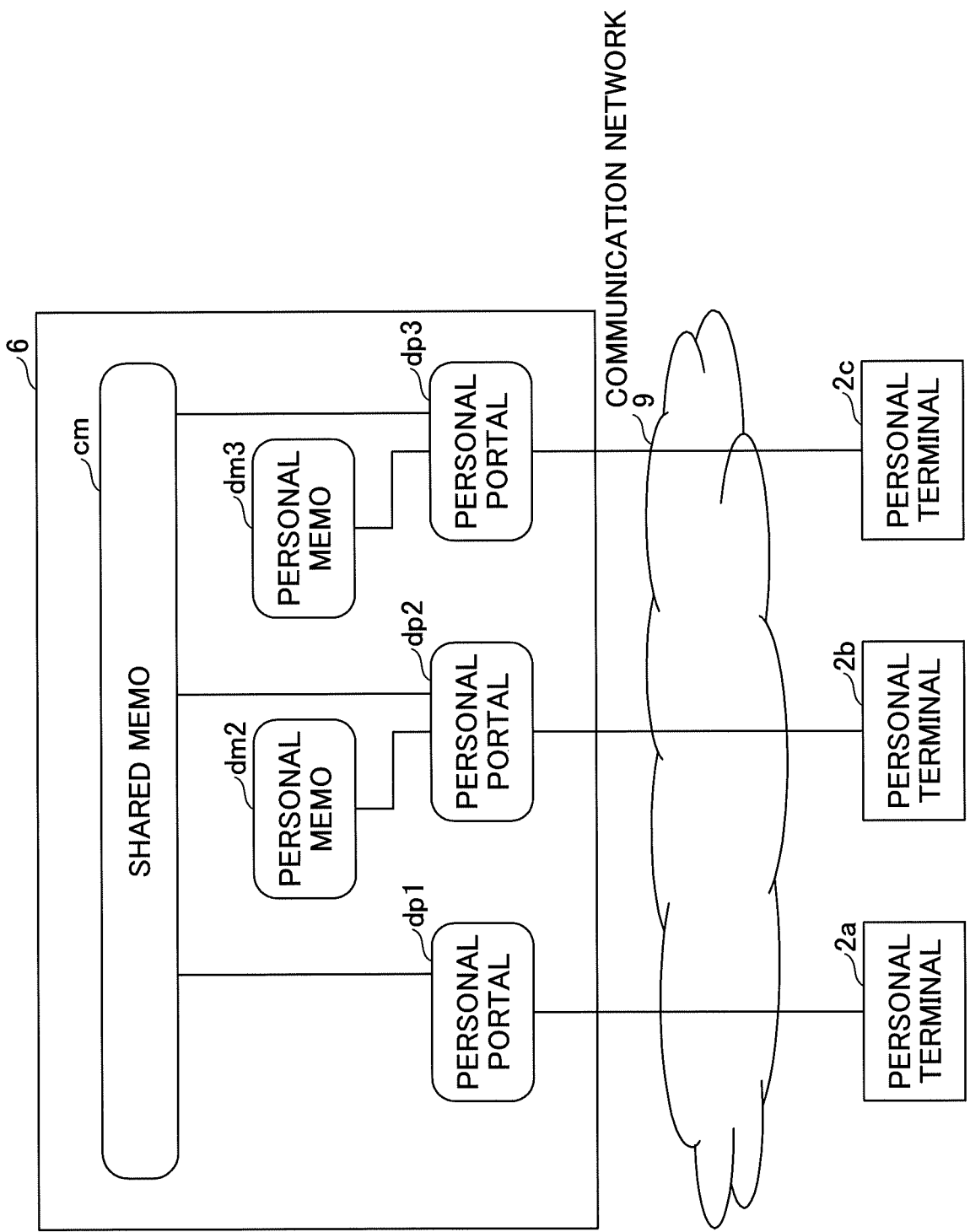
FIG. 2 is a diagram illustrating an example of an outline of a personal portal in an information sharing system according to the first embodiment of the present invention.

Next, an outline of a personal portal will be described with reference to FIG. 2. FIG. 2 is a diagram illustrating an example of an overview of a personal portal in the information sharing system. The content management server 6 generates data of personal portal screens dp1, dp2, and dp3, each being exclusively used by one of the personal terminals 2a, 2b, and 2c, and displays the generated data on each of the corresponding personal terminals 2a, 2b, and 2c. Hereinafter, the term "personal portal screen dp" may be used to collectively refer to the personal portal screens dp1, dp2, and dp3.

The content management server 6 stores and manages a shared memo cm, which is a content edited during the seminar in the shared board cc of FIG. 1, and personal memos dm2 and dm3, which are contents respectively edited by the personal boards dc. Hereinafter, the term "personal memo dm" may be used to collectively refer to the personal memos dm2 and dm3. Each of the presenter A, the participant B, and the participant C can access the personal portal screen dp exclusively used by the corresponding personal terminal 2a, 2b, and 2c to display a list of seminars in which each of the presenter A, the participant B, and the participant C operating the corresponding personal terminals 2a, 2b, and 2c has participated.

The participants B and C can display the shared memo cm, the personal memo dm, and bibliographic information of the seminar of each seminar, from the list of seminars displayed on the personal portal screen dp2 and dp3, as described below. Accordingly, the participants B and C can easily display the shared memo cm, the personal memo dm, and bibliographic information of the desired seminar, when reviewing the contents of the seminar and the like.

Further, from the list of seminars displayed on the personal portal screen dp1, the presenter A can display the shared memo cm of each seminar, the bibliographic information of each seminar, and interest level information of the participants B and C participating in the seminar, as described below. In addition to the presenter A, the organizer of the seminar may also be able to display the bibliographic information of the seminar and the interest level information of the participants B and C participating in the seminar.

Further, the presenter A and the participants B and C may be able to search for the desired seminar by using a keyword (characters), from the personal portal screen dp exclusively used by each of the personal terminals 2a, 2b, and 2c. The target of the character search includes bibliographic information of the seminars, text data and handwritten characters included in the personal memo dm, and the evaluation of the seminar by the participants B and C.

<Hardware Configuration According to the First Embodiment>

<<Computer According to the First Embodiment>>

Figure 3:
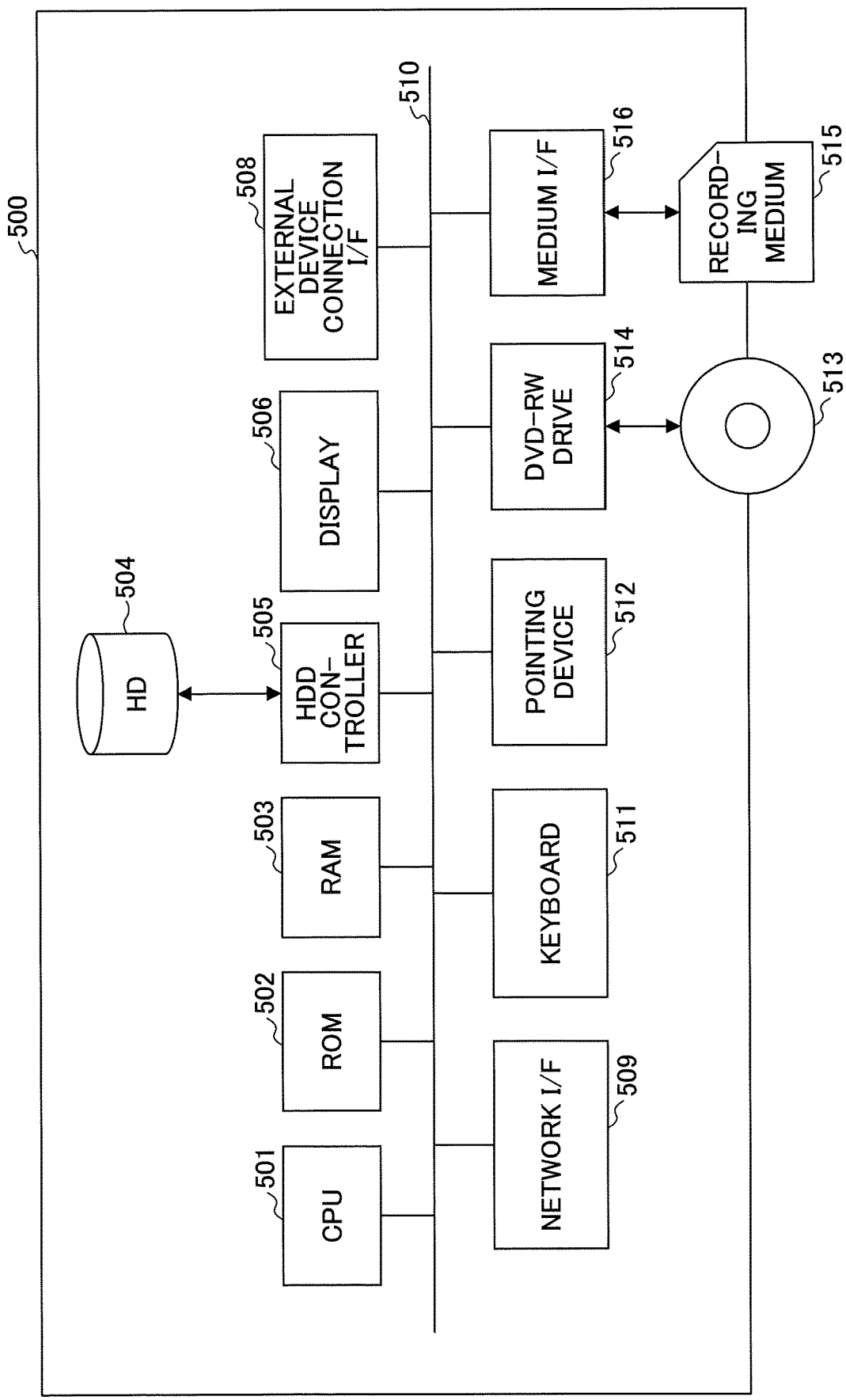
FIG. 3 is a hardware configuration diagram illustrating an example of a computer according to the first embodiment of the present invention.

The content management server 6 is implemented, for example, by a computer 500 having a hardware configuration illustrated in FIG. 3. Further, when the personal terminal 2a to 2c is a PC which is an example of an information processing terminal, the personal terminal 2 is implemented, for example, by the computer 500 having the hardware configuration illustrated in FIG. 3.

FIG. 3 is an example of a hardware configuration diagram of the computer 500 according to the present embodiment. As illustrated in FIG. 3, the computer 500 includes a Central Processing Unit (CPU) 501, a Read-Only Memory (ROM) 502, a Random Access Memory (RAM) 503, a Hard Disk (HD) 504, a HDD (Hard Disk Drive) controller 505, a display 506, an external device connection Interface (I/F) 508, a network I/F 509, a data bus 510, a keyboard 511, a pointing device 512, a Digital Versatile Disk Rewritable (DVD-RW) drive 514, and a medium I/F 516.

Among these, the CPU 501 controls the operations of the entire computer 500. The ROM 502 stores programs used to drive the CPU 501, such as an initial program loader (IPL). The RAM 503 is used as the work area of the CPU 501. The HD 504 stores various kinds of data such as programs. The HDD controller 505 controls the reading or writing of various kinds of data with respect to the HD 504 according to control by the CPU 501.

The display 506 displays various kinds of information such as a cursor, a menu, a window, characters, images, and the like. The external device connection I/F 508 is an interface for coupling various external devices. In this case, the external device may be, for example, a Universal Serial Bus (USB) memory or a printer. The network I/F 509 is an interface for performing data communication by using the communication network 9. The data bus 510 is an address bus, a data bus, and the like, for electrically coupling elements such as the CPU 501.

The keyboard 511 is a type of input means with a plurality of keys for inputting characters, numerical values, various instructions, and the like. The pointing device 512 is a type of input means for selecting and executing various instructions, selecting a processing target, moving a cursor, and the like. The DVD-RW drive 514 controls the reading or writing of various kinds of data with respect to a DVD-RW 513 that is an example of a removable recording medium. The removable recording medium is not limited to a DVD-RW, but may be a DVD-R, etc. The medium I/F 516 controls the reading or writing (storage) of data with respect to a recording medium 515, such as a flash memory.

<<Smartphone According to the First Embodiment>>

Figure 4:
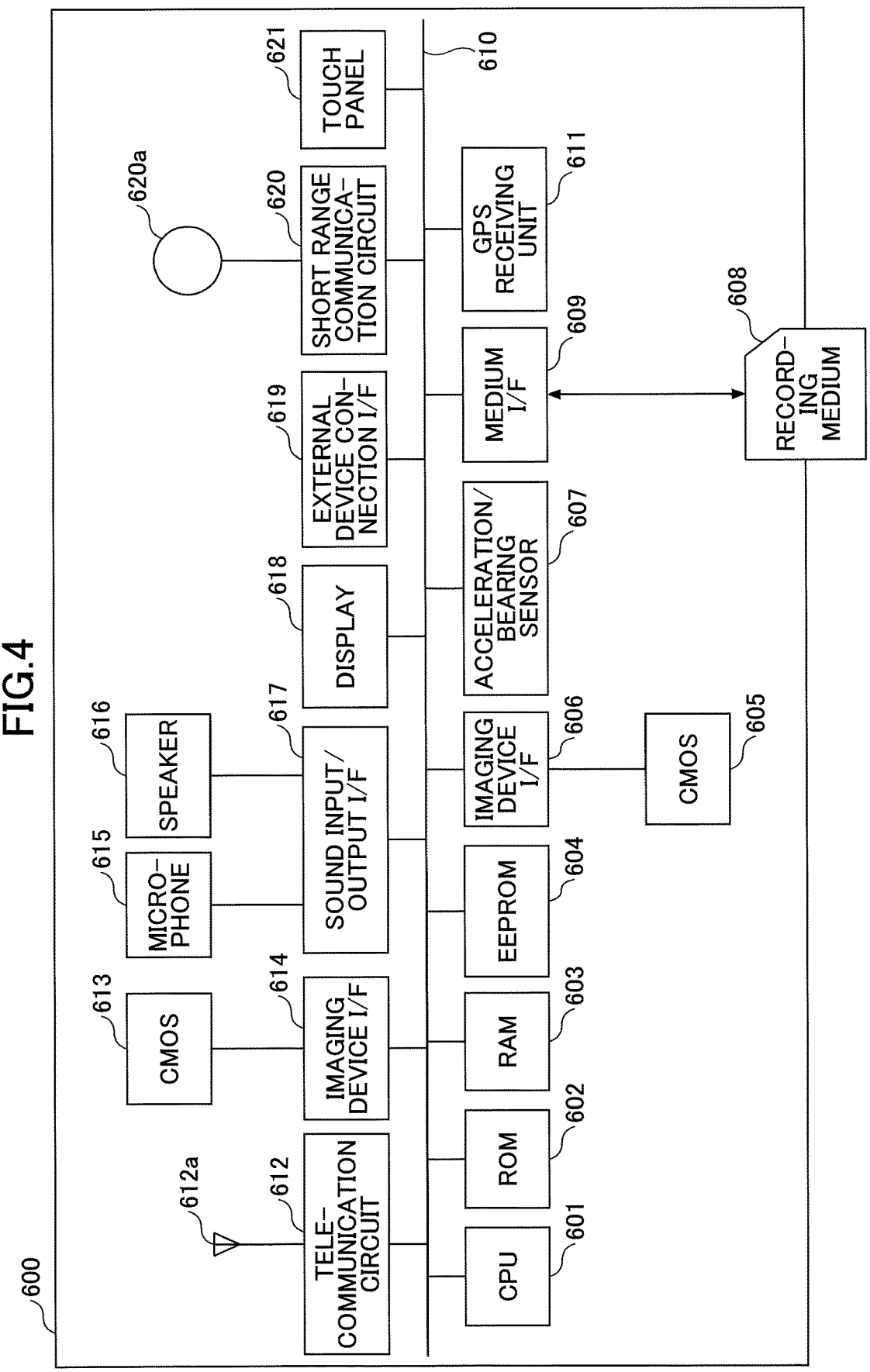
FIG. 4 is a hardware configuration diagram illustrating an example of a smartphone according to the first embodiment of the present invention.

The personal terminal 2, which is an example of the information processing terminal, may be implemented, for example, by a smartphone 600 having the hardware configuration illustrated in FIG. 4.

FIG. 4 is an example of a hardware configuration diagram of the smartphone 600 according to the present embodiment. As illustrated in FIG. 4, the smartphone 600 includes a CPU 601, a ROM 602, a RAM 603, an Electrically Erasable Programmable Read-Only Memory (EEPROM) 604, a Complementary Metal Oxide Semiconductor (CMOS) sensor 605, an imaging element I/F 606, an acceleration/bearing sensor 607, a medium I/F 609, and a Global Positioning System (GPS) receiving unit 611.

Among these, the CPU 601 controls the operations of the entire smartphone 600. The ROM 602 stores programs used in the CPU 601 and for driving the CPU 601, such as the IPL. The RAM 603 is used as the work area of the CPU 601. The EEPROM 604 reads out or writes various kinds of data, such as programs for smartphones, according to the control of the CPU 601.

The CMOS sensor 605 is a type of built-in imaging means that captures an image of a subject (mainly a self-image) and obtains image data according to the control by the CPU 601. Note that the imaging means may not be the CMOS sensor 605 but may be a Charge Coupled Device (CCD) sensor and the like. The imaging element I/F 606 is a circuit that controls the driving of the CMOS sensor 605. The acceleration/bearing sensor 607 is a variety of sensors, such as an electromagnetic compass, which detects geomagnetic fields, a gyrocompass, an acceleration sensor, and the like.

The medium I/F 609 controls the reading or writing (storage) of data with respect to a recording medium 608, such as a flash memory. The GPS receiving unit 611 receives the GPS signal from the GPS satellite.

The smartphone 600 also includes a telecommunication circuit 612, a CMOS sensor 613, an imaging element I/F 614, a microphone 615, a speaker 616, a sound input/output I/F 617, a display 618, an external device connection I/F 619, a short range communication circuit 620, an antenna 620a of the short range communication circuit 620, and a touch panel 621.

Among these, the telecommunication circuit 612 is a circuit for communicating with other devices via the communication network 9. The CMOS sensor 613 is a type of built-in imaging means that captures an image of a subject according to the control by the CPU 601 and obtains image data. The imaging element I/F 614 is a circuit that controls the driving of the CMOS sensor 613. The microphone 615 is a built-in circuit that converts sound to an electrical signal. The speaker 616 is a built-in circuit that converts electrical signals to physical vibrations to produce sound, such as music and speech.

The sound input/output I/F 617 is a circuit that processes the input and output of sound signals between the microphone 615 and the speaker 616 according to the control by the CPU 601. The display 618 is a type of display means such as a liquid crystal or an organic Electro Luminescence (EL) for displaying an image of a subject, various icons, and the like.

The external device connection I/F 619 is an interface for coupling various external devices. The short range communication circuit 620 is a communication circuit such as Near Field Communication (NFC) or Bluetooth (registered trademark). The touch panel 621 is a type of input means by which a user, such as the presenter A, the participants B and C, presses the display 618 to operate the smartphone 600.

Further, the smartphone 600 includes a bus line 610. The bus line 610 is an address bus, a data bus, and the like, for electrically coupling elements such as the CPU 601 illustrated in FIG. 4.

<<Projector According to the First Embodiment>>

Figure 5:
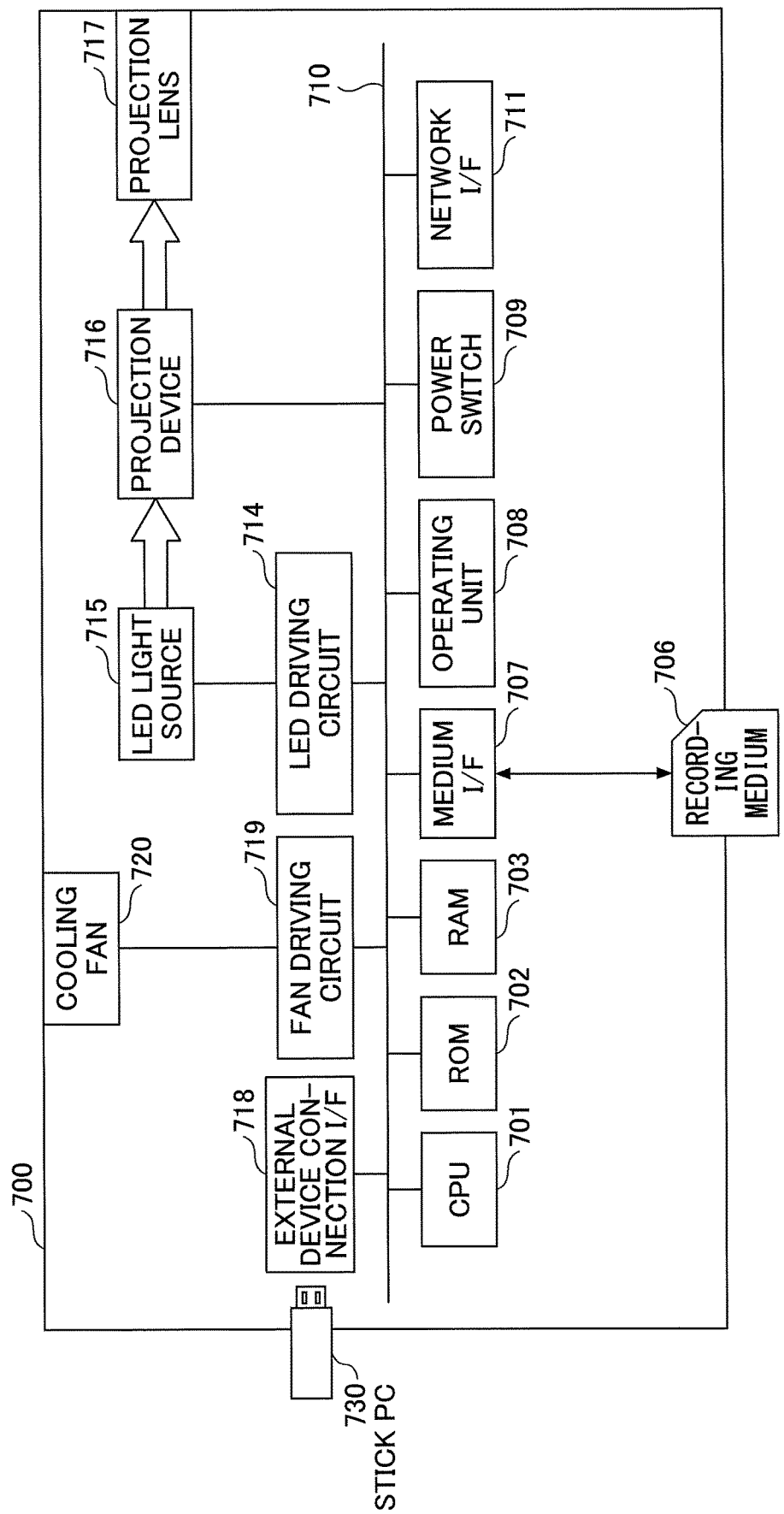
FIG. 5 is a hardware configuration diagram illustrating an example of a projector according to the first embodiment of the present invention.

The projector 700, which is an example of the permanent terminal 4, may be implemented, for example, by the hardware configuration illustrated in FIG. 5.

FIG. 5 is an example of a hardware configuration diagram of a projector 700 according to the present embodiment. As illustrated in FIG. 5, the projector 700 includes a CPU 701, a ROM 702, a RAM 703, a medium I/F 707, an operating unit 708, a power switch 709, a bus line 710, a network I/F 711, a Light Emitting Diode (LED) driving circuit 714, an LED light source 715, a projection device 716, a projection lens 717, an external device connection I/F 718, a fan driving circuit 719, and a cooling fan 720.

Among these, the CPU 701 controls the operations of the entire projector 700. The ROM 702 stores the programs used to drive the CPU 701. The RAM 703 is used as the work area of the CPU 701. The medium I/F 707 controls the reading or writing (storage) of data with respect to a recording medium 706, such as a flash memory.

In the operating unit 708, a variety of keys, buttons, LEDs, and the like are disposed, and are used by a user to perform various operations other than turning ON/OFF the power of the projector 700. For example, the operating unit 708 accepts an instruction operation such as an adjustment operation of the size of the projected image, an adjustment operation of the color tone, a focus adjustment operation, a keystone adjustment operation, and the like, and outputs the accepted operation content to the CPU 701.

The power switch 709 is a switch for switching the power of the projector 700 on and off. The bus line 710 is an address bus, a data bus, and the like for electrically coupling the elements such as the CPU 701 illustrated in FIG. 5. The network I/F 711 is an interface for performing data communication by using the communication network 9 such as the Internet.

The LED driving circuit 714 controls the turning on and off of the LED light source 715 under the control of the CPU 701. When the LED light source 715 is turned on by the LED driving circuit 714, the LED light source 715 irradiates the projection device 716 with a projection light. The projection device 716 projects modulated light, which is obtained by modulating the projection light from the LED light source 715 by spatial light modulation, as an image to a projection surface of a screen, through the projection lens 717, based on image data provided via the external device connection I/F 718 and the like. Examples of the projection device 716 include a liquid crystal panel or a Digital Micromirror Device (DMD).

The LED driving circuit 714, the LED light source 715, the projection device 716, and the projection lens 717 collectively function as a projecting unit (projecting means) for projecting a projection image onto a projection surface based on image data.

The external device connection I/F 718 is directly coupled to a Personal Computer (PC) and acquires control signals and image data from the PC. The external device connection I/F 718 is an interface for coupling to various external devices (such as a stick PC 730). The fan driving circuit 719 is coupled to the CPU 701 and the cooling fan 720 to drive/stop the cooling fan 720 based on a control signal from the CPU 701. The cooling fan 720 rotates to discharge air from the interior of the projector 700 and cool the interior of the projector 700.

When the power is supplied, the CPU 701 starts up according to a control program stored in the ROM 702 in advance, provides a control signal to the LED driving circuit 714 to turn on the LED light source 715, and provides a control signal to the fan driving circuit 719 to rotate the cooling fan 720 at a predetermined rated speed. Further, when the power supply from the power supply circuit is started, the projector 700 becomes ready for image display by the projection device 716, and furthermore, power is supplied from the power supply circuit to various other elements. Further, when the power switch 709 of the projector 700 is turned OFF, a power OFF signal is transmitted from the power switch 709 to the CPU 701.

When the CPU 701 detects a power OFF signal, the CPU 701 provides a control signal to the LED driving circuit 714 to turn off the LED light source 715. Thereafter, when a predetermined time elapses, the CPU 701 provides a control signal to the fan driving circuit 719 to stop the cooling fan 720, and terminates the control process of the CPU 701, and finally transmits an instruction to the power supply circuit to terminate the supply of power.

<<Interactive White Board According to the First Embodiment>>

Figure 6:
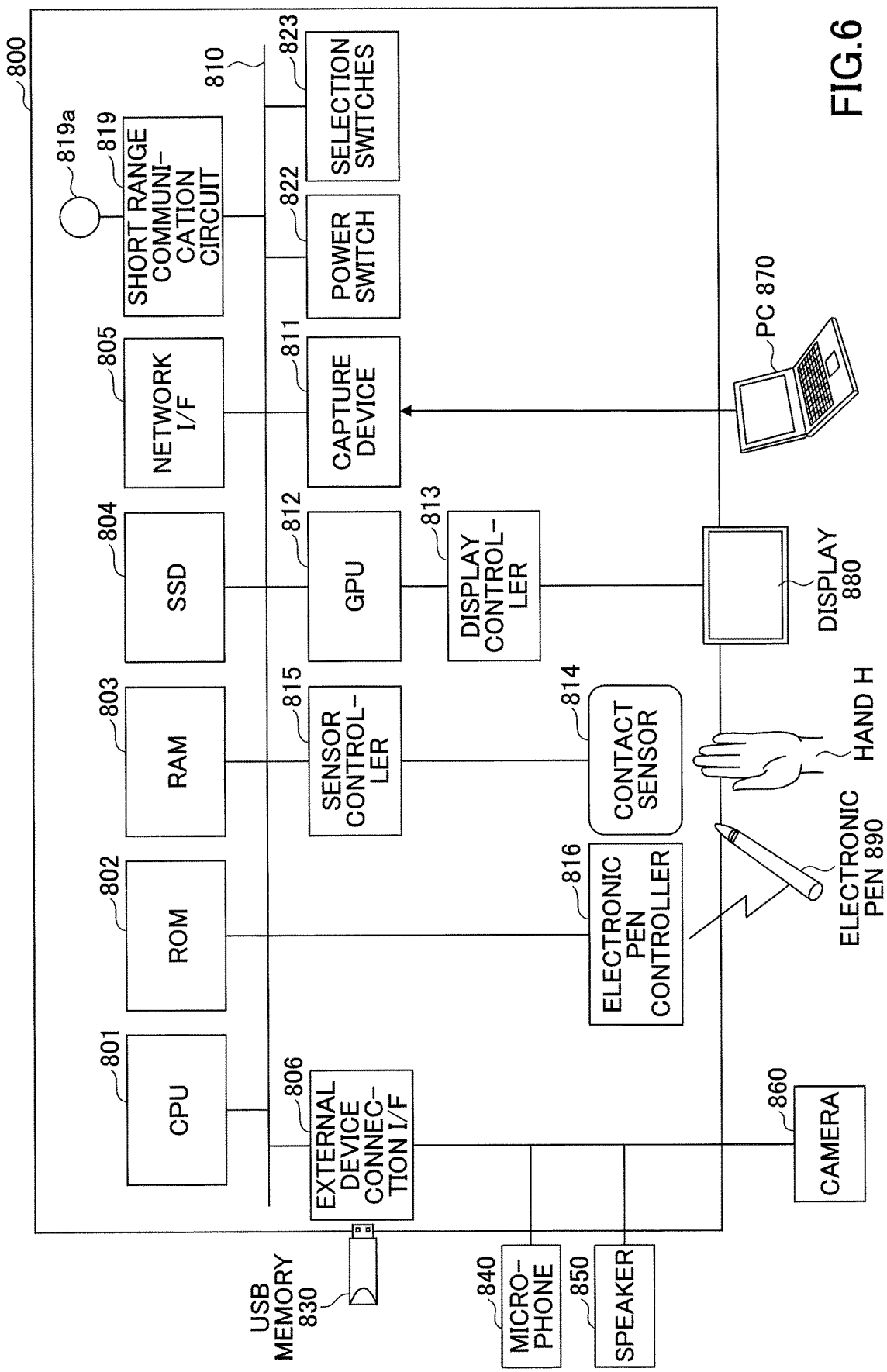
FIG. 6 is an example of a hardware configuration diagram illustrating an Interactive White Board (IWB) according to the first embodiment of the present invention.

The IWB 800, which is an example of the permanent terminal 4, may be implemented, for example, by the hardware configuration illustrated in FIG. 6.

FIG. 6 is an example of a hardware configuration diagram of an IWB 800 according to the present embodiment. As illustrated in FIG. 6, the IWB 800 includes a CPU 801, a ROM 802, a RAM 803, a Solid State Drive (SSD) 804, a network I/F 805, and an external device connection I/F 806.

Among these, the CPU 801 controls operations of the entire IWB 800. The ROM 802 stores programs used in the CPU 801 and for driving the CPU 801 such as IPL. The RAM 803 is used as the work area of the CPU 801. The SSD 804 stores various kinds of data, such as programs for the IWB. The network I/F 805 controls communication with the communication network 9. The external device connection I/F 806 is an interface for coupling to various external devices. The external device in this case is, for example, a USB memory 830, an external device (a microphone 840, a speaker 850, and a camera 860).

Further, the IWB 800 includes a capture device 811, a Graphics Processing Unit (GPU) 812, a display controller 813, a contact sensor 814, a sensor controller 815, an electronic pen controller 816, a short range communication circuit 819, an antenna 819*a* of the short range communication circuit 819, a power switch 822, and selection switches 823.

Among these, the capture device 811 causes a display of an external PC 870 to display video information as a still image or a moving image. The GPU 812 is a semiconductor chip that is exclusively used for handling graphics. The display controller 813 controls and manages the screen display to output an output image from the GPU 812 to a display 880 and the like.

The contact sensor 814 detects that an electronic pen 890, the user's hand H, or the like has come into contact with the display 880. The sensor controller 815 controls the processing by the contact sensor 814. The contact sensor 814 performs input of coordinates and detection of coordinates by an infrared interruption method. The method for inputting coordinates and detecting coordinates is a method in which two light emitting and receiving devices, which are located at both ends at the upper side of the display 880, emit a plurality of infrared rays parallel to the display 880, and the infrared rays are reflected by a reflecting member provided around the display 880, and the light returning on the same optical path as that of the emitted light, is received by a light receiving element.

The contact sensor 814 outputs, to the sensor controller 815, the ID of the infrared rays emitted by the two light emitting and receiving devices and interrupted by an object, and the sensor controller 815 identifies the coordinate position that is the contact position of the object. The electronic pen controller 816 communicates with the electronic pen 890 to determine whether the pen tip or the pen end is touching the display 880. The short range communication circuit 819 is a communication circuit such as NFC, Bluetooth, and the like. The power switch 822 is a switch for switching the power of the IWB 800 on and off. The selection switches 823 are a group of switches for adjusting, for example, the light and darkness and the coloring of the display by the display 880.

Further, the IWB 800 includes a bus line 810. The bus line 810 is an address bus, a data bus, and the like for electrically coupling elements such as the CPU 801 illustrated in FIG. 6.

The contact sensor 814 is not limited to an infrared interruption method. Various detection means may be used, such as a touch panel of an electrostatic capacitance method in which a contact position is identified by sensing a change in capacitance, a touch panel of a resistive film method in which a contact position is identified by a voltage change of two opposing resistive films, and an electromagnetic induction type touch panel in which an electromagnetic induction caused by a contact object contacting a display portion is sensed and a contact position is identified. Further, the electronic pen controller 816 may be used to determine not only whether the tip or the end of the electronic pen 890 is touching the display 880, but also whether the portion of the electronic pen 890 held by the user or another portion of the electronic pen 890 is touching the display 880.

<Functional Configuration According to the First Embodiment>

Figure 7:
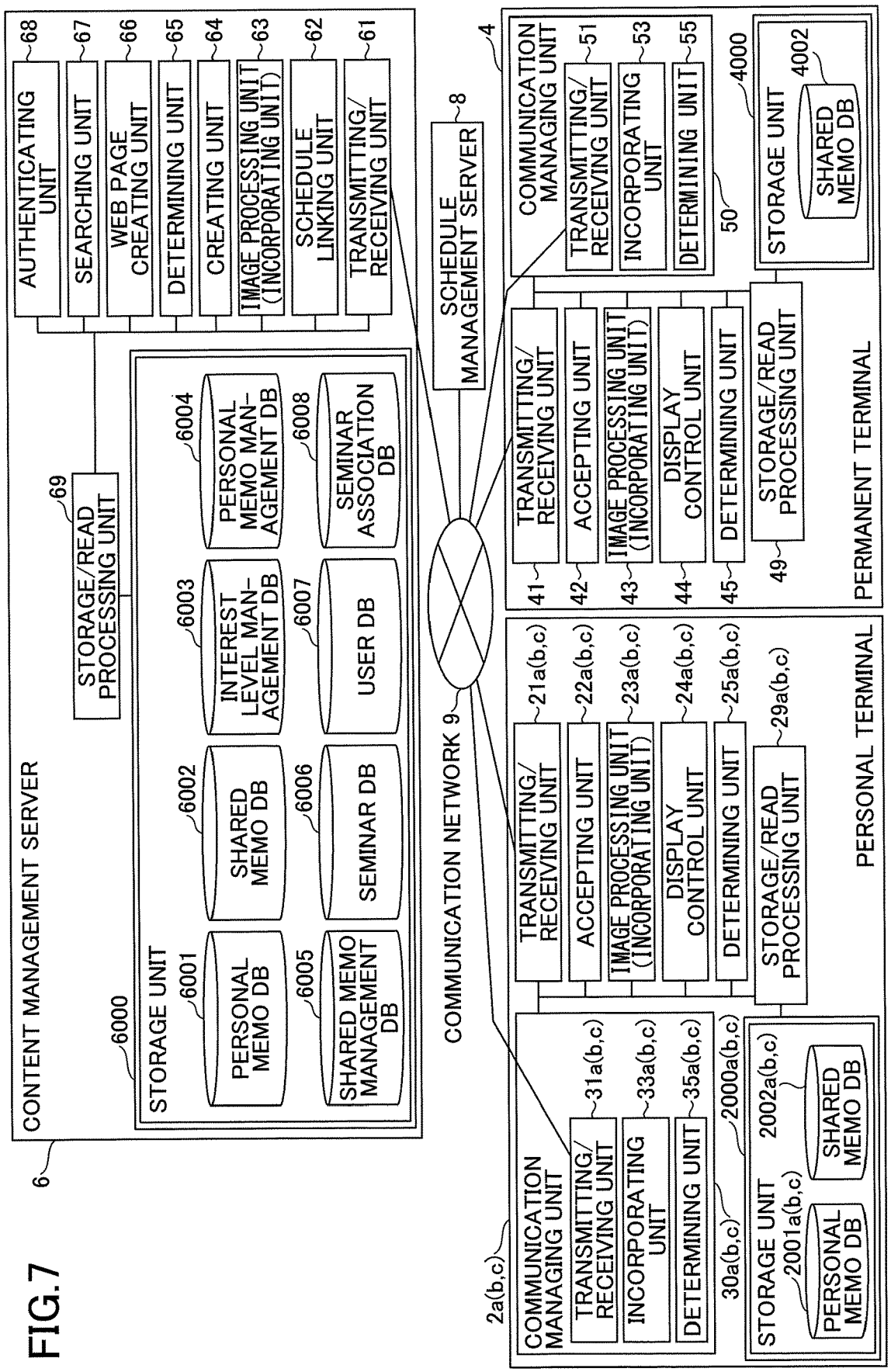
FIG. 7 is a functional block diagram illustrating each terminal and server constituting the information sharing system according to the first embodiment of the present invention.

A functional configuration of each terminal and server forming the information sharing system will be described with reference to FIG. 7. FIG. 7 is a functional block diagram illustrating each terminal and server forming the information sharing system.

<<Functional Configuration of a Personal Terminal According to the First Embodiment>>

First, the functional configuration of the personal terminal 2b will be described. As illustrated in FIG. 7, the personal terminal 2b includes a transmitting/receiving unit 21b, an accepting unit 22b, an image processing unit 23b, a display control unit 24b, a determining unit 25b, a storage/read processing unit 29b, and a communication managing unit 30b. Each of these units is a function or means for functioning implemented by operating one of the elements illustrated in FIG. 3 according to commands from the CPU 501 according to a program loaded from the HD 504 to the RAM 503. The personal terminal 2b includes a storage unit 2000b formed by the RAM 503 and the HD 504 illustrated in FIG. 3.

Note that the transmitting/receiving unit 21b, the accepting unit 22b, the image processing unit 23b, the display control unit 24b, the determining unit 25b, and the storage/read processing unit 29b are implemented by a web browser (a web application thereof) for displaying the web page to be described later. The communication managing unit 30b is implemented by an exclusive-use communication application.

(Functional Configuration)

Next, the functional configuration of the personal terminal 2b will be described in detail. The transmitting/receiving unit 21b transmits and receives various kinds of data (or information) with other terminals, devices, or servers via the communication network 9. For example, the transmitting/receiving unit 21b receives content data described in Hyper Text Markup Language (HTML), Cascade Style Sheet (CSS), and JavaScript (registered trademark), from the content management server 6. The transmitting/receiving unit 21b transmits the operation information input by the participant B to the content management server 6.

The accepting unit 22b accepts various kinds of input information from the keyboard 511 and the pointing device 512 input by a participant B. The image processing unit 23b performs, for example, a process such as creating vector data (or stroke data) according to rendering by the participant B. Further, the image processing unit 23b has a function as an incorporating unit. For example, the image processing unit 23b captures an image of the shared screen ss to incorporate the captured image.

The display control unit 24b displays a personal board screen and a shared board screen as described below, on the display 506. The determining unit 25b makes various determinations. The storage/read processing unit 29b is executed by a command from the CPU 501 and by the HDD controller 505, the medium I/F 516, and the DVD-RW drive 514, and performs processes for storing various kinds of data in the storage unit 2000b, the DVD-RW 513, and the recording medium 515, and for reading various kinds of data from the storage unit 2000b, the DVD-RW 513, and the recording medium 515.

The communication managing unit 30b is implemented mainly by a command from the CPU 501 illustrated in FIG. 3, and performs data input/output with the transmitting/receiving unit 21b and the like. The communication managing unit 30b further includes a transmitting/receiving unit 31b, an incorporating unit 33b, and a determining unit 35b.

Among these, the transmitting/receiving unit 31b transmits and receives various kinds of data (or information) with the content management server 6 via the communication network 9, independently of the transmitting/receiving unit 21b. The incorporating unit 33b basically has the same function as an incorporating unit of the image processing unit 23b. For example, the incorporating unit 33b captures the screen of the shared screen ss to be described later to incorporate the captured image. The determining unit 35b makes various determinations and determines, for example, whether the captured image is being referred to by the participant B. Note that the functional configurations of the personal terminal 2c are the same as the functional configurations of the personal terminal 2b, and, therefore, descriptions thereof will be omitted.

Further, the functional configurations of the personal terminal 2a are the same as the functional configurations of the personal terminal 2b; however, the display contents are different. For example, the display contents of the personal terminal 2b are in a reception mode. Further, the display contents of the personal terminal 2a are in a transmission mode or a projection mode. For example, in the personal terminal 2a, a screen for transmitting the contents to be presented by the presenter at the seminar may be displayed, a screen for having the presenter select a target screen (content) to be shared on the shared screen ss, a screen for displaying the interest level information of the participants B and C, and the like may be displayed.

<<Functional Configuration of a Permanent Terminal According to the First Embodiment>>

Next, a functional configuration of the permanent terminal 4 will be described. As illustrated in FIG. 7, the permanent terminal 4 includes a transmitting/receiving unit 41, an accepting unit 42, an image processing unit 43, a display control unit 44, a determining unit 45, a storage/read processing unit 49, and a communication managing unit 50. Each of these units is a function or means for functioning implemented by operating one of the elements illustrated in FIG. 5, etc., by commands from the CPU 701 according to a program loaded from the recording medium 706 into the RAM 702.

Note that each unit may be a function or a means for functioning in which any of the elements illustrated in FIG. 5 is implemented by operating according to a command from the CPU of the stick PC 730 in accordance with a program expanded on the RAM of the stick PC 730. Further, the permanent terminal 4 includes a storage unit 4000 constructed by the RAM 703 illustrated in FIG. 5, etc. In the storage unit 4000 of the permanent terminal 4, a shared memo DB 4002 is constructed.

Note that the transmitting/receiving unit 41, the accepting unit 42, the image processing unit 43, the display control unit 44, the determining unit 45, the storage/read processing unit 49, the communication managing unit 50, and the storage unit 4000 in the permanent terminal 4 are the same as the transmitting/receiving unit 21b, the accepting unit 22b, the image processing unit 23b, the display control unit 24b, the determining unit 25b, the storage/read processing unit 29b, the communication managing unit 30b, and the storage unit 2000b in the personal terminal 2b, respectively, and, therefore, descriptions thereof will be omitted. Further, the communication managing unit 50 of the permanent terminal 4 includes a transmitting/receiving unit 51, an incorporating unit 53, and a determining unit 55; however, these respectively have the same functions as the transmitting/receiving unit 31b, the incorporating unit 33b, and the determining unit 35b, and, therefore, descriptions thereof will be omitted.

Note that the transmitting/receiving unit 41, the accepting unit 42, the image processing unit 43, the display control unit 44, the determining unit 45, and the storage/read processing unit 49 are implemented by a web browser (a web application thereof) for displaying a web page to be described later. The communication managing unit 50 is implemented by an exclusive-use communication application.

The permanent terminal 4 displays a screen for accepting, from the presenter A or the organizer, a display operation of the setting mode or the code display mode, which will be described later. The permanent terminal 4 displays, for example, a web page of the setting mode or the code display mode for which the display operation has been accepted from the presenter A or the organizer.

<<Functional Configuration of a Content Management Server According to the First Embodiment>>

Next, the functional configuration of the content management server 6 will be described. As illustrated in FIG. 7, the content management server 6 includes a transmitting/receiving unit 61, a schedule linking unit 62, an image processing unit 63, a creating unit 64, a determining unit 65, a web page creating unit 66, a searching unit 67, an authenticating unit 68, and a storage/read processing unit 69. Each of these units is a function or means for functioning implemented by operating one of the elements illustrated in FIG. 3 by commands from the CPU 501 according to a program loaded from the HD 504 to the RAM 503. The content management server 6 includes a storage unit 6000 formed by the RAM 503 and the HD 504 illustrated in FIG. 3.

(Functional Configuration)

Next, the functional configuration of the content management server 6 will be described in detail. The transmitting/receiving unit 61 transmits and receives various kinds of data (or information) with other terminals, devices, or servers via the communication network 9. The schedule linking unit 62 acquires schedule information including bibliographic information of a seminar from a schedule management server 8 coupled to the communication network 9 to transmit and receive various kinds of data (or information). The schedule management server 8 stores schedule information (seminar (list) information) for each presenter (for each user ID).

The bibliographic information of the seminar included in the schedule information includes information of the date and time of the schedule (seminar), the start time and the end time, the seminar name, the location, the presenter, the schedule registerer, and the like. The content management server 6 can register the acquired bibliographic information of the seminar as the bibliographic information of the seminar in the shared memo management DB 6005. In particular, when the presenter or the organizer creates, in the content management server 6, a new seminar based on the schedule information that has been acquired, the schedule registerer included in the bibliographic information of the seminar is set as the organizer of the seminar and the role of the organizer of the seminar is registered with respect to the user ID of the schedule registerer.

The image processing unit 63 functions as an incorporating unit and captures the screen of the shared screen ss, which will be described later, to incorporate the captured screen. The creating unit 64 creates a unique content ID, a personal memo ID, a shared memo ID, and the like. The determining unit 65 determines whether the content ID, the personal memo ID, the shared memo ID, and the like are received by the transmitting/receiving unit 61.

The web page creating unit 66 creates data of a web page to be displayed on a web browser of the personal terminal 2 and the permanent terminal 4. Note that the web page creating unit 66 does not necessarily need to once again create the content in the web page that is not changed by the page update, such as an input field or buttons in the web page, each time the web page is updated. In this case, the personal terminal 2 and the permanent terminal 4 uses, for example, the content of the web page previously created.

The searching unit 67 accepts a search request from a personal portal screen described later displayed on the web browser of the personal terminal 2, and performs a searching process according to the search request. Further, the authenticating unit 68 performs a process of authenticating the presenter A and the seminar organizer. The authenticating unit 68 may perform a process of authenticating the participants B and C, by using contact information collected from the participants B and C of the seminar as described below. The authenticating unit 68 may be included in a device other than the content management server 6, and for example, an authentication server coupled to the communication network 9 may be used.

The storage/read processing unit 69 is executed by a command from the CPU 501, the HDD controller 505, the medium I/F 516, and the DVD-RW drive 514, and performs a process for storing various kinds of data in the storage unit 6000, the DVD-RW 513, and the recording medium 515, and performs a process for reading various kinds of data from the storage unit 6000, the DVD-RW 513 and the recording medium 515.

Further, a personal memo DB 6001, a shared memo DB 6002, an interest level management DB 6003, a personal memo management DB 6004, a shared memo management DB 6005, a seminar DB 6006, a user DB 6007, and a seminar association DB 6008 are formed in the storage unit 6000 of the content management server 6.

Note that the data described above may be stored in a separate server other than the content management server 6. In this case, with respect to the timing of data acquisition and transmission, the data may be acquired from a separate server each time a request for data acquisition and transmission is made from the personal terminal 2, or the data may be stored in the content management server 6 during a seminar or while the personal board dc and the shared board cc are referred to by the participant B or C, and may be deleted from the content management server 6 after the seminar has ended or after the end of the referring (or after a certain period of time) and may be sent to a separate server.

Note that the group of devices described in the present embodiment is merely indicative of one of a plurality of computing environments for carrying out the embodiments described herein. In some embodiments, the content management server 6 includes a plurality of computing devices, such as server clusters. The plurality of computing devices is configured to communicate with each other via any type of communication link, including networks, a shared memory, and the like, and performs the processes described herein. Similarly, the personal terminal 2 and the permanent terminal 4 may include a plurality of computing devices configured to communicate with each other.

Further, the content management server 6, the personal terminal 2, and the permanent terminal 4 can be configured to share the described processing steps by various combinations. For example, a portion of the process executed by the content management server 6 may be executed by the personal terminal 2 and the permanent terminal 4. Further, the elements of the content management server 6, the personal terminal 2, and the permanent terminal 4 may be grouped into a single device or divided into a plurality of devices.

<Example of a Personal Board Screen According to the First Embodiment>

Display examples of a personal board screen 1000 displayed until the end of a seminar will be described. The personal board screen 1000 is a screen for displaying information to be presented to the participant or for accepting operations from the participant through a Graphical User Interface (GUI), and is a display mode of a web browser or application software.

Figure 8:
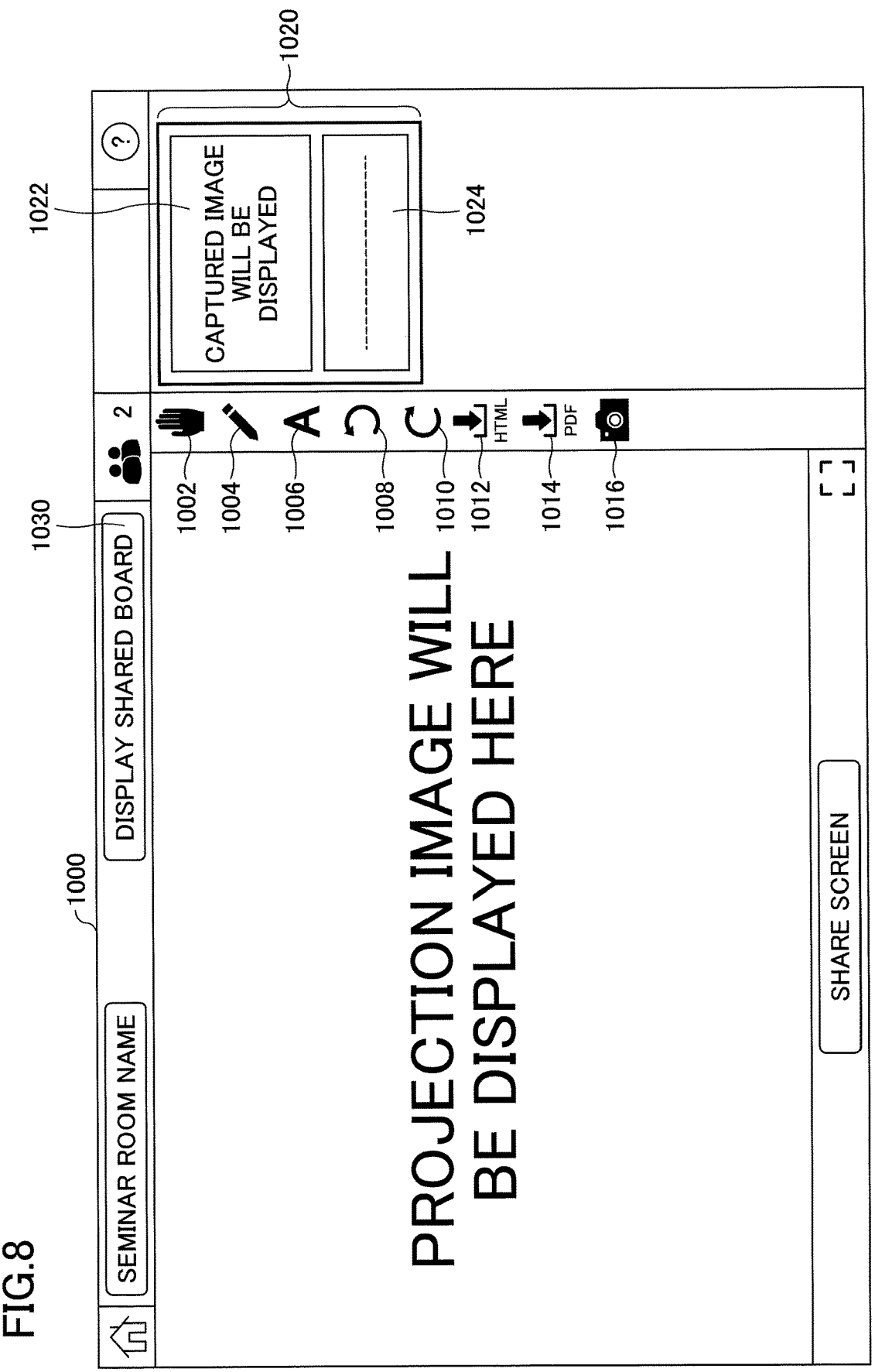
FIG. 8 is an image diagram illustrating an example of a projection screen display and a personal board screen before the first screen capture is performed according to the first embodiment of the present invention.
Figure 9:
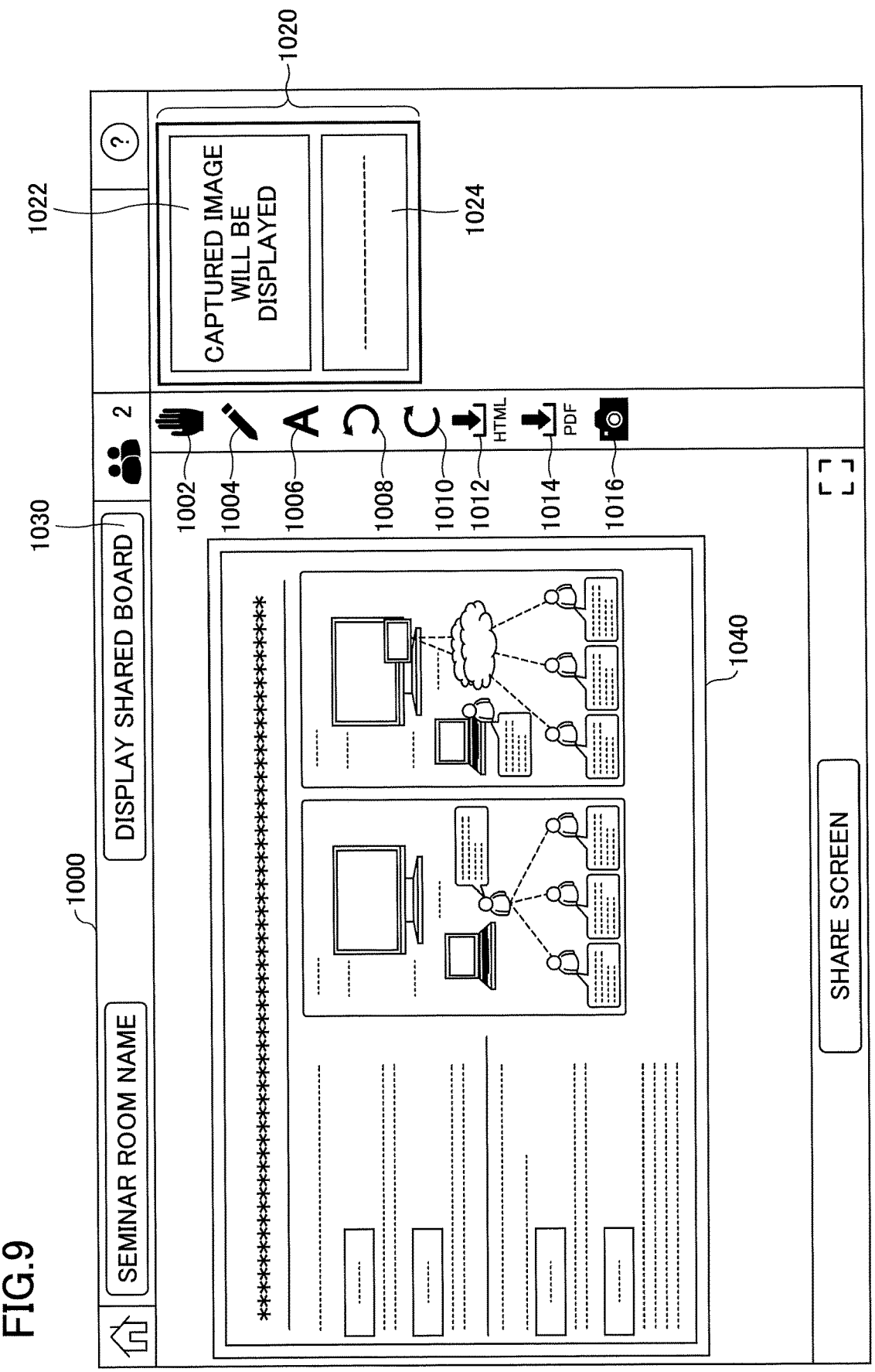
FIG. 9 is an image diagram of an example of a personal board screen on which a projection screen is displayed according to the first embodiment of the present invention.
Figure 10:
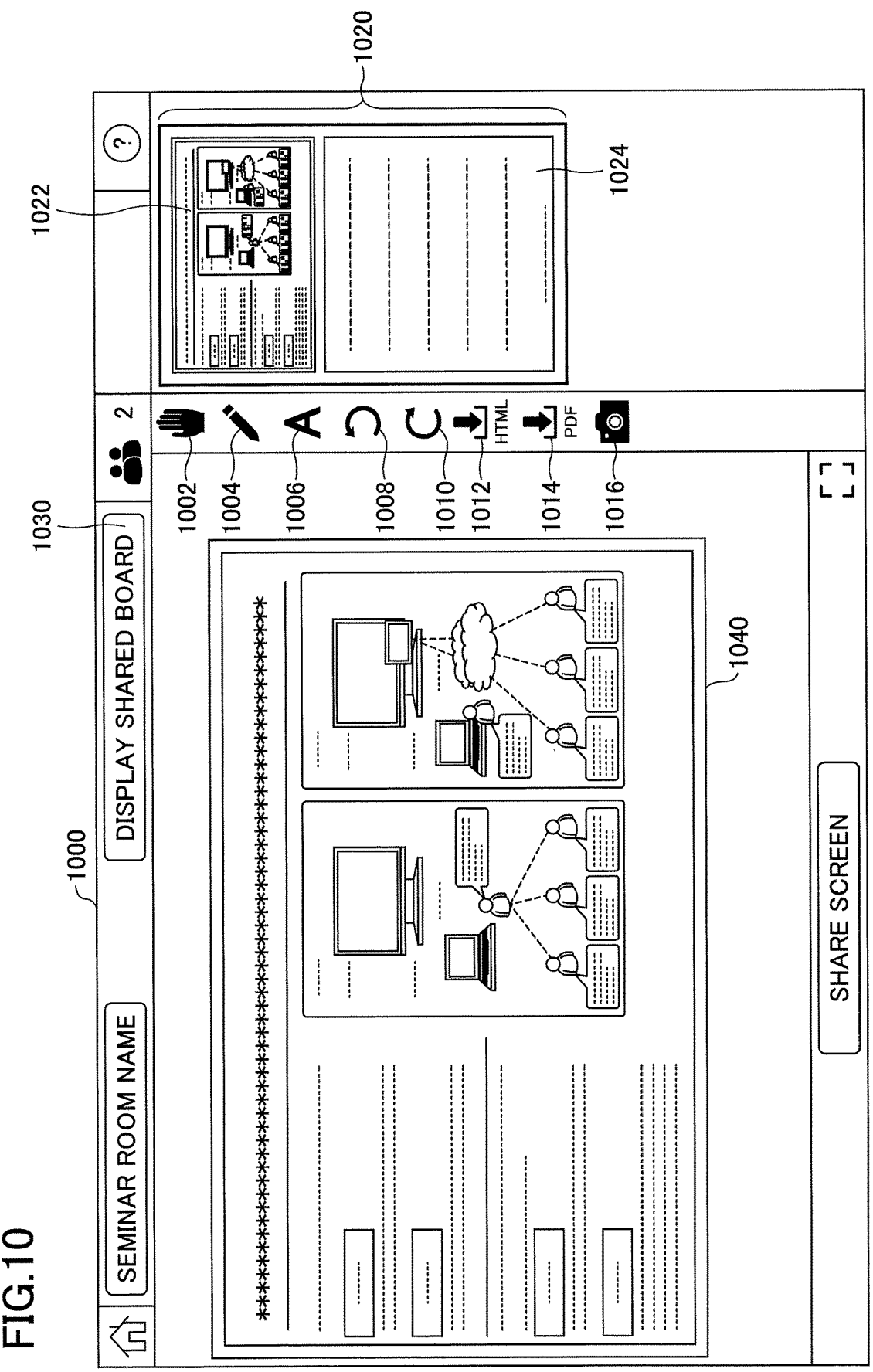
FIG. 10 is an image diagram illustrating an example of a personal board screen for which the first screen capture has been performed according to the first embodiment of the present invention.

As illustrated in FIGS. 8 to 10, in the personal board screen 1000 displayed until the end of the seminar, a projection area for displaying a projection screen is displayed on the left side and a memo area is displayed on the right side. In the projection area, the shared screen ss is displayed as a projection screen. In the memo area, a combination of a captured image 1022 of the projection screen and a text memo area 1024 associated with the captured image 1022 is displayed in a sheet 1020 on a per-combination basis.

The participant can perform an operation of pressing a capture button 1016 to capture the projection screen displayed in the projection area, to additionally display the sheet 1020 in which the combination of the captured image 1022 and the text memo area 1024 is displayed, in the memo area. Note that the operation of pressing the capture button 1016 is an example; for example, an operation of pressing a shortcut key from the keyboard or a gesture operation from the touch panel may be performed.

FIG. 8 is an image diagram of an example of the personal board screen 1000 before a projection screen is displayed and before performing screen capturing of the first sheet. For example, in the personal board screen 1000 of FIG. 8, a guidance message reading "projection image will be displayed here" is displayed in the projection area. In the memo area of FIG. 8, a guidance message reading "captured image will be displayed" is displayed as the captured image 1022. By displaying such a guidance message, the participant can imagine the screen image after the screen capturing is performed, before the screen capturing of the first sheet is performed in the personal board screen of FIG. 8. Note that the guidance message may not be displayed. Further, even before the screen capturing of the first sheet is performed, a participant's input to the text memo area 1024 may be acceptable.

When the data of a content, such as stream data, is transmitted to the shared screen ss, the personal board screen 1000 of FIG. 8 becomes the personal board screen 1000 as illustrated in FIG. 9. FIG. 9 is an image diagram illustrating an example of the personal board screen 1000 in which a projection screen 1040 is displayed. In the projection area of FIG. 9, a screen of a content such as stream data transmitted to the shared screen ss, is displayed as the projection screen 1040.

When the personal board screen 1000 of FIG. 9 accepts an operation of pressing the capture button 1016 from a participant, the personal board screen 1000 of FIG. 10 is formed. FIG. 10 is an image diagram illustrating an example of the personal board screen 1000 when the screen capturing of a first sheet has been performed. For example, the personal board screen 1000 illustrated in FIG. 10 is an example of a user interface (UI) in which the shared screen ss and the personal board dc are displayed in a single screen. Note that the personal board screen 1000 may be a UI that switches the display between the shared screen ss and the personal board dc by switching tabs.

By performing an operation of pressing the capture button 1016 by the participant, it is possible to capture an image of the projection screen 1040 at that time, and display the captured image 1022 of the projection screen 1040 in the memo area. Further, the participant may display the text memo area 1024 associated with the captured image 1022 in the memo area. The captured image 1022 and the text memo area 1024 associated with the captured image 1022 are displayed, for example, on the single sheet 1020, so that the combination of the captured image 1022 and the text memo area 1024 is displayed to be easily recognizable as a combination. Note that when the operation of pressing the capture button 1016 is accepted from the participant, the projection screen 1040 at that time may be compared with the captured image 1022 of the projection screen 1040 that has already been captured and displayed in the memo area, so that an image of the same content is not captured.

Further, the mouse cursor is aligned with the first line in the text memo area 1024 that is newly displayed by an operation of pressing the capture button 1016 by the participant. Accordingly, the participant can easily shift from the operation of pressing the capture button 1016 to operating the text memo area 1024. Note that the text memo area 1024 extends downward finitely or infinitely by input of a text memo by the participant.

Further, in the captured image 1022, an object may be rendered by using a pen tool and the like. In the personal board screen 1000, a tool palette displaying a hand tool button 1002, a pen tool button 1004, a text tool button 1006, an undo button 1008, a redo button 1010, an HTML save button 1012, a Portable Document Format (PDF) save button 1014, and the capture button 1016, is displayed.

The hand tool button 1002 is a button for the participant to start using a hand tool. By using the hand tool, the participant can select an object rendered in the captured image 1022 and move the object by drag and drop. The pen tool button 1004 is a button for the participant to start using the pen tool. By using the pen tool, the participant can select a color or line thickness and render an object in the captured image 1022.

The text tool button 1006 is a button for the participant to start using a text tool. By using the text tool, the participant can create a text area in the captured image 1022 and input text. The undo button 1008 is a button for undoing the work performed. The redo button 1010 is a button for redoing the work undone with the undo button 1008.

The HTML save button 1012 is a button for locally storing information of the personal board screen 1000 in an HTML file. The PDF save button 1014 is a button for locally storing the captured image 1022 and the text memo area 1024 displayed in the memo area of the personal board screen 1000, in a PDF file. The capture button 1016 is a button for capturing the projection screen 1040 displayed in the projection area and additionally displaying the sheet 1020 in which a combination of the captured image 1022 and the text memo area 1024 is displayed, in the memo area.

Note that it may be possible to delete an object rendered in the captured image 1022 by using a Delete key or a Back Space key. Further, the sheet 1020 may be deleted by using the Delete key or the Back Space key.

While performing editing, such as rendering an object into the captured image 1022 and inputting a text memo into the text memo area 1024, the projection area may be reduced so that the memo area can be enlarged, to facilitate editing operations. The projection area may be reduced and the memo area may be enlarged automatically by a web application, or by an operation by a participant of moving the tool palette to the left.

Figure 11:
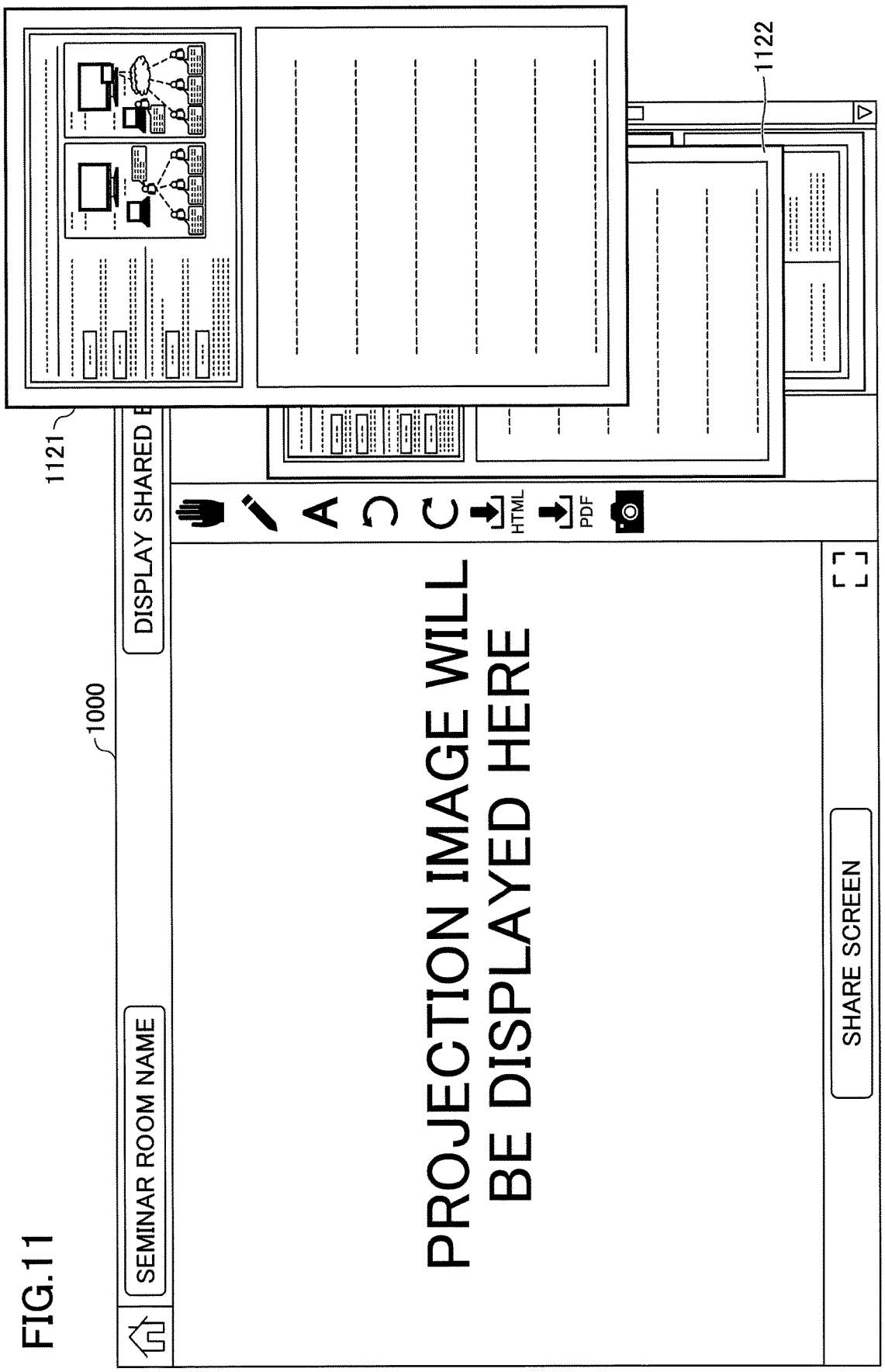
FIG. 11 is an image diagram illustrating an example of a personal board screen for accepting editing to a sheet from a participant during a seminar according to the first embodiment of the present invention.

Further, as illustrated in FIG. 11, in the personal board screen 1000 during a seminar, the participant may display the sheet 1020 selected from the memo area, and display the sheet as an enlarged sheet 1122 or display the sheet in a separate window 1121. FIG. 11 is an image diagram of an example of the personal board screen 1000 for accepting an editing operation with respect to the sheet from a participant during a seminar.

Further, for example, the sheet 1020 during editing of the captured image 1022 or the text memo area 1024 may be enclosed by a frame border or the color of the sheet 1020 may be changed, so as to facilitate visual recognition of the sheet 1020.

Note that the memo area is not limited to being displayed on the right side of the personal board screen 1000, but may be displayed on the left side, or may be displayed on the lower side. By performing an operation of pressing the capture button 1016, the participant can capture an image of the projection screen 1040 displayed in the projection area, and additionally display the sheet 1020 in which the combination of the captured image 1022 and the text memo area 1024 is displayed, in the memo area.

Further, the personal board screen 1000, which has accepted a plurality of operations of pressing the capture button 1016 from the participant, displays a plurality of the sheets 1020 in the memo area. In the personal board screen 1000, a plurality of the sheets 1020 are additionally displayed so as to be arranged in the vertical direction of the memo area, every time a participant performs an operation of pressing the capture button 1016.

Next, a display example of a personal board screen 1100 after the seminar is ended is described with reference to FIG. 12. The personal board screen 1100 is a screen for displaying information to be presented to a participant by a GUI or for accepting an operation from a participant, and is a display mode of a web browser or application software.

Figure 12:
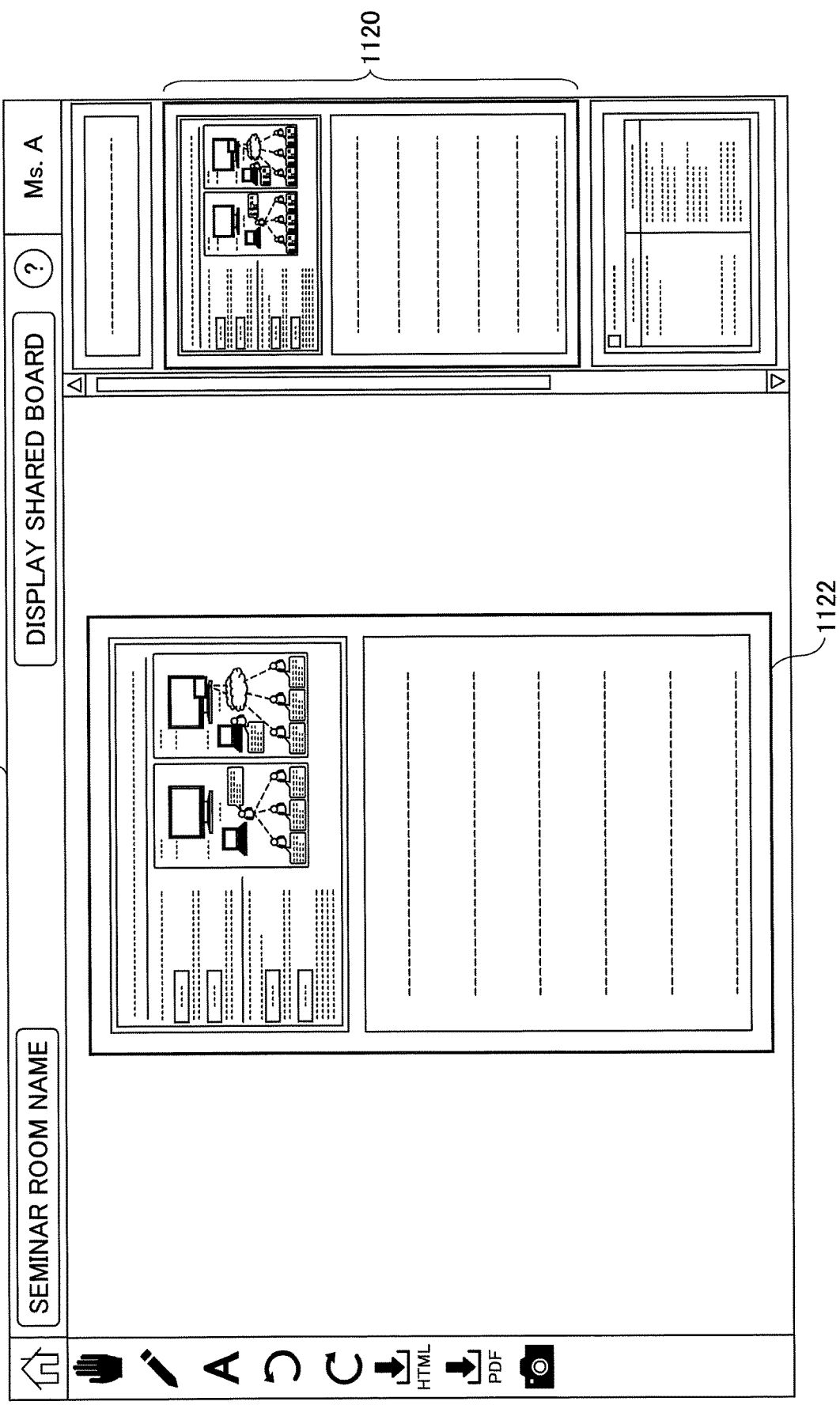
FIG. 12 is an image diagram illustrating an example of a personal board screen after the seminar has ended according to the first embodiment of the present invention.

FIG. 12 is an image diagram of an example of the personal board screen 1100 after a seminar has ended. In the personal board screen 1100 after a seminar has ended illustrated in FIG. 12, a memo area similar to that of the personal board screen 1000 is displayed on the right side, and an enlarged sheet area is displayed on the left side. In the enlarged sheet area, the enlarged sheet 1122 of the sheet 1120 selected by the participant from the memo area is displayed. Similar to the case of during a seminar, the enlarged sheet 1122 allows editing by the participant such as rendering objects into the captured image 1022 and inputting text memos into the text memo area 1024.

In the memo area of the personal board screen 1100, a list of all of the sheets 1120 are displayed vertically. The participant can scroll up and down the memo area. The participant may display the sheet 1120 selected from the memo area as the enlarged sheet 1122 in the enlarged sheet area on the left side.

Note that as will be described later, the personal terminal 2 displaying the personal board screen 1100 transmits information of the sheet 1120 selected by the participant from the memo area and information of the sheet 1120 displayed for a certain time or more as the enlarged sheet 1122, to the content management server 6, to cause the content management server 6 to record the information as the number of times the sheet 1120 is referred to. Further, the number of times the sheet 1120 is referred to may also be considered so that the first sheet, which is more visible due to the arrangement in the memo area, is not over-counted.

Further, the personal terminal 2 may transmit, to the content management server 6, the edited contents with respect to the sheet 1120 or the enlarged sheet 1122, for example, at a timing when a click operation is accepted at portions other than the currently selected sheet 1120 or the enlarged sheet 1122. Further, the display of the memo area such as that of FIG. 12, is one example, and instead of displaying the sheet 1120, for example, the number or a character summary of the sheet 1120 may be displayed.

<DB Configuration According to the First Embodiment>
<<Personal Memo Management DB According to the First Embodiment>>

FIG. 13 is a configuration diagram of an example of the personal memo management DB 6004. In the storage unit 6000 of the content management server 6, the personal memo management DB 6004 as illustrated in FIG. 13 is constructed. In FIG. 13, the personal memo management DB 6004 manages a personal memo ID, a user ID, a seminar ID, a sheet ID, and a captured image in association with each other.

The item "personal memo ID" is an example of personal memo identification information that identifies the personal memo dm of the personal board dc. The item "user ID" is an example of user identification information that identifies the participant. The item "seminar ID" is an example of seminar identification information that identifies a seminar held in a room. The item "sheet ID" is an example of sheet identification information that identifies the sheets 1020 and 1120. The item "captured image" is an example of image file identification information that identifies the image file obtained by capturing an image of the projection screen 1040.

When the user ID of the participant who operates the personal terminal 2 is identified by the personal memo management DB 6004 illustrated in FIG. 13, it is possible to identify the seminar ID of the seminar held in the room in which the participant has participated and the personal memo ID. Further, by the personal memo management DB 6004 of FIG. 13, for example, it is possible to identify the sheet 1020 displayed on the personal board screen 1000 identified from the personal memo ID and the image file of the captured image 1022 displayed on the sheet 1020.

<<Shared Memo Management DB According to the First Embodiment>>

FIG. 14 is a configuration diagram of an example of the shared memo management DB 6005. In the storage unit 6000 of the content management server 6, the shared memo management DB 6005 as illustrated in FIG. 14 is constructed. In the shared memo management DB 6005 illustrated in FIG. 14, a shared memo ID, a seminar ID, and bibliographic information of a seminar are managed in association with each other. The item "shared memo ID" is an example of shared memo identification information that identifies the shared memo cm of the shared board cc. The item "seminar ID" is an example of seminar identification information that identifies the seminar held in the room. The item "bibliographic information of seminar" is bibliographic information of a seminar identified by the seminar ID. By the shared memo management DB 6005 of FIG. 14, when a seminar ID is identified, it is possible to identify the bibliographic information of the seminar.

<<Personal Memo DB According to the First Embodiment>>

FIG. 15 is a configuration diagram of an example of a personal memo DB 2001*b*. In the storage unit 2000*b* of the personal terminal 2*b*, the personal memo DB 2001*b*, as illustrated in FIG. 15, is constructed. The personal memo DB 2001*b* is created in the cache of the web browser, and, therefore, exists only while the web browser is running.

The data managed in the personal memo DB 2001*b* is the same as the data for each personal terminal 2*b* and 2*c* managed in the personal memo DB 6001 in the content management server 6. The personal terminal 2*b* acquires data for the personal terminal 2*b* from the data of the respective personal terminals 2*b* and 2*c* managed in the content management server 6, and manages the acquired data in the personal memo DB 2001*b*. In the personal memo DB 2001*b* of FIG. 15, a personal memo ID, a sheet ID, a content ID, content data, and the display position are managed in association with each other.

The item "personal memo ID" is an example of personal memo identification information that identifies the personal memo dm of the personal board dc. The item "sheet ID" is an example of sheet identification information that identifies the sheets 1020 and 1120. The item "content ID" is an example of content identification information that identifies each content, such as text memos and rendered objects input to the sheets 1020 and 1120.

The item "content data" is data such as text memos and rendered objects input in the sheets 1020 and 1120. For example, the content data having the content ID "c101" corresponds to the type "text memo" input to the text memo area 1024 and the like, has the font type of "times new roman", has a size of "20", and corresponds to the input text characters "ABCDE".

Further, the content data having the content ID "c103" is an example corresponding to the type "vector data" rendered in the captured image 1022, and the vector data is represented by numerical value data. Note that in the case of a text input to the captured image 1022 and the like by using a text tool, for example, by representing the content data type as "text", it is possible to distinguish between the text input to the captured image 1022 and the like and the text memo input to the text memo area 1024 and the like.

The item "display position" indicates the display position of a text memo or a rendered object input in the sheets 1020 and 1120. For example, the display position of the content input to the captured image 1022 and the like is represented by coordinates. The display position of the text memo input to the text memo area 1024 and the like is represented, for example, by the number of lines and the number of characters.

The personal memo DB 6001 has the same data structure as the personal memo DB 2001*b*, and, therefore, descriptions thereof will be omitted. However, the personal memo DB 6001 includes all of the data of the personal memo DBs 2001*b* and 2001*c*.

<<Shared Memo DB According to the First Embodiment>>

FIG. 16 is a configuration diagram of an example of a shared memo DB 2002*b*. In the storage unit 2000*b* of the personal terminal 2*b*, the shared memo DB 2002*b* as illustrated in FIG. 16 is constructed. The shared memo DB 2002*b* is created in the cache of the web browser and exists only while the web browser is running. The shared memo DB 6002 has the same data structure as the shared memo DB 2002*b*, and, therefore, the description thereof will be omitted.

The data managed in the shared memo DB 2002*b* is the same as the data managed in the shared memo DB 6002 in the content management server 6. The personal terminal 2*b* acquires data managed in the shared memo DB 6002 of the content management server 6 and manages the acquired data in the shared memo DB 2002*b*.

In the shared memo DB 2002*b*, a combination of a content ID, content data, and a display position of content data is managed in association with the shared memo ID for identifying the shared memo of the shared board cc.

The item "content ID" is an example of content identification information that identifies each content. The item "content data" is data of a content such as text input to the shared board cc, images pasted to the shared board cc, vector data obtained by rendering, etc. The item "display position" indicates the display position of the content on the shared board cc.

<<Interest Level Management DB According to the First Embodiment>>

FIG. 17 is a configuration diagram of an example of the interest level management DB 6003. In the storage unit 6000 of the content management server 6, the interest level management DB 6003 illustrated in FIG. 17 is constructed. In the interest level management DB 6003 illustrated in FIG. 17, a personal memo ID, the number of times of capturing streaming, the number of times of referring to capture, the quantity of writing, DL by PDF, the seminar participation time, and the seminar exit time are managed in association with each other.

The item "personal memo ID" is an example of personal memo identification information that identifies the personal memo dm of the personal board dc. The item "number of times of capturing streaming" is the number of times the participant captures the projection screen 1040 in the personal board screen 1000 in the seminar identified by the personal memo ID.

The item "number of times of referring to capture" represents the total number of times of referring to capture, the number of times of referring to each capture, and the reference time, as an example of the number of times that the participant has referred to the sheet 1120 in the personal board screen 1100 of the seminar identified by the personal memo ID, after the seminar.

The number of times of referring to each capture and the reference time are the number of times of referring to each capture and the date and time of reference, for each sheet 1120 referred to by a participant in the personal board screen 1100 of the seminar identified by the personal memo ID. The total number of times of referring to capture is the total number of times the participant has referred to each sheet 1120.

The item "quantity of writing" is the quantity of information written by a participant into the sheet 1020 or 1120 in the personal board screen 1000 or 1100 of the seminar identified by the personal memo ID. In the interest level management DB 6003 of FIG. 17, as examples of the quantity of writing, the total number of text characters in each personal memo, the number of text characters of each capture in the personal memo, the number of handwritten objects (lines, stamps, etc.), the number of handwritten objects in each capture in the personal memo, and the number of handwritten characters with respect to capture, are indicated.

The total number of text characters in each personal memo is the total number of text characters obtained by adding up the number of text characters in each text memo area 1024 in the sheet 1020 and the like. The number of text characters of each capture in personal memo is the number of text characters in each text memo area 1024 of the sheet 1020 and the like.

The number of handwritten objects (lines, stamps, etc.) is the total number of objects obtained by adding up the number of handwritten objects in each captured image 1022 in the sheet 1020 and the like. The number of handwritten objects in each capture in personal memo is the number of handwritten objects in each captured image 1022 in the sheet 1020 and the like. The number of handwritten characters with respect to capture is the total number of characters obtained by adding up the number of handwritten characters in each captured image 1022 in the sheet 1020 and the like.

The item "DL by PDF" indicates whether the captured image 1022 and the text memo area 1024 displayed in the memo area of the personal board screen 1000 have been locally saved (downloaded) as a PDF file, by the PDF save button 1014 described above.

The item "seminar participation time" indicates the date and time that the participant has participated in the seminar held in the room. The seminar participation time is recorded by registering, as the seminar participation time, the time at which the content management server 6 has received access from the personal terminal 2b and the like to connect to the seminar held in the room, in association with each user ID or personal memo ID.

Further, the item "seminar exit time" indicates the date and time when the participant has exited the seminar held in the room. The seminar exit time is recorded by registering, as the seminar exit time, the time at which the content management server 6 has received access from the personal terminal 2b and the like to exit from the seminar held in the room, in association with each user ID or personal memo ID.

Note that if a participant with the same user ID participates in and exits one seminar more than once, the plurality of seminar participation times and seminar exit times may all be stored and displayed. Further, only the first seminar participation time may be stored, and the seminar exit time may be updated to the last exit time, so that only one seminar participation time and one seminar exit time are recorded and displayed.

<<Seminar Association DB According to the First Embodiment>>

FIG. 18 is a configuration diagram of an example of a seminar association DB 6008. In the storage unit 6000 of the content management server 6, the seminar association DB 6008 as illustrated in FIG. 18 is constructed. The seminar association DB 6008 of FIG. 18 manages the identifier and the seminar ID in association with each other.

The item "identifier" may be identification information available to, for example, the presenter A and the participants B and C who participate in the same seminar, such as the ID of the permanent terminal 4 that identifies the permanent terminal 4. The requirement of the identifier is that the identifier is a unique identifier in the content management server 6.

Thus, the identifier may be, for example, the MAC address of the LAN or any personal identification number (PIN) code, or any string of characters that does not overlap with anyone else, for example "apple", "first sales department", "exclusively used by ●●", and the like.

The present embodiment does not limit the form or type of the identifier. The item "seminar ID" is an example of seminar identification information that identifies the seminar held in the room. For example, a seminar ID is re-created before or after the seminar is held in the room. During the seminar, the identifier in the seminar association DB 6008 in FIG. 18 is associated with the seminar ID. Accordingly, the content management server 6 can determine whether the seminar associated with the identifier is being held, by referring to the seminar association DB 6008 of FIG. 18.

<<Seminar DB According to the First Embodiment>>

FIG. 19 is a configuration diagram of an example of the seminar DB 6006. The seminar DB 6006 as illustrated in FIG. 19 is constructed in the storage unit 6000 of the content management server 6. The seminar DB 6006 of FIG. 19 manages the seminar ID, the seminar name, the seminar room, the participating user, and the state (of the seminar), in association with each other. The item "seminar ID" is an example of the seminar identification information that identifies the seminar held in the room.

The item "seminar name" is the name of the seminar identified by the seminar ID. The item "seminar room" is an example of identification information representing a location such as a seminar room in which the permanent terminal 4 is installed. The item "participating user" represents the arrangement of user IDs of participants participating in the seminar identified by the seminar ID. The item "state" indicates the state of the seminar (e.g., during seminar, seminar ended, and the like) as identified by the seminar ID. By the seminar DB 6006 in FIG. 19, it is possible to identify the user ID of the participant who has participated in the seminar identified by the seminar ID.

<<User DB According to the First Embodiment>>

FIG. 20 is a configuration diagram of an example of the user DB 6007. The user DB 6007 illustrated in FIG. 20 is constructed in the storage unit 6000 of the content management server 6. In FIG. 20, the user DB 6007 manages the user ID, the user name, and the e-mail in association with each other. The item "user ID" is an example of user identification information that identifies a participant. The item "user name" is the name of the participant identified by the user ID. The item "e-mail" is the e-mail address of the participant identified by the user ID and is an example of contact information.

The contact information is contact information of the participant and may be any kind of information as long as the information indicates an address of the participant's personal terminal 2 to which the reception Uniform Resource Locator (URL) of the reception mode screen (e.g., the personal board screen 1000) can be transmitted via the communication network 9 when a seminar is held; for example, the contact information may be the ID of the participant in a social networking service (SNS).

<Process or Operation According to the First Embodiment>

Next, the process or operation according to the present embodiment will be described. In the present embodiment, an example in which a presenter A who operates the personal terminal 2a performs streaming transmission to the shared screen ss in a seminar held in a room, and a participant B who operates the personal terminal 2b participates in the seminar and takes memos in the personal board screen 1000, will be described.

Figure 21:
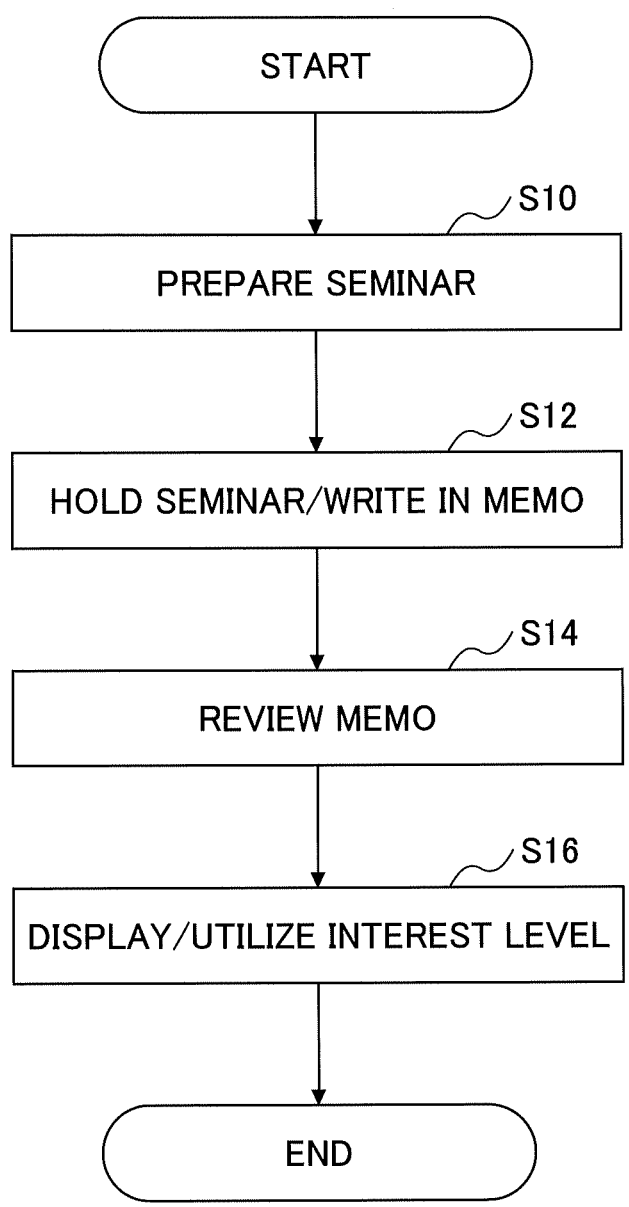
FIG. 21 is a flowchart illustrating an example of a process of the information sharing system according to the first embodiment of the present invention.

FIG. 21 is a flowchart illustrating an example of a process of the information sharing system according to the present embodiment. In step S10, a seminar is prepared in the information sharing system. The seminar preparation includes the creation of a seminar room, a process of causing the permanent terminal 4 to display a screen of the setting mode, a process of causing the personal terminal 2a of the presenter to display a seminar setting screen, a process of switching the screen of the permanent terminal 4 to a code display mode, and the like.

In step S12, the seminar is held in the information sharing system. The presenter captures, with the personal terminal 2a, the screen of the code display mode displayed on the permanent terminal 4, and connects to the room from the seminar participation screen displayed on the personal terminal 2a. On the personal terminal 2a, a screen of a projection mode is displayed.

Further, the participant captures, with the personal terminal 2b, the screen of the code display mode displayed on the permanent terminal 4 and connects to the room from the seminar participation screen displayed on the personal terminal 2*b*. Based on the connection (participation) from the personal terminal 2*b* to the room, the participant can participate in the seminar held in the room.

The content management server 6 transmits a reception URL of the screen in the reception mode (for example, the personal board screen 1000) to the personal terminal 2*b* of the participant via the communication network 9, and causes the participant to input contact information such as an e-mail address. The content management server 6 uses the contact information input by the participant to transmit data of the personal board screen 1000, which is an example of a screen of the reception mode, to the personal terminal 2*b*, and causes the personal terminal 2*b* to display the personal board screen 1000.

With respect to the personal board screen 1000 displayed as the reception mode in the participant's personal terminal 2*b*, at the time before the screen sharing or projection starts at the presenter's personal terminal 2*a*, the personal board screen 1000 in which the shared screen (the projection screen) is not yet displayed as illustrated in FIG. 8 may be displayed, and after the screen sharing, etc., starts, the shared screen (the projection screen) that is shared at the time point of displaying the personal board screen or the sheet 1020 in which capturing is not yet performed, may be displayed, as illustrated in FIG. 9.

As described above, by inputting contact information such as an e-mail address to be used for transmitting the reception URL of the personal board screen 1000, the participant can cause the personal terminal 2*b* to display the personal board screen 1000 of the seminar and participate in the seminar.

Further, the content management server 6 can collect contact information such as an e-mail address of the participant, used for transmitting the reception URL of the personal board screen 1000, as the contact information of the participant of the seminar. The collected contact information of the seminar participants is managed, for example, in the user DB illustrated in FIG. 20.

During the seminar, in response to a request from the personal terminal 2*a* of the presenter, the information sharing system performs streaming transmission to the shared screen ss of the seminar, and causes the personal terminal 2*b* to display the projection screen 1040 as illustrated in the personal board screen 1000 of FIG. 9. While referring to the projection screen 1040 displayed on the personal board screen 1000, the participant performs an operation of pressing the capture button 1016 displayed on the personal board screen 1000 at a timing when he/she desires to capture an image of the projection screen 1040.

The personal board screen 1000, which has accepted the operation of pressing the capture button 1016 by the participant, acquires the captured image 1022 of the projection screen 1040 captured at this time. Then, the captured image 1022 and the text memo area 1024 associated with the captured image 1022 are displayed on one sheet 1020, as in the memo area of the personal board screen 1000 illustrated in FIG. 10.

In this manner, the participant can additionally display, in the memo area at any timing, the captured image 1022 of the projection screen 1040 and the text memo area 1024 associated with the captured image 1022. The participant inputs memos, such as inputting a text memo to the text memo area 1024 displayed in the memo area as illustrated in FIG. 10, or rendering an object (inputting a handwritten memo) to the captured image 1022 displayed in the memo area. The contents of the various DBs described above are updated depending on the contents of the input memo.

In step S14, in the information sharing system, by causing the personal terminal 2*b* to display the personal board screen 1100 as illustrated in FIG. 12, the participant can view the personal memo dm (review the memo) in which the participant has input memos during the seminar, and review the seminar.

Note that in the personal board screen 1100 as in FIG. 12, similar to the case of during a seminar, the participant can perform editing, such as rendering an object in the captured image 1022 and inputting a text memo to the text memo area 1024. Note that the information with respect to the reviewing of the seminar by the participant, is transmitted to the content management server 6 to update the interest level management DB 6003.

Furthermore, in step S16, the information sharing system displays and utilizes the level of interest of the participants in the contents of the seminar, based on the contact information input by the participants, the personal memo dm taken by the participants, and the reviewing of the personal memo dm, as will be described below.

For example, by abstracting the contents, the display of the level of interest expressed by participants in the seminar contents may be viewed not only by the presenter and the organizer but also by the participants; or access to the level of interest may be restricted so that only the presenter and the organizer can view the display of the level of interest. The presenter and the organizer can view the level of interest by the participants in the seminar content, and utilize the level of interest for approaching participants (sales activities, etc.) by using the contact information or for feedback for the next seminar.

According to steps S12 and S14, by using a user interface (UI) that allows the participant to easily take the personal memo dm, it is possible to improve the operability and usability of the participant. Further, according to step S16, by visualizing and providing the level of interest of the participants in the seminar content, it is possible to promote the utilization of the level of interest for approaching the participants (sales activities, etc.) and for feedback for the next seminar.

<<Seminar Preparation According to the First Embodiment>>

Figure 22:
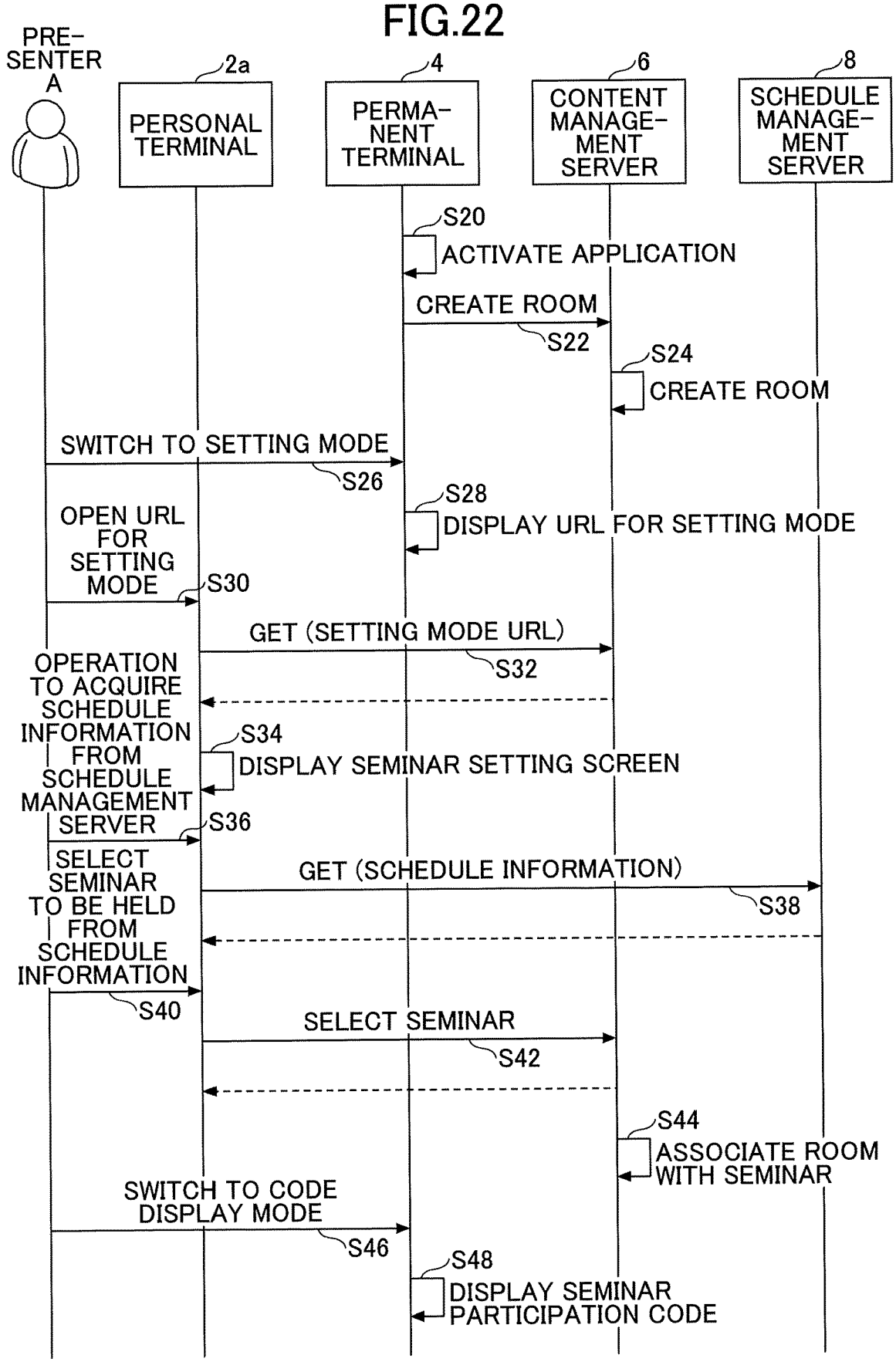
FIG. 22 is a sequence diagram of an example of preparing for a seminar according to the first embodiment of the present invention.

In step S10, the presenter A or the organizer prepares for the seminar by the procedure illustrated in FIG. 22, for example. FIG. 22 is a sequence diagram illustrating an example of preparing for a seminar. In step S20, for example, the permanent terminal 4 installed in the seminar room X activates software such as an auxiliary application.

Figure 23:
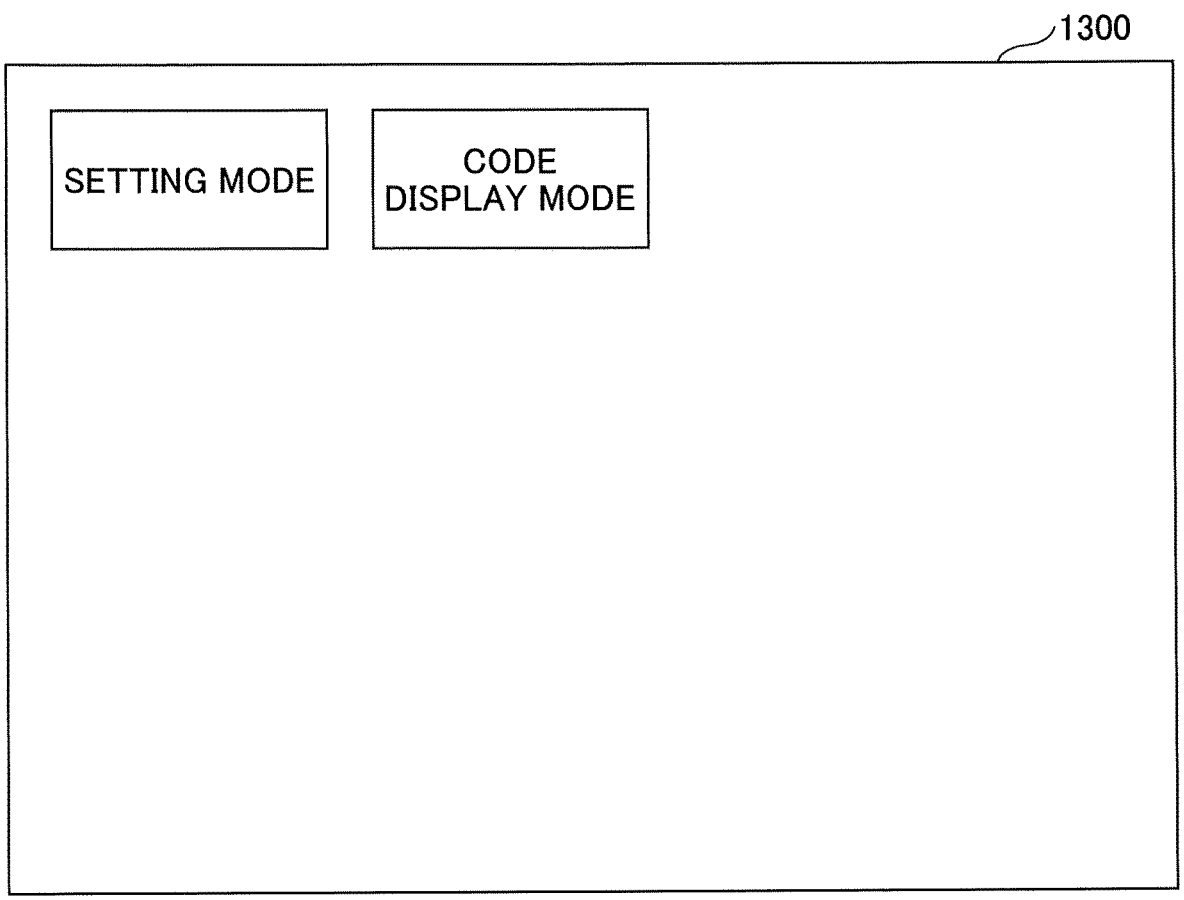
FIG. 23 is an image diagram illustrating an example of a seminar preparation screen displayed on a permanent terminal according to the first embodiment of the present invention.

Proceeding to step S22, the auxiliary application that has been activated requests the content management server 6 to create a room. The content management server 6, which has been requested to create a room, creates the room in step S24. Further, the activated auxiliary application causes the permanent terminal 4 to display a seminar preparation screen 1300, for example, as illustrated in FIG. 23. FIG. 23 is an image diagram of an example of the seminar preparation screen 1300 displayed on the permanent terminal 4.

The seminar preparation screen 1300 of FIG. 23 includes a "setting mode" button for accepting an operation for displaying the setting mode from the presenter A or the organizer, and a "code display mode" button for accepting an operation for displaying the code display mode from the presenter A or the organizer. Proceeding to step S26, the presenter A or the organizer performs an operation of pressing the "setting mode" button on the seminar preparation screen 1300 to display the setting mode.

Figure 24:
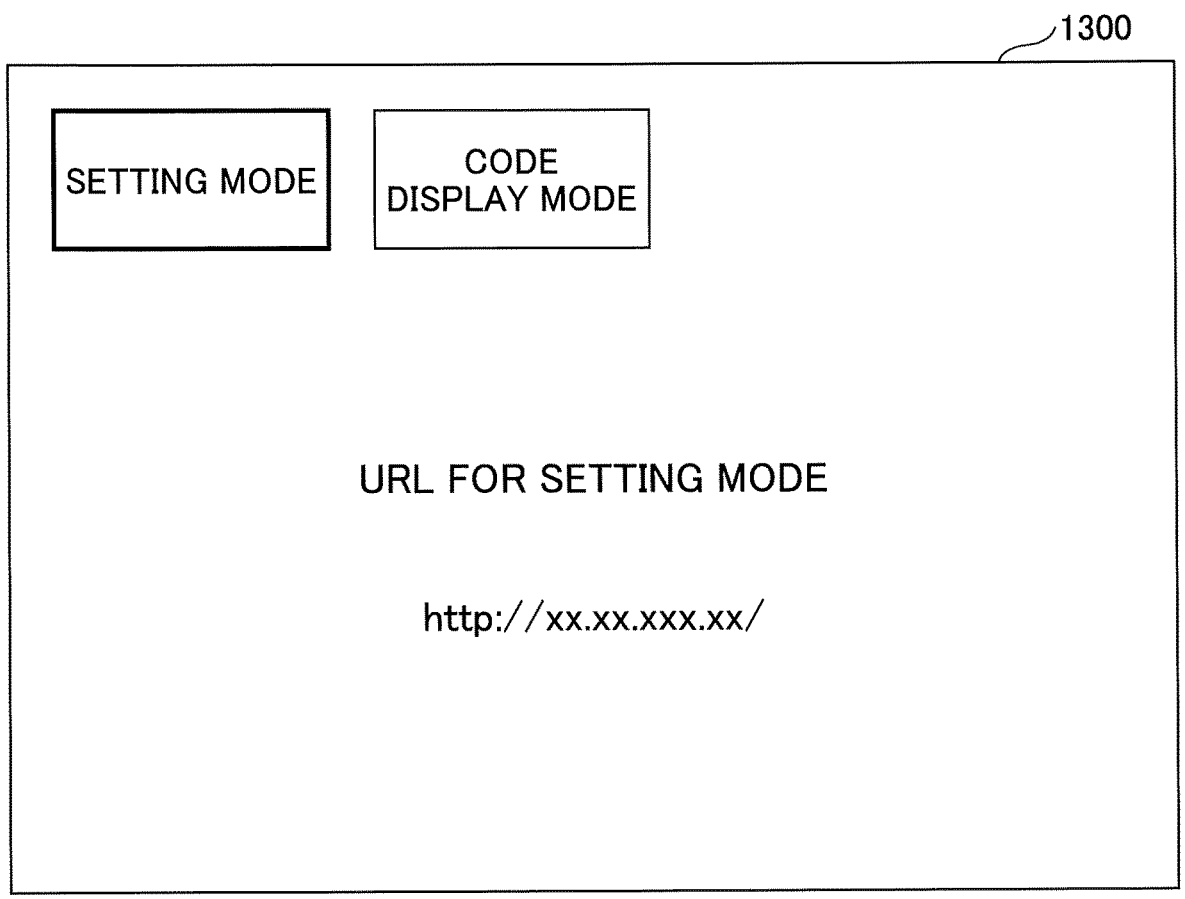
FIG. 24 is an image diagram illustrating an example of a seminar preparation screen displaying a URL for setting mode according to the first embodiment of the present invention.

Proceeding to step S28, the auxiliary application of the permanent terminal 4 displays the URL for the setting mode on the seminar preparation screen 1300, for example, as illustrated in FIG. 24. The URL for the setting mode is an example of a connection destination for displaying the seminar setting screen on the personal terminal 2a. Proceeding to step S30, and the presenter A or the organizer inputs the URL for the setting mode displayed on the seminar preparation screen 1300, into the browser of the personal terminal 2a, and performs an operation of opening the URL for the setting mode.

Proceeding to step S32, the personal terminal 2a specifies the URL for the setting mode and receives data of the seminar setting screen from the content management server 6. Proceeding to step S34, the personal terminal 2a displays the seminar setting screen. The seminar setting screen is a screen for performing a process of associating, with each other, a seminar selected from the schedule of the presenter A, the room created in step S24, and a two-dimensional code to be displayed in the seminar preparation screen 1300 in the code display mode.

Proceeding to step S36, the presenter A or the organizer performs, from the seminar setting screen, an operation of acquiring the schedule information, for example, from the schedule management server 8. Proceeding to step S38, the personal terminal 2a acquires the schedule information of the presenter A from the schedule management server 8, for example, by logging in as the presenter A to the schedule management server 8 or using authentication cooperation.

Proceeding to step S40, the presenter A or the organizer performs an operation of selecting a seminar from the schedule of presenter A, with respect to the seminar setting screen. Proceeding to step S42, the personal terminal 2a reports the selected seminar to the content management server 6.

Proceeding to step S44, the content management server 6 associates, with each other, the seminar selected in the seminar setting screen, the room created in step S24, and the two-dimensional code to be displayed on the seminar preparation screen 1300 in the code display mode.

Proceeding to step S46, the presenter A or the organizer performs an operation of pressing the "code display mode" button in the seminar preparation screen 1300, to perform an operation of displaying the screen of the code display mode. Proceeding to step S48, the auxiliary application of the permanent terminal 4 displays a seminar participation code such as, for example, the two-dimensional code of FIG. 25, on the seminar preparation screen 1300. The seminar participation code is an example of a connection destination for displaying the seminar participation screen on the personal terminal 2.

Figure 25:
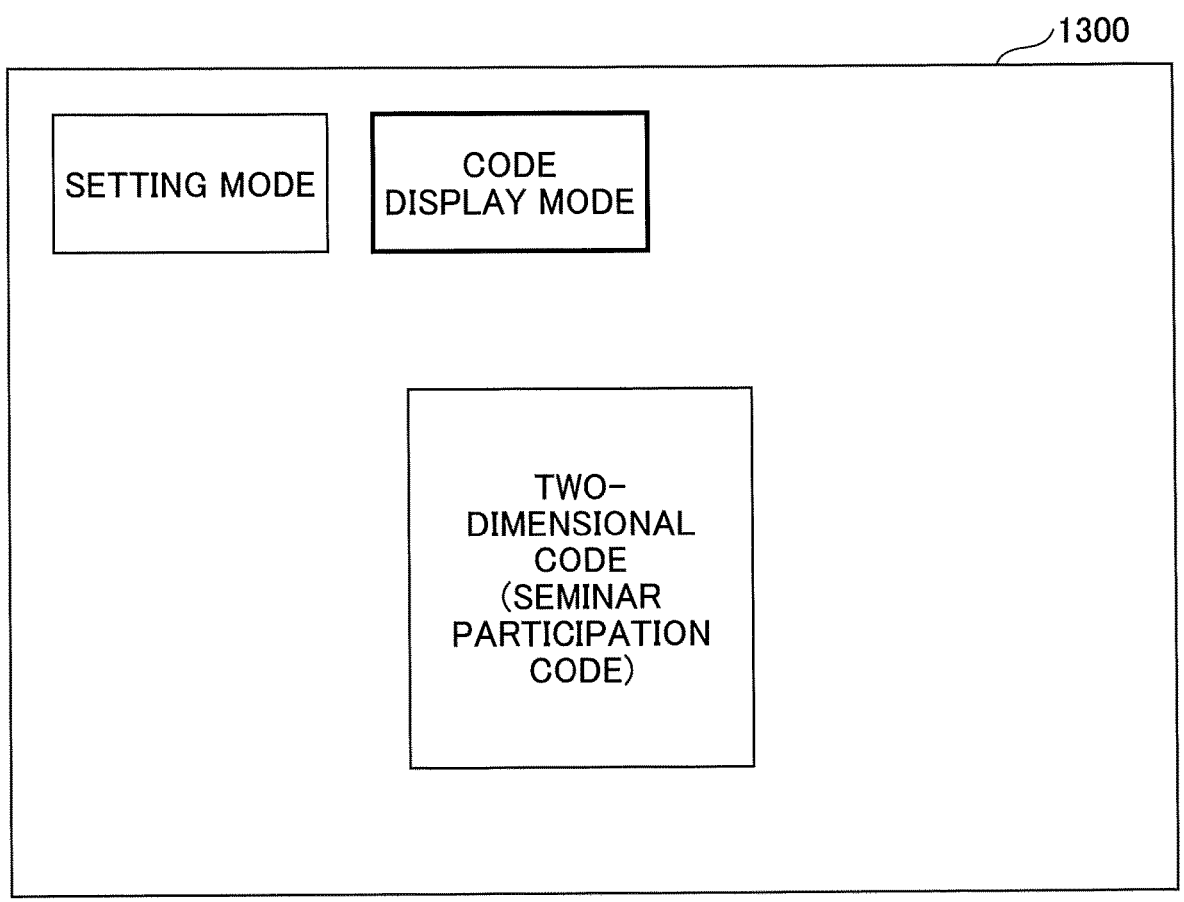
FIG. 25 is an image diagram illustrating an example of a seminar preparation screen displaying a two-dimensional code (a seminar participation code) according to the first embodiment of the present invention.
Figure 26:
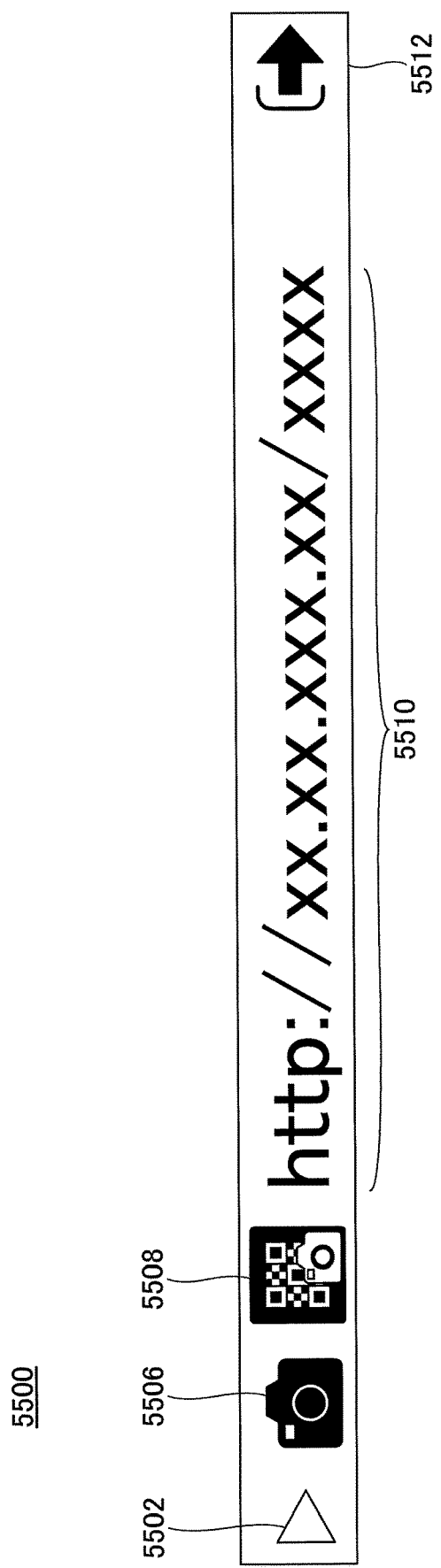
FIG. 26 is an image diagram illustrating an example of an address bar displayed on a permanent terminal according to the first embodiment of the present invention.

Note that the seminar participation code of FIG. 25 may be displayed using, for example, an address bar 5500 of FIG. 26. FIG. 26 is an image diagram of an example of the address bar 5500 displayed on the permanent terminal 4.

The address bar 5500 includes a button 5502, a capture button 5506, a two-dimensional code display button 5508, a connection address 5510 including the ID of the permanent terminal 4, and an exit button 5512.

The button 5502 is a button for omitting/displaying the portion to the right of the button 5502 in the address bar 5500. The capture button 5506 is a button for capturing the shared screen ss and pasting the captured shared screen in the shared memo cm. The two-dimensional code display button 5508 is a button for displaying the seminar participation code of FIG. 25 as a two-dimensional code. The participant can capture the two-dimensional code with the personal terminal 2b to input the seminar participation code of FIG. 25 including the ID of the permanent terminal 4, into the personal terminal 2. The exit button 5512 is a button for exiting the seminar in which the permanent terminal 4 participates.

For example, the address bar 5500 is displayed by an auxiliary application installed in the permanent terminal 4 (including the case of the auxiliary application installed in the stick PC 730 and the like connected to the permanent terminal 4). Similar functions may be implemented by a web application. Further, the auxiliary application installed in the permanent terminal 4 may be provided by using the cloud service.

<<Seminar Participation According to the First Embodiment>>

Figure 27:
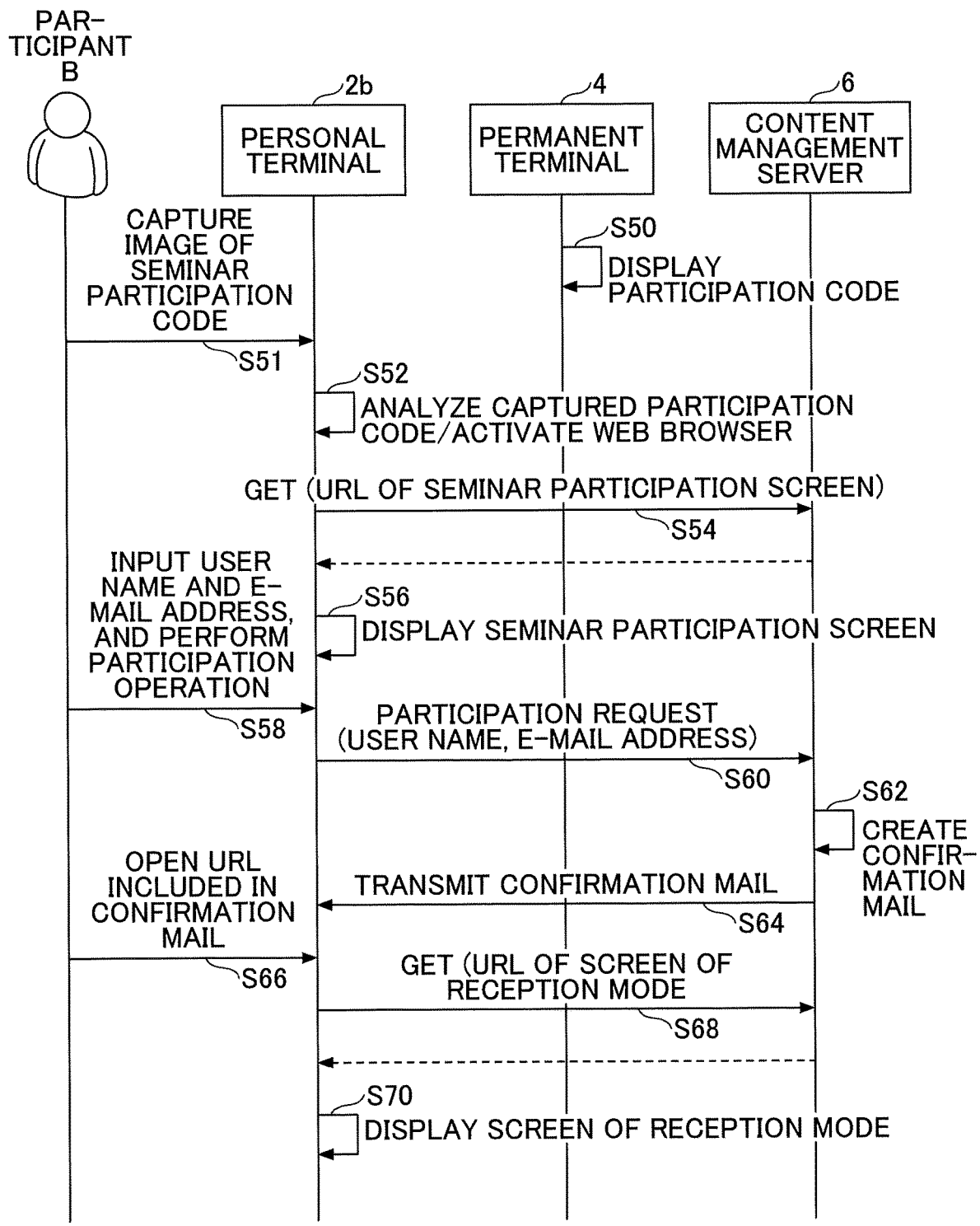
FIG. 27 is a sequence diagram of an example of a participant participating in the seminar according to the first embodiment of the present invention.

In step S12, the participant B participates in the seminar, for example, by the procedure illustrated in FIG. 27. FIG. 27 is a sequence diagram illustrating an example of a participant participating in a seminar. In step S50, the auxiliary application of the permanent terminal 4 displays the seminar participation code on the seminar preparation screen 1300. In step S51, the participant B captures, with the personal terminal 2b, the seminar participation code illustrated in FIG. 25 displayed on the permanent terminal 4. In step S52, the personal terminal 2b analyzes the captured seminar participation code and activates the web browser.

Proceeding to step S54, the personal terminal 2b specifies the URL of the seminar participation screen acquired from the seminar participation code image (the two-dimensional code), and receives data of the seminar participation screen from the content management server 6. In step S56, the personal terminal 2b displays, for example, a seminar participation screen 1400 illustrated in FIG. 28.

Figure 28:
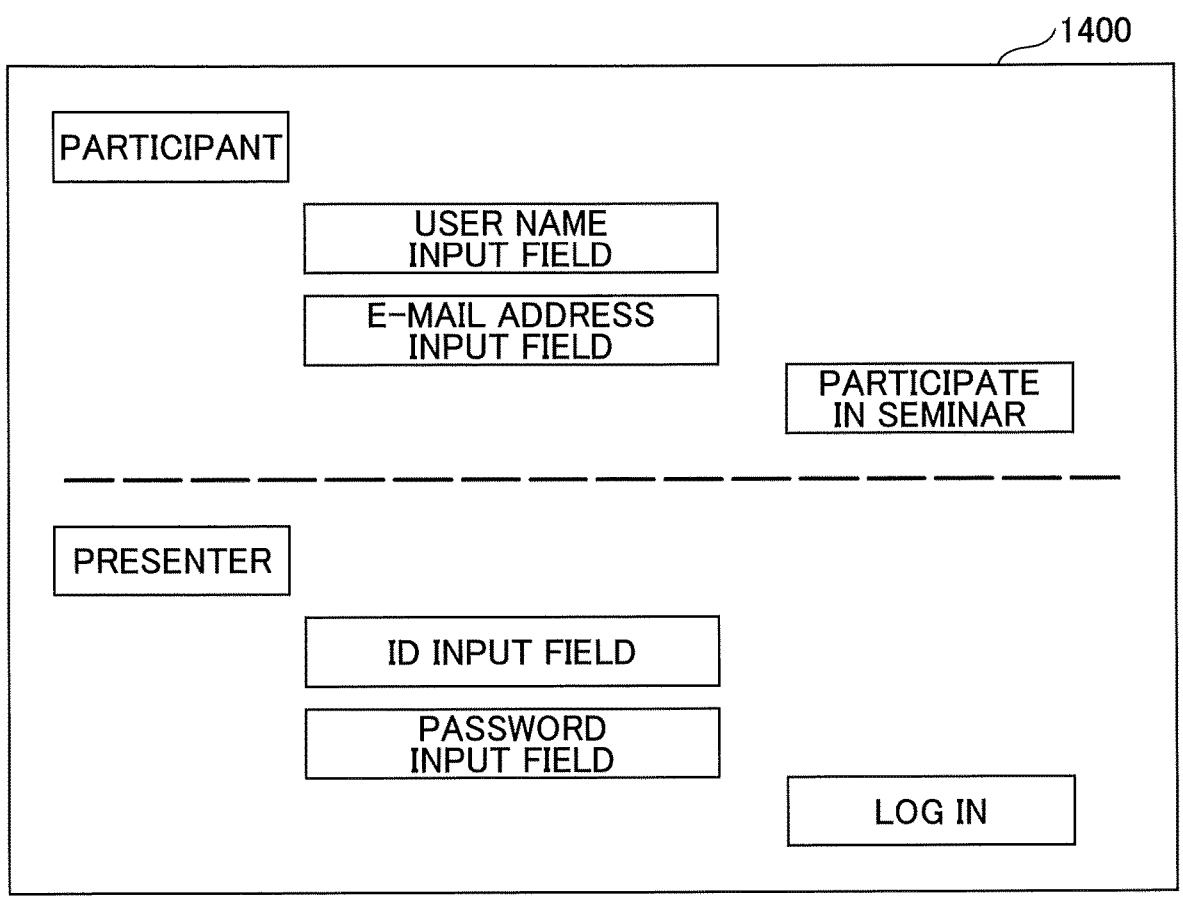
FIG. 28 is an image diagram illustrating an example of the seminar participation screen according to the first embodiment of the present invention.

FIG. 28 is an image diagram illustrating an example of the seminar participation screen 1400. In the seminar participation screen 1400 in FIG. 28, the upper side is an example of a participant operation area, and the lower side is an example of a presenter operation area. In the participant operation area of FIG. 28, a user name input field, an e-mail address input field, and a "participate in seminar" button are provided. Further, in the presenter operation area, an ID input field, a password input field, and a "log in" button are provided.

Proceeding to step S58, the participant B inputs the user name and the e-mail address in the participant operation area of FIG. 28, and subsequently presses the "participate in seminar" button. Proceeding to step S60, the personal terminal 2b specifies the user name and the e-mail address input to the participant operation area and sends a request to participate in the seminar to the content management server 6. Note that after step S60, the personal terminal 2b displays a message screen 1500 as illustrated in FIG. 29 from the seminar participation screen 1400 of FIG. 28. The message screen 1500 includes a message reporting to the participant B that a confirmation mail is transmitted and a message instructing the participant B to open the URL included in the confirmation mail.

Proceeding to step S62, the content management server 6 creates a confirmation mail 1600 including wordings as indicated in FIG. 30. FIG. 30 is an image diagram illustrating an example of wordings in the confirmation mail 1600. The confirmation mail 1600 of FIG. 30 includes a message reporting to the participant B that "this is confirmation mail in response to request to participate in seminar". Further, the confirmation mail 1600 includes a message reporting to the participant B that "by opening the following URL (included in the confirmation mail 1600), the personal board screen 1000 will be displayed, and you can participate in the seminar", and also the reception URL for the personal board screen 1000.

Proceeding to step S64, the content management server 6 transmits the confirmation mail 1600 to the personal terminal 2b.

Proceeding to step S66, the participant B performs an operation of opening the reception URL, such as clicking the reception URL of the personal board screen 1000 included in the confirmation mail 1600. Proceeding to step S68, the personal terminal 2b specifies the reception URL of the personal board screen 1000 and receives data of the personal board screen 1000 from the content management server 6. In step S70, the personal terminal 2b displays the personal board screen 1000 as illustrated in FIG. 8. Thus, the participant B can participate in the seminar from the personal board screen 1000 displayed on the personal terminal 2b.

Figure 31:
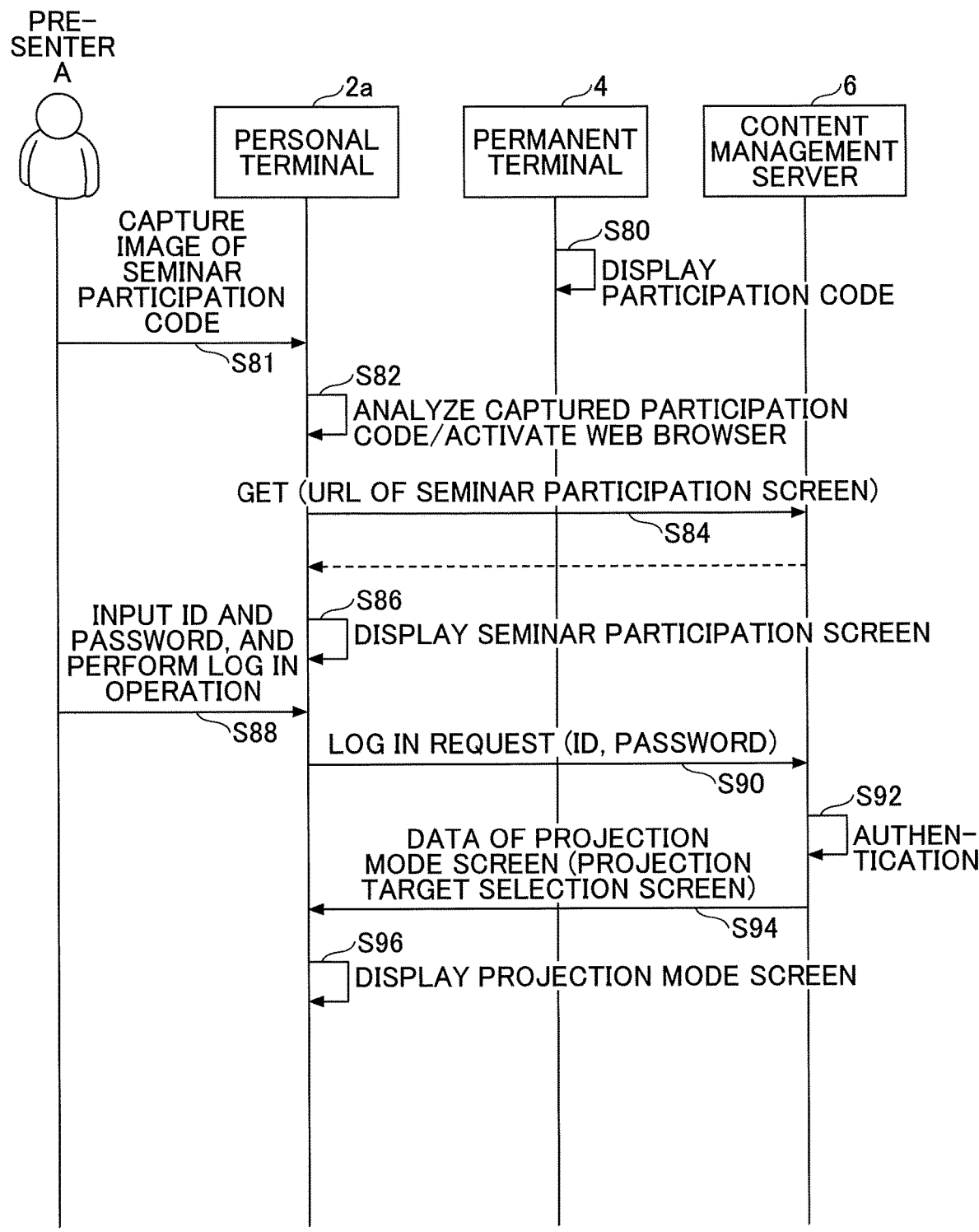
FIG. 31 is a sequence diagram of an example of participating in a seminar by the presenter according to the first embodiment of the present invention.

In S12, the presenter A participates in the seminar, for example, by the procedure illustrated in FIG. 31. FIG. 31 is a sequence diagram illustrating an example of participation in a seminar by a presenter. In step S80, the auxiliary application of the permanent terminal 4 displays the seminar participation code on the seminar preparation screen 1300. In step S81, the presenter A captures, with the personal terminal 2a, the seminar participation code illustrated in FIG. 25 on the permanent terminal 4. In step S82, the personal terminal 2a analyzes the captured seminar participation code and activates the web browser.

Proceeding to step S84, the personal terminal 2a specifies the URL of the seminar participation screen acquired from the seminar participation code image (the two-dimensional code), and receives data of the seminar participation screen from the content management server 6. In step S86, the personal terminal 2a displays, for example, the seminar participation screen 1400 illustrated in FIG. 28.

Proceeding to step S88, the presenter A inputs the ID and password in the presenter operation area in FIG. 28, and subsequently presses the "log in" button. Proceeding to step S90, the personal terminal 2a specifies the ID and password input to the presenter operation area and sends a log in request to the content management server 6. In step S92, the content management server 6 authenticates the ID and password specified in the log in request. Here, the description is continued assuming that the authentication has been successful.

Figure 32:
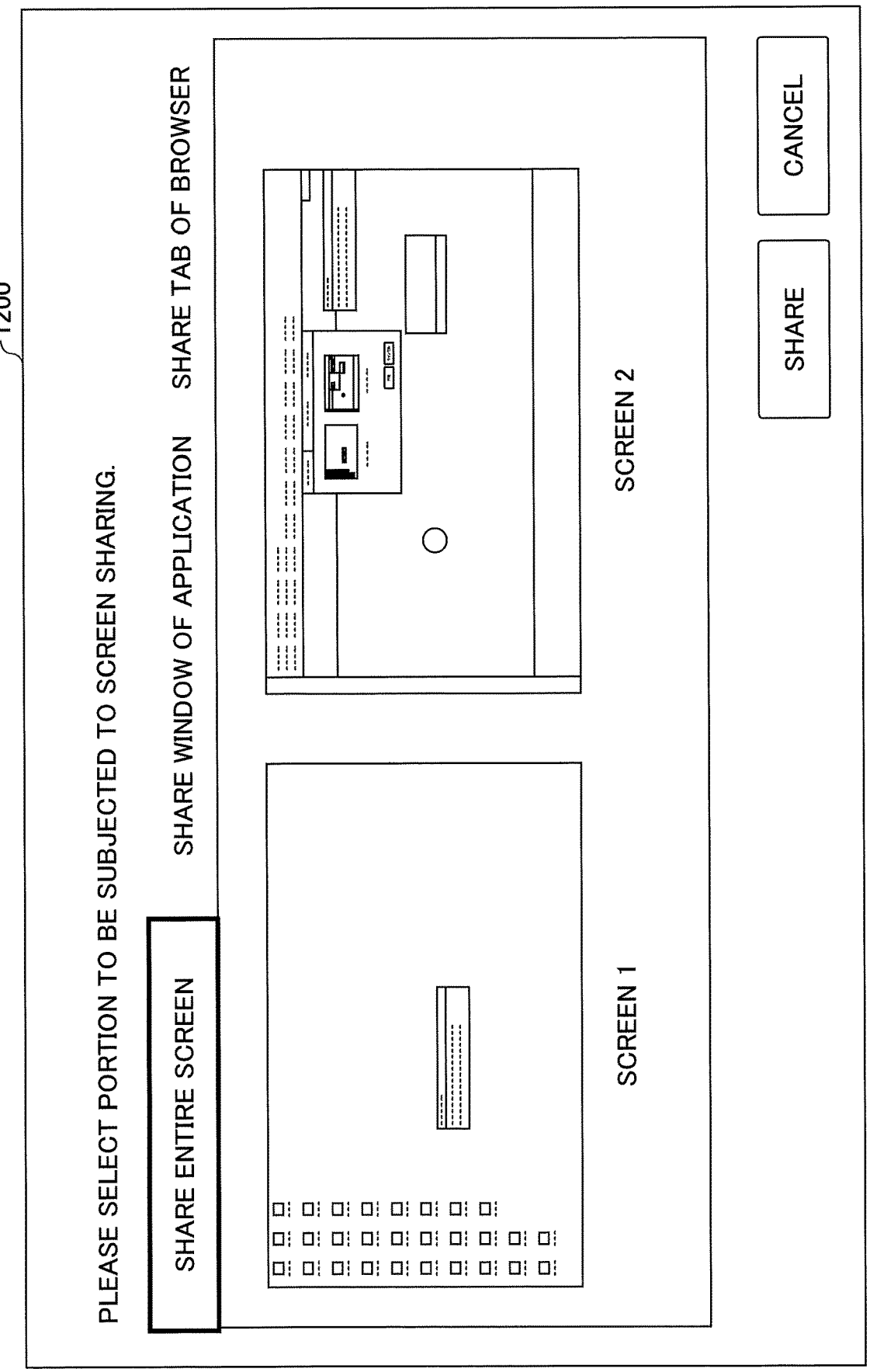
FIG. 32 is an image diagram illustrating an example of a screen for selecting a target screen to be transmitted to a shared screen according to the first embodiment of the present invention.

Proceeding to step S94, the content management server 6 transmits data of the screen of the projection mode (the projection target selection screen) to the personal terminal 2a. In step S96, the personal terminal 2a displays a screen of the projection mode, for example, as illustrated in FIG. 32. FIG. 32 is an image diagram illustrating an example of a screen in which a target screen to be transmitted to the shared screen ss is selected. A screen 1200 in FIG. 32 for selecting the target screen to be transmitted to the shared screen ss is an example of a screen in the projection mode (the projection target selection screen).

The screen 1200 in FIG. 32 indicates an example in which the target screen to be transmitted to the shared screen ss is selected from among "share entire screen", "share window of application", and "share tab of browser".

The screen 1200 in FIG. 32 is an example in which the presenter has selected "share entire screen". The screen 1200 is an example in which "screen 1" of the entire desktop or another "screen 2" displayed by dual display, are options. Further, in the screen 1200, when "share window of application" is selected, multiple applications that are activated (including an application that displays a conference/seminar material file) are displayed as options. Further, in the screen 1200, when "share tab of browser" is selected, the tabs of web browsers that are activated are displayed as options.

As described above, the presenter A can participate in the seminar from the screen of the projection mode displayed on the personal terminal 2a and perform streaming transmission to the shared screen ss.

Figure 33:
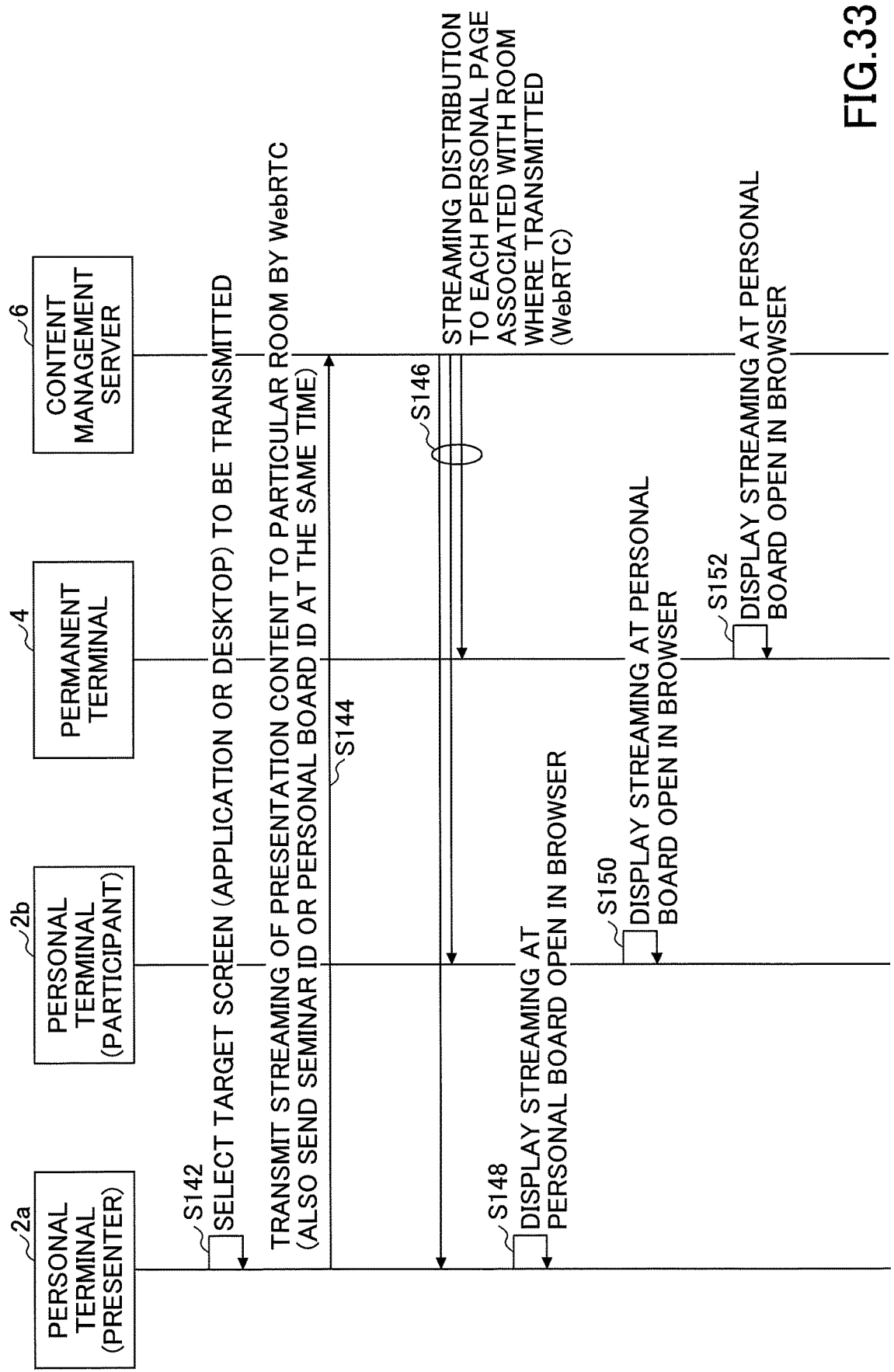
FIG. 33 is a sequence diagram illustrating an example of a process until a projection screen is displayed on a personal board screen according to the first embodiment of the present invention.

FIG. 33 is a sequence diagram illustrating an example of a process until the projection screen 1040 is displayed on the personal board screen 1000. Proceeding to step S142, the presenter who operates the personal terminal 2a selects a target screen to be transmitted to the shared screen ss from the screen 1200 as in FIG. 32, for example.

Proceeding to step S144, the personal terminal 2a specifies a seminar ID or a personal board ID and transmits, by WebRTC, the streaming that is the target screen to be transmitted to the shared screen ss of a particular seminar. Note that webRTC is a standard that implements high-speed data communication via a web browser, and is one of the Application Programming Interfaces (APIs) of HTML. The webRTC is capable of transmitting and receiving data having a large volume such as video and audio data, in real time.

Proceeding to step S146, the content management server 6 performs streaming distribution by webRTC, to the personal terminal 2a, the personal terminal 2b, and of the permanent terminal 4, which are associated with the seminar ID specified in step S144. Note that the sequence diagram of FIG. 33 illustrates an example in which the personal terminal 2a of the presenter A and the permanent terminal 4 also display the personal board screen 1000.

In step S148, the personal terminal 2a can display the projection screen 1040 received by streaming distribution, for example, as illustrated in FIG. 9, in the projection area of the personal board screen 1000 displayed by the web browser. Further, in step S150, the personal terminal 2b can display the projection screen 1040, for example, as illustrated in FIG. 9, in the projection area of the personal board screen 1000 displayed by the web browser. Further, in step S152, the permanent terminal 4 can display the projection screen 1040, for example, as illustrated in FIG. 9, in the projection area of the personal board screen 1000 displayed by the web browser.

Figure 34:
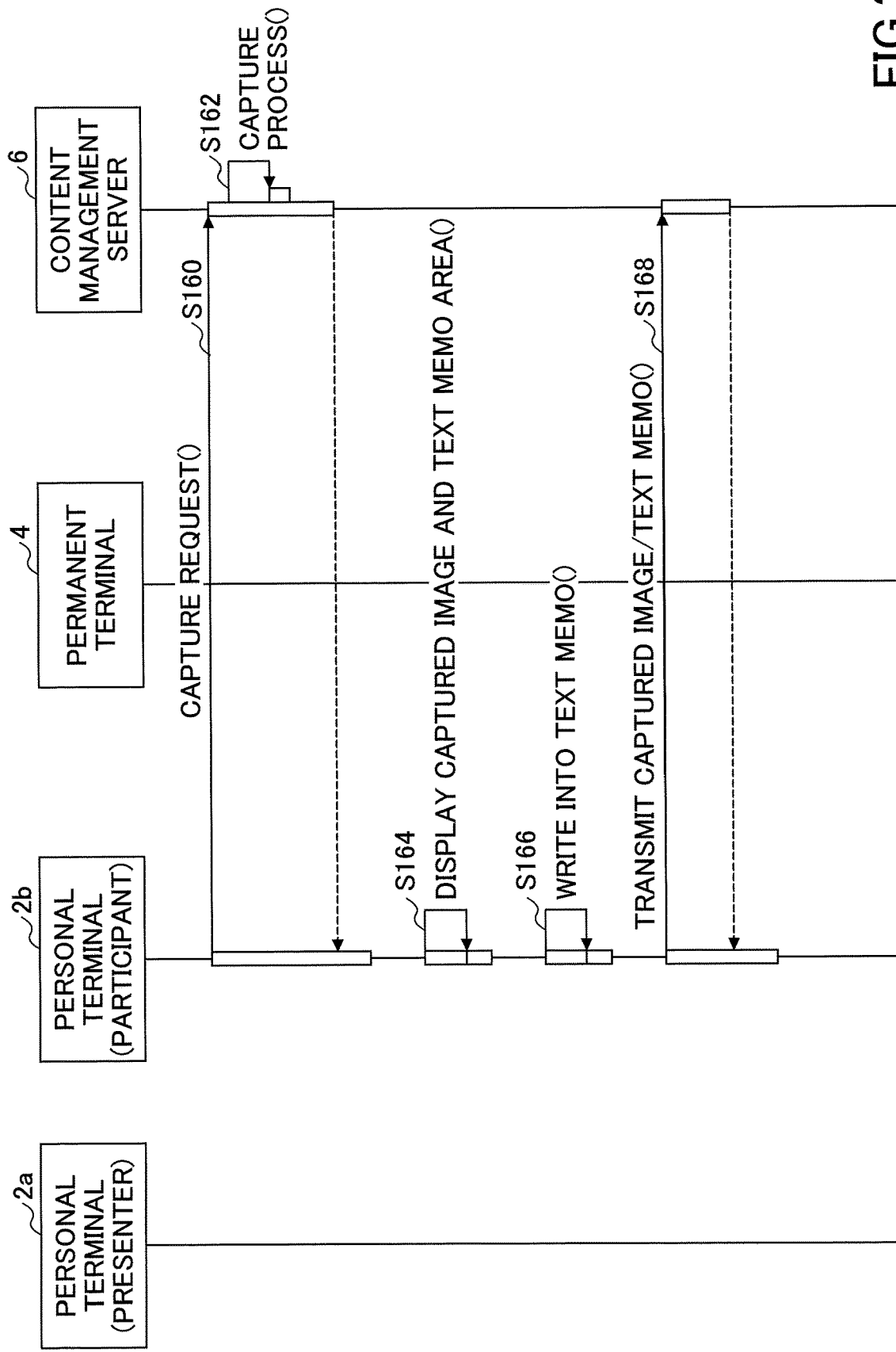
FIG. 34 is a sequence diagram illustrating an example of a process of incorporating a captured image of a projection screen and inputting a memo to the captured image and a text memo area according to the first embodiment of the present invention.

For example, the participant B operating the personal terminal 2b can incorporate the captured image 1022 of the projection screen 1040 and input a memo to the captured image 1022 and the text memo area 1024, by the procedures illustrated in the sequence diagram of FIG. 34.

FIG. 34 is a sequence diagram illustrating an example of a process of incorporating the captured image 1022 of the projection screen 1040 and inputting a memo to the captured image 1022 and the text memo area 1024.

In step S160, the participant B operating the personal terminal 2b performs an operation of pressing the capture button 1016. The personal terminal 2b makes a request to capture an image to the content management server 6. In step S162, the content management server 6 captures an image of the projection screen 1040 at that time, and returns the image file of the captured image 1022 to the personal terminal 2b.

In the sequence diagram of FIG. 34, the capturing of the projection screen 1040 is performed by the content management server 6, but the capturing of the projection screen 1040 may be performed by the personal terminal 2b or the permanent terminal 4. For example, in the case of capturing the projection screen 1040 by the permanent terminal 4, the content management server 6 that has accepted the capturing request from the personal terminal 2b makes a request to capture an image to the permanent terminal 4.

The permanent terminal 4 captures an image of the projection screen 1040, and returns an image file of the captured image 1022 to the content management server 6. The content management server 6 transmits the returned image file of the captured image 1022 to the personal terminal 2b. As described above, in the case of capturing an image of the projection screen 1040 by the permanent terminal 4, for example, it is possible to capture the projection screen 1040 that can be viewed at the permanent terminal 4 by the presenter A and the participant B at the same time.

The personal terminal 2b that has received the image file of the captured image 1022 from the content management server 6 proceeds to step S164, and additionally displays the captured image 1022 of the projection screen 1040 in the memo area, for example, as illustrated in FIG. 10, by using the received image file. Further, the personal terminal 2b displays the text memo area 1024 associated with the captured image 1022 on the same sheet 1020 as the additionally displayed captured image 1022, for example, as illustrated in FIG. 10.

Proceeding to step S166, the participant B operating the personal terminal 2b renders an object into the captured image 1022 and inputs a text memo into the text memo area 1024, in the additionally displayed sheet 1020.

Proceeding to step S168, the personal terminal 2b transmits the captured image 1022 and the text memo to the content management server 6.

In the sequence of FIG. 34, only the image file of the captured image 1022 is transmitted from the content management server 6 to the personal terminal 2b. In this case, JavaScript, which is included in the data of the web page and which operates in the browser of the personal terminal 2b, may create a text memo area.

Further, the content management server 6 may transmit the data of the sheet 1020 including the image of the captured image 1022 and the text memo area 1024. Further, the display positions of the image of the captured image 1022 and the sheet 1020 at this time may be determined by a program such as a script executed by the browser of the personal terminal 2b, or the content management server 6 may specify the display positions and transmit the display positions to the personal terminal 2b.

Further, the content management server 6 may generate the sheet 1020 in which the image of the captured image 1022 and the text memo area 1024 are combined. Note that the area other than the captured image 1022 and the text memo area 1024 of the sheet 1020, can be an area in which handwriting can be input or an area in which handwriting cannot be input.

When a portion other than the additionally displayed sheet 1020 (the selected sheet 1020) is clicked, the personal terminal 2b determines that the editing is completed temporarily and proceeds to step S168. In step S168, the personal terminal 2b transmits information regarding the additionally displayed sheet 1020 and the edited contents with respect to the sheet 1020, to the content management server 6. Note that in step S168, the personal terminal 2b may transmit information regarding all of the sheets 1020 and the edited contents with respect to all of the sheets 1020, to the content management server 6.

The content management server 6 updates the contents of various DBs according to the received information regarding the sheet 1020 and the edited contents with respect to the sheet 1020. As described above, the captured image 1022 captured in the personal board screen 1000 according to an instruction from the participant B, a handwritten memo input by the participant to the captured image 1022, and a text memo input by the participant to the text memo area 1024, are associated with each other by the sheet 1020 and are stored in the content management server 6.

<<Review of Memo and Displaying and Utilization of Interest Level>>

The review of the seminar memo by the participant B and the presenter A, and the displaying and utilization of the participants' interest level in the content of the seminar, are performed as follows, for example. Note that here, an example in which a participant reviews the memo of the seminar from the personal terminal 2b, will be described.

Figure 35:
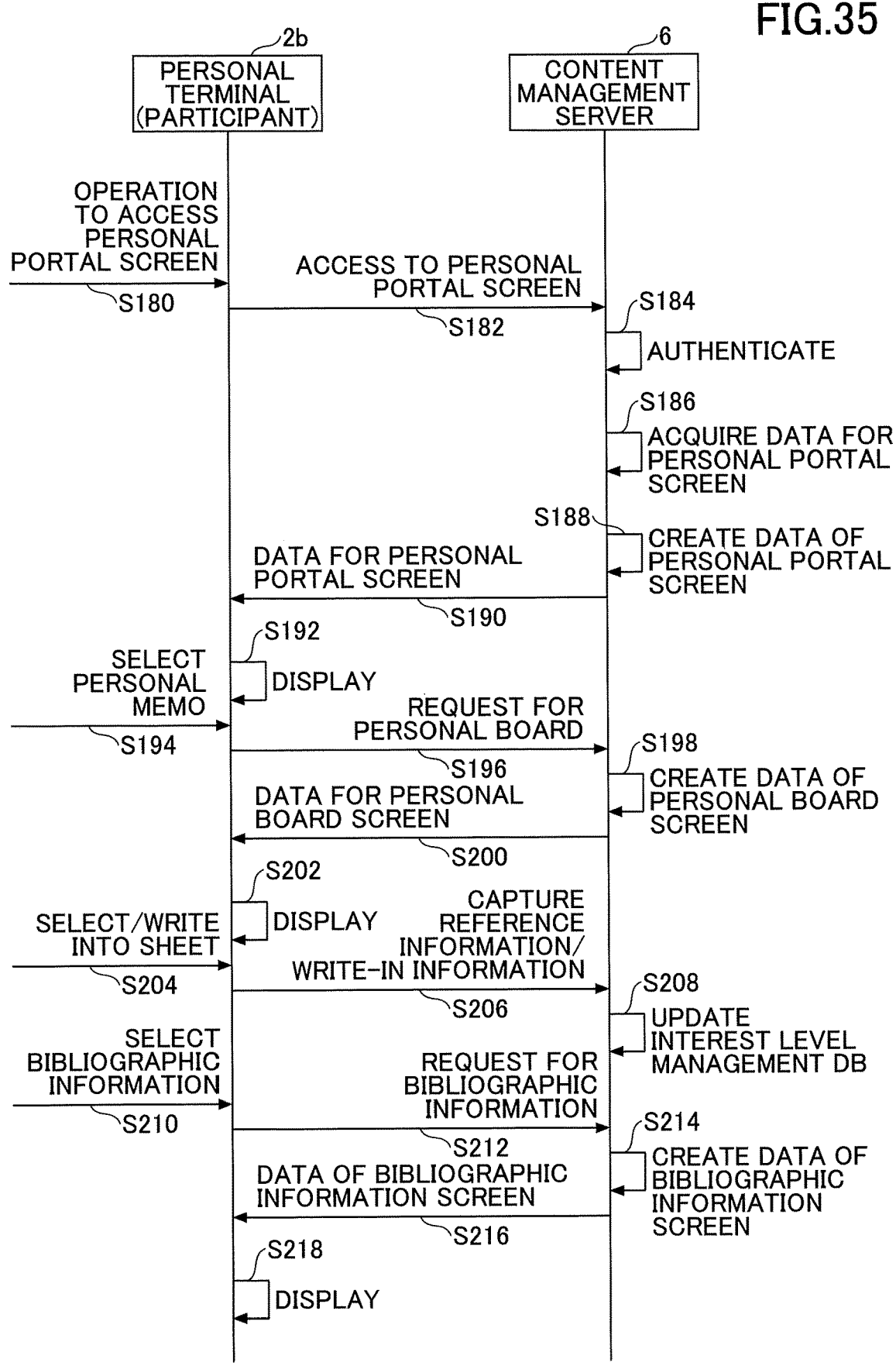
FIG. 35 is a sequence diagram illustrating a process in which a participant reviews a seminar memo from a personal terminal according to the first embodiment of the present invention.

FIG. 35 is a sequence diagram illustrating an example of a process in which a participant reviews a seminar memo from the personal terminal 2b. In step S180, the participant who operates the personal terminal 2b performs an operation of accessing a personal portal screen 5000 as illustrated in FIG. 36. FIG. 36 is a diagram illustrating an example of the display of the personal portal screen 5000.

The personal portal screen 5000 of FIG. 36 illustrates a seminar list 5010 in which seminars in which the participant B operating the personal terminal 2b has participated are listed. The seminar list 5010 can be created by using the personal memo management DB 6004, the shared memo management DB 6005, and the interest level management DB 6003 described above.

In the example of the seminar list 5010 of FIG. 36, for each seminar, the date and time, the seminar name, the location, a personal memo button 5030, a shared memo button 5040, self-evaluation, and a bibliographic information button 5050 are displayed as items. By the personal portal screen 5000 of FIG. 36, the participant can confirm the seminar list 5010 of seminars in which the participant B himself/herself has participated. Self-evaluation is an example of evaluation information.

Note that the personal memo button 5030 is linked to the personal board screen 1100 that displays the personal memo dm of the seminar. The shared memo button 5040 is linked to a shared memo screen displaying the shared memo cm of the seminar. The bibliographic information button 5050 is linked to a bibliographic information screreen 5100 which displays the bibliographic information of the seminar.

When the bibliographic information button 5050 of the personal portal screen 5000 is pressed, the personal terminal 2b displays the bibliographic information screen 5100 corresponding to the pressed bibliographic information button 5050. FIG. 37 is a diagram illustrating a display example of the bibliographic information screen 5100. The "host information" displayed at the top of the bibliographic information screen 5100 is, for example, "bibliographic information of the seminar" of the shared memo management DB 6005 of FIG. 14. Further, the "capture information" displayed at the lower portion of the bibliographic information screen 5100 is created, for example, by using the interest level management DB 6003 illustrated in FIG. 17. Note that details of the "capture information" displayed at the bottom of the bibliographic information screen 5100 will be described later.

The operation for accessing the personal portal screen 5000 of step S180 may be performed by inputting the connection address for connecting to the personal portal screen 5000 to the web browser, or by selecting the personal portal screen 5000 by using a bookmark.

Proceeding to step S182, the web browser of the personal terminal 2b accesses the personal portal screen 5000. In step S184, the content management server 6 performs an authentication process with respect to the participant B who operates the personal terminal 2b. Here, the description will be continued assuming that the authentication has been successful. The content management server 6 proceeds to step S186 and reads data for the personal portal screen 5000 from the storage unit 6000.

For example, the content management server 6 identifies the seminar ID corresponding to the seminar in which the participant B has participated, from the personal memo management DB 6004 of the storage unit 6000 by using contact information such as the user name or an e-mail address of the authenticated participant B as the key. Further, the content management server 6 identifies the bibliographic information of the seminar from the shared memo management DB 6005 of the storage unit 6000, by using the identified seminar-ID as the key.

As described above, when the contact information of the participant B can be identified, the content management server 6 can acquire the data necessary for creating the personal portal screen 5000 of FIG. 36, from various DBs in the storage unit 6000. Proceeding to step S188, the content management server 6 creates data of the web page of the personal portal screen 5000 from the acquired data for the personal portal screen 5000. In step S190, the content management server 6 transmits the data of the web page for the personal portal screen 5000 to the personal terminal 2b.

Proceeding to step S192, the personal terminal 2b can display the personal portal screen 5000 as illustrated in FIG. 36. In the personal portal screen 5000 of FIG. 36, the seminar list 5010 of seminars in which the participant B who operates the personal terminal 2b participated, is displayed. In step S194, the participant who operates the personal terminal 2b presses the personal memo button 5030 of the seminar for which the personal board screen 1100 is desired to be displayed.

Proceeding to step S196, the web browser of the personal terminal 2b makes a request, to the content management server 6, for the personal board screen 1100 linked to the personal memo button 5030 that has accepted the pressing operation. Proceeding to step S198, the content management server 6 creates data of the web page of the personal board screen 1100 requested from the personal terminal 2b. Proceeding to step S200, the content management server 6 transmits the data of the web page for the personal board screen 1100 to the personal terminal 2b.

Proceeding to step S202, the personal terminal 2b can display the personal board screen 1100 as illustrated in FIG. 12. Here, the description is given assuming that the participant B operating the personal terminal 2b has selected the sheet 1120 of the personal board screen 1100, and has input a handwritten memo in the captured image 1022 of the selected sheet 1120 or has input a text memo (writing to the sheet 1120) in the text memo area 1024.

In step S204, the participant B operating the personal terminal 2b selects the sheet 1120 of the personal board screen 1100 and writes information in the selected sheet 1120. The capture reference information regarding the sheet 1120 referred to by the participant B operating the personal terminal 2b and the information written into the selected sheet 1120 by the participant operating the personal terminal 2b in step S204, are transmitted from the personal terminal 2b to the content management server 6 in step S206.

With respect to the capture reference information, for example, in a case where a particular captured image is determined, by the personal terminal 2b, to be displayed on the screen of the personal terminal 2b, the capture reference information indicating that the captured image has been displayed once may be transmitted to the content management server 6, or in the case where a particular captured image is determined, by the personal terminal 2b, to be displayed for a predetermined amount of time or more, in a particular area of the personal terminal 2b, for example, in an area of a certain range from the center of the screen of the personal terminal 2b, the capture reference information indicating that the captured image has been displayed once may be transmitted to the content management server 6.

Further, the capture reference information may include a display time of the captured image. The personal terminal 2b may count the display time of the captured image displayed on any portion of the screen of the personal terminal 2b, or may count only the time during which the captured image is displayed in a particular area of the screen of the personal terminal 2b, for example, the area of a certain range from the center.

Proceeding to step S208, the content management server 6 updates the interest level management DB 6003 of FIG. 17 and the like based on the capture reference information and the write information (the information of reviewing the seminar memo by the participant B) received from the personal terminal 2b.

Here, in step S210, the participant B operating the personal terminal 2b performs an operation of pressing the bibliographic information button 5050 of the seminar for which the bibliographic information screen 5100 is desired to be displayed. Proceeding to step S212, the web browser of the personal terminal 2b makes a request to the content management server 6 for the bibliographic information screen 5100 corresponding to the bibliographic information button 5050 that has accepted the pressing operation.

Proceeding to step S214, the content management server 6 creates data of the web page of the bibliographic information screen 5100 requested from the personal terminal 2b. Proceeding to step S216, the content management server 6 transmits the data of the web page for the bibliographic information screen 5100 to the personal terminal 2b. Proceeding to step S218, the personal terminal 2b can display the bibliographic information screen 5100 as illustrated in FIG. 37.

Note that the sequence diagram of FIG. 35 illustrates an example in which the participant B operating the personal terminal 2b displays the bibliographic information screen 5100 of FIG. 37; however, the presenter A operating the personal terminal 2a may display the bibliographic information screen 5100 of FIG. 37. Further, in the bibliographic information screen 5100 of FIG. 37, the displayed contents may be changed according to the role, such as the presenter A, the participant B, or the organizer who operates the personal terminal 2.

Further, the bibliographic information screen 5100 of FIG. 37 may display "capture information", for example, as illustrated in FIG. 38 or 39, or "interest level information" representing the interest level of the participant B, etc., in the presentation content, by using the interest level management DB 6003 of FIG. 17, thereby displaying and utilizing the participant B's interest level in the seminar content.

FIG. 38 is a diagram illustrating an example of capture information of the bibliographic information screen 5100. FIG. 38 illustrates the captured image 1022 of the projection screen 1040 captured by any participant at the seminar and the number of times of capturing the captured image 1022. According to the capture information illustrated in FIG. 38, the projection screen 1040 for which the interest level is high can be identified based on the captured image 1022 of the captured projection screen 1040 and the number of times of capturing the captured image 1022.

FIG. 39 is a diagram illustrating an example of capture information of the bibliographic information screen 5100. The capture information of FIG. 39 displays, for each participant, the captured image 1022 of the projection screen 1040 captured at the seminar and the content of the text memo input to the text memo area 1024 associated with the captured image 1022. Also illustrated in FIG. 39 is the seminar participation time, the seminar exit time, the interest level, and the participant contact information for each participant.

The interest level is displayed by calculating a relative evaluation based on, for example, the number of the captured images 1022, the number of memos, and the length of the seminar participation time. Note that the display content of the capture information of the bibliographic information screen 5100 may be changed based on the role of the organizer, the presenter, or the participant who operates the personal terminal 2. For example, when the role is the organizer or presenter, the capture information of all participants may be displayed; and when the role is a participant, only the corresponding participant's own capture information may be displayed.

In the example of FIG. 39, the number of the captured images 1022 of the participant corresponding to the contact information of a user name "B" and an e-mail address "BBB@yyy.com" is larger than that of other participants, the number of memos of this participant is larger than that of other participants, and the seminar participation time of this participant is longer than that of other participants and, therefore, it can be determined that the level of interest in the seminar content is higher for this participant than that of other participants. The capture information displayed at the bottom of the bibliographic information screen 5100 may display, for example, some or all of the information of the interest level management DB 6003 of FIG. 17.

Note that the bibliographic information, including the captured image, the memo, the seminar participation time, the seminar exit time, and the seminar interest level, is generated for each seminar and for each participant. For example, when a participant participates in and exits a seminar X, and then participates in a new seminar Y, two pieces of bibliographic information are generated and displayed as different pieces of bibliographic information. The two pieces of bibliographic information include a first piece of bibliographic information (capture information and interest level information) which is created by the content management server 6 based on information such as captured images acquired from the personal terminal 2 of the participant before the participant has exited the seminar X; and a second piece of bibliographic information which is created by the content management server 6 based on information such as captured images acquired from the personal terminal 2 of the participant after the participant has participated in the seminar Y.

Overview of First Embodiment

By the information sharing system according to the present embodiment, the concept of the real seminar, the concept of the virtual seminar room (room) in which the real seminar has been held, and the memos of the participants who have participated in the seminar can be managed in association with each other. Further, by the information sharing system according to the present embodiment, it is possible to collect the contact information such as the e-mail address of the participant that is required in the process of displaying the seminar screen on the personal terminal 2, and the collected contact information can be utilized for approaching (sales activities, etc.) the participant who had a high level of interest in the contents of the seminar. In this way, the participants' level of interest in the seminar and contact information of the participant who participated in the seminar can be easily collected and utilized.

Other Embodiments

While embodiments of the present invention have been described, the present invention is not limited to such embodiments, and various modifications and substitutions may be made without departing from the scope of the present invention. For example, the information sharing system according to the present embodiment may be used in the following situations.

For usage in a school, a student corresponds to the participant in the present embodiment, and a teacher corresponds to the presenter or organizer in the present embodiment, and the degree of concentration of the student in the class can be analyzed. In general conferences, employees correspond to participants in the present embodiment, and management corresponds to presenters and organizers in the present embodiment, and management is able to recognize the status of conferences in the company.

Figure 40:
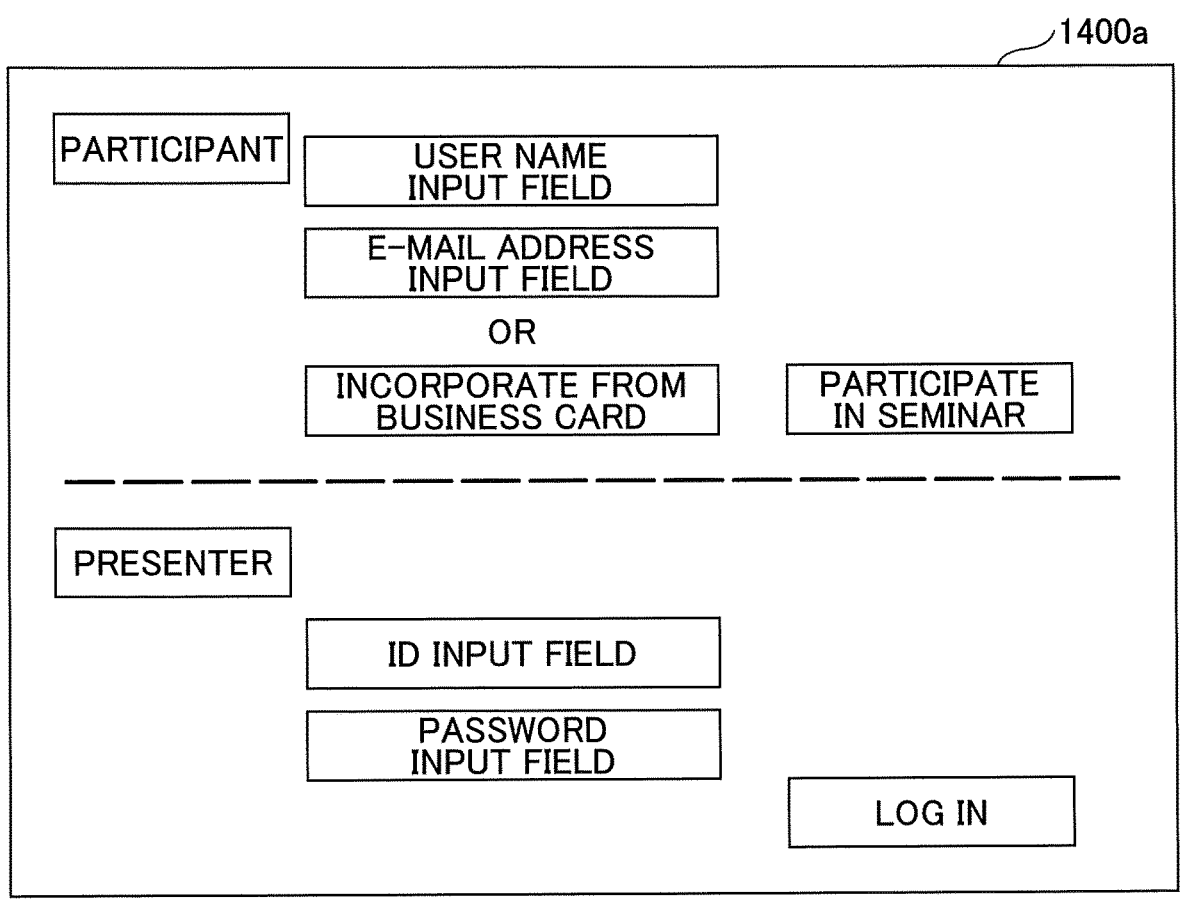
FIG. 40 is an image diagram illustrating an example of a seminar participation screen according to another embodiment of the present invention.

Further, in the above-described embodiment, an example of the seminar participation screen 1400 illustrated in FIG. 28 is described. However, for example, a seminar participation screen 1400a illustrated in FIG. 40 may be used. The seminar participation screen 1400a illustrated in FIG. 40 differs from the seminar participation screen 1400 illustrated in FIG. 28 in that an "incorporate from business card" button is provided. By pressing the "incorporate from business card" button and capturing an image of a business card, it is possible to omit the user name input field and the e-mail address input field. The image obtained by capturing the business card is transmitted to the content management server 6. The content management server 6 can collect contact information of a participant from a business card by optical character recognition (OCR) and the like.

Further, in the above-described embodiment, as illustrated in the seminar participation screen 1400 of FIG. 28, the participant operation area and the presenter operation area are provided. Therefore, it is possible to distinguish whether the personal terminal 2 participating in the seminar is operated by a presenter or a participant depending on whether the access is from the participant operation area or the presenter operation area (depending on the type of connection). However, another method as follows may be used for distinguishing whether the personal terminal 2 participating in the seminar is operated by a presenter or a participant.

For example, if the presenter accesses the content management server 6 from the communication network 9 such as an in-house LAN, and the participant accesses the content management server 6 from the communication network 9 such as LTE, it is possible to distinguish whether the personal terminal 2 is being operated by the presenter or the participant based on the type of the communication network 9 used for the connection by the personal terminal 2. Further, the seminar participation screen may be divided into three screens: a screen that prompts the user to press a button to select between a presenter or a participant; a screen that prompts input of an ID and password when the selection is a presenter and that accepts input of an operation of pressing a "log in" button; and a screen that prompts input of a user name and an e-mail address when the selection is a participant and that accepts input of an operation of pressing a "participate in seminar" button.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

The personal terminal 2b is an example of a first communication terminal of a participating user. The personal terminal 2a is an example of a second communication terminal of an administrative user. The web page creating unit 66 is an example of a web page creating means. The transmitting/receiving unit 61 is an example of first and second transmitting means. The display control unit 24b is an example of a display control means. The accepting unit 22b is an example of an accepting means. The transmitting/receiving unit 21b is an example of the transmitting means. Participation information includes bibliographic information of the seminar, capture information, and information on the level of interest in the seminar. The participation information indicates that each participating user has participated in a meeting such as a seminar. The participation data may be provided as data such as a web page or a file such as a spreadsheet application and transmitted to the personal terminal of the administrative user.

According to one embodiment of the present invention, the organizer, etc., is able to efficiently confirm the information of participating users and the participation status.

The information processing apparatus, the information processing method, and the information processing system are not limited to the specific embodiments described in the detailed description, and variations and modifications may be made without departing from the spirit and scope of the present invention.

What is claimed is:

1. An information processing apparatus that is configured to perform data communication with a communication terminal, the information processing apparatus comprising:
   processing circuitry; and
   a memory storing computer-executable instructions that cause the processing circuitry to:
   display, on a display device of the communication terminal, a content by a web browser of the communication terminal of a participating user that is participating in a screen sharing event for sharing the content;
   determine, on a per-screen sharing event basis, a Uniform Resource Locator (URL) of a web page for causing the web browser, which is included in the communication terminal participating in the screen sharing event, to input and transmit information of the participating user;
   transmit the determined URL to the communication terminal of the participating user; and
   transmit participation data, in which the information of the participating user transmitted via the web page from the web browser of the communication terminal, and participation information indicating that the participating user has participated in the screen sharing event, are associated with each other,
   wherein the information processing apparatus is configured to perform the data communication with a first communication terminal that is the communication terminal of the participating user and a second communication terminal of an administrative user administering the screen sharing event,
   wherein the processing circuitry transmits the participation data as a second web page to the second communication terminal upon detecting that authentication of the administrative user is successful, and
   wherein the processing circuitry determines whether a connection is made from the participating user or the administrative user based on a communication network used for the connection, and determines the URL of the web page that differs according to whether the web page is for the participating user or the administrative user.

2. The information processing apparatus according to claim 1, wherein the processing circuitry determines whether a connection is made from the participating user or the administrative user based on a type of the connection, and determines the URL of the web page that differs according to whether the web page is for the participating user or the administrative user.

3. The information processing apparatus according to claim 1, wherein the processing circuitry determines whether a connection is made from the participating user or the administrative user based on a selection operation performed by the participating user or the administrative user, and determines the URL of the web page that differs according to whether the web page is for the participating user or the administrative user.

4. The information processing apparatus according to claim 1, wherein the information of the participating user includes a mail address of the participating user.

5. The information processing apparatus according to claim 1, wherein the information of the participating user includes image data in which a mail address of the participating user is displayed.

6. The information processing apparatus according to claim 3, wherein the processing circuitry further creates a mail, which includes a mail address of the participating user set as a destination, and which includes information of a connection destination for connecting to a web page in which the screen sharing event is to be performed.

7. The information processing apparatus according to claim 1, wherein
   the participation information indicating that the participating user has participated in the screen sharing event includes information of an image of a shared screen acquired by one or more of the participating users when the screen sharing event has been performed, and wherein
   the participation data includes the information of the image of the shared screen and a mail address of the participating user in association with each other.

8. An information processing method executed by an information processing apparatus that is configured to perform data communication with a communication terminal, the information processing method comprising:
   displaying, on a display device of the communication terminal, a content by a web browser of the communication terminal of a participating user that is participating in a screen sharing event for sharing the content;
   determining, on a per-screen sharing event basis, a Uniform Resource Locator (URL) of a web page for causing the web browser, which is included in the communication terminal participating in the screen sharing event, to input and transmit information of the participating user;

transmitting the determined URL to the communication terminal of the participating user;

transmitting participation data, in which the information of the participating user transmitted via the web page from the web browser of the communication terminal, and participation information indicating that the participating user has participated in the screen sharing event, are associated with each other, performing the data communication with a first communication terminal that is the communication terminal of the participating user and a second communication terminal of an administrative user administering the screen sharing event, and transmitting the participation data as a second web page to the second communication terminal upon detecting that authentication of the administrative user is successful, determining whether a connection is made from the participating user or the administrative user based on a communication network used for the connection, and determining the URL of the web page that differs according to whether the web page is for the participating user or the administrative user.

9. An information processing system comprising:

a communication terminal of a participating user participating in a screen sharing event for sharing a content; and an information processing apparatus configured to cause a web browser of the communication terminal participating in the screen sharing event to display the content on a display device of the communication terminal, wherein the information processing apparatus includes:

first processing circuitry; and a first memory storing computer-executable instructions that cause the first processing circuitry to:

determine, on a per-screen sharing event basis, a Uniform Resource Locator (URL) of a web page for causing the web browser, which is included in the communication terminal participating in the screen sharing event, to input and transmit information of the participating user;

transmit the determined URL to the communication terminal of the participating user;

transmit participation data, in which the information of the participating user transmitted via the web page from the web browser of the communication terminal, and participation information indicating that the participating user has participated in the screen sharing event, are associated with each other, perform the data communication with a first communication terminal that is the communication terminal of the participating user and a second communication terminal of an administrative user administering the screen sharing event, and transmit the participation data as a second web page to the second communication terminal upon detecting that authentication of the administrative user is successful, and wherein the first processing circuitry determines whether a connection is made from the participating user or the administrative user based on a communication network used for the connection, and determines the URL of the web page that differs according to whether the web page is for the participating user or the administrative user, and wherein the communication terminal includes:

second processing circuitry; and a second memory storing computer-executable instructions that cause the second processing circuitry to:

display the web page by the URL received from the information processing apparatus;

accept the information of the participating user input to the displayed web page; and transmit, to the information processing apparatus, the accepted information of the participating user and the participation information indicating that the participating user has participated in the screen sharing event.

\* \* \* \* \*